US012610117B2

(12) United States Patent
Osada et al.

(10) Patent No.: US 12,610,117 B2
(45) Date of Patent: Apr. 21, 2026

(54) REFLECTOR DRIVING DEVICE

(71) Applicant: ALPS ALPINE CO., LTD., Tokyo (JP)

(72) Inventors: Hiroshi Osada, Miyagi (JP); Junichiro Yokota, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 234 days.

(21) Appl. No.: 18/449,081

(22) Filed: Aug. 14, 2023

(65) Prior Publication Data

US 2024/0004161 A1 Jan. 4, 2024

Related U.S. Application Data

(63) Continuation of application No. PCT/JP2022/007410, filed on Feb. 22, 2022.

(30) Foreign Application Priority Data

Feb. 24, 2021 (JP) ................................. 2021-027898

(51) Int. Cl.
*H04N 23/54* (2023.01)
*G02B 7/182* (2021.01)
(Continued)

(52) U.S. Cl.
CPC ........... *H04N 23/54* (2023.01); *G02B 7/1821* (2013.01); *G03B 5/00* (2013.01); *H04N 23/55* (2023.01); *H04N 23/57* (2023.01)

(58) Field of Classification Search
None
See application file for complete search history.

(56) References Cited

U.S. PATENT DOCUMENTS

2018/0188474 A1 7/2018 Enta
2018/0231793 A1 8/2018 Jeong et al.
(Continued)

FOREIGN PATENT DOCUMENTS

CN 108427235 8/2018
CN 110764217 A * 2/2020 ........... G02B 7/1805
(Continued)

OTHER PUBLICATIONS

International Search Report for PCT/JP2022/007410 mailed on Mar. 29, 2022.

*Primary Examiner* — Twyler L Haskins
*Assistant Examiner* — Wesley J Chiu
(74) *Attorney, Agent, or Firm* — IPUSA, PLLC

(57) ABSTRACT

A reflector driving device includes: a reflector-retaining member configured to retain a reflector that refracts light; a first support member configured to support the reflector-retaining member so as to be swingable about a first axis; a second support member configured to support the first support member so as to be swingable about a second axis having an axis-line direction perpendicular to an axis-line direction of the first axis; a first driving mechanism configured to swing the reflector-retaining member about the first axis; a second driving mechanism configured to swing the first support member about the second axis; a first biasing member configured to bias the reflector-retaining member toward the first support member; and a second biasing member configured to bias the first support member toward the second support member.

20 Claims, 41 Drawing Sheets

(51) Int. Cl.
    *G03B 5/00*       (2021.01)
    *H04N 23/55*    (2023.01)
    *H04N 23/57*    (2023.01)

(56) References Cited

U.S. PATENT DOCUMENTS

| | | | |
|---|---|---|---|
| 2020/0225442 A1* | 7/2020 | Weng | H04N 23/55 |
| 2020/0333622 A1 | 10/2020 | Fujisaki et al. | |
| 2021/0072530 A1* | 3/2021 | Tsai | H02K 41/0356 |
| 2023/0259002 A1* | 8/2023 | Lee | H02K 11/215 |
| | | | 359/555 |
| 2024/0036436 A1* | 2/2024 | Lee | H04N 23/60 |

FOREIGN PATENT DOCUMENTS

| | | |
|---|---|---|
| JP | 2012-118336 | 6/2012 |
| JP | 2015-121755 | 7/2015 |
| JP | 2017-009998 | 1/2017 |
| JP | 2020-177067 | 10/2020 |
| JP | 2021-015236 | 2/2021 |

* cited by examiner

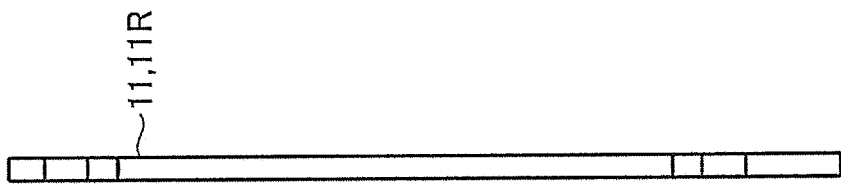
FIG.6A
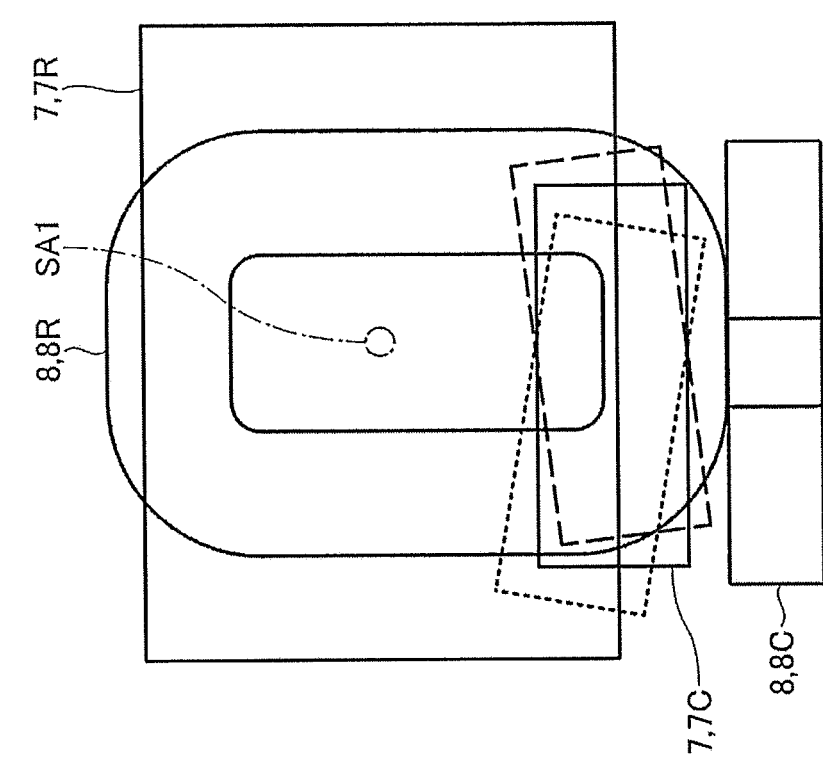
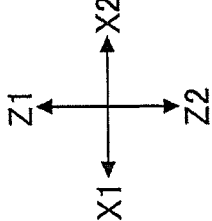

REFLECTOR DRIVING DEVICE

CROSS-REFERENCE TO RELATED APPLICATION

This application is a continuation application of International Application No. PCT/JP2022/007410 filed on Feb. 22, 2022, and designated the U.S., which is based upon and claims priority to Japanese Patent Application No. 2021-027898, filed on Feb. 24, 2021, the entire contents of which are incorporated herein by reference.

BACKGROUND

1. Field of the Invention

The present disclosure relates to a reflector driving device mounted in, for example, portable devices with cameras.

2. Description of the Related Art

Patent Document 1 discloses an image-capturing device including an anti-vibration unit configured to support a prism so as to be swingable about two swing axes. This anti-vibration unit includes: a first holder block that holds the prism and is swingable about a first swing axis; a second holder block that holds the first holder block so as to be swingable and is swingable about a second swing axis; and an anti-vibration base that supports the second holder block so as to be swingable. The first holder block and the second holder block are biased so as to become closer to each other with a tension spring extending along a first rotation axis.

CITATION LIST

Patent Document

Patent Document 1: Japanese Laid-Open Patent Publication No. 2020-177067

The swing mechanism of this anti-vibration unit is configured by a shaft inserted into bushes disposed for the two swing axes. A clearance is provided between the shaft and the bushes so that the shaft can rotate. However, with too small a clearance being provided, the shaft cannot rotate. Therefore, the dimensional tolerances of the shaft and the bushes are set to be relatively large so that the clearance does not become small excessively.

However, when the clearance between the shaft and the bushes is too large, backlash occurs between the shaft and the bushes and may give an adverse influence to swing of the prism.

In view thereof, it is desired to provide a reflector driving device that can more stably swing a reflector such as a prism.

SUMMARY

A reflector driving device according to embodiments of the present invention includes: a reflector-retaining member configured to retain a reflector that refracts light; a first support member configured to support the reflector-retaining member so as to be swingable about a first axis; a second support member configured to support the first support member so as to be swingable about a second axis having an axis-line direction perpendicular to an axis-line direction of the first axis; a first driving mechanism configured to swing the reflector-retaining member about the first axis; a second driving mechanism configured to swing the first support member about the second axis; a first biasing member configured to bias the reflector-retaining member toward the first support member; and a second biasing member configured to bias the first support member toward the second support member.

BRIEF DESCRIPTION OF DRAWINGS

FIG. 6A is a right-hand lateral view of a driving mechanism.

FIG. 14A is an enlarged view of a first shank portion.

FIG. 14B is an enlarged view of the first shank portion.

DETAILED DESCRIPTION

Embodiments

Figure 1:
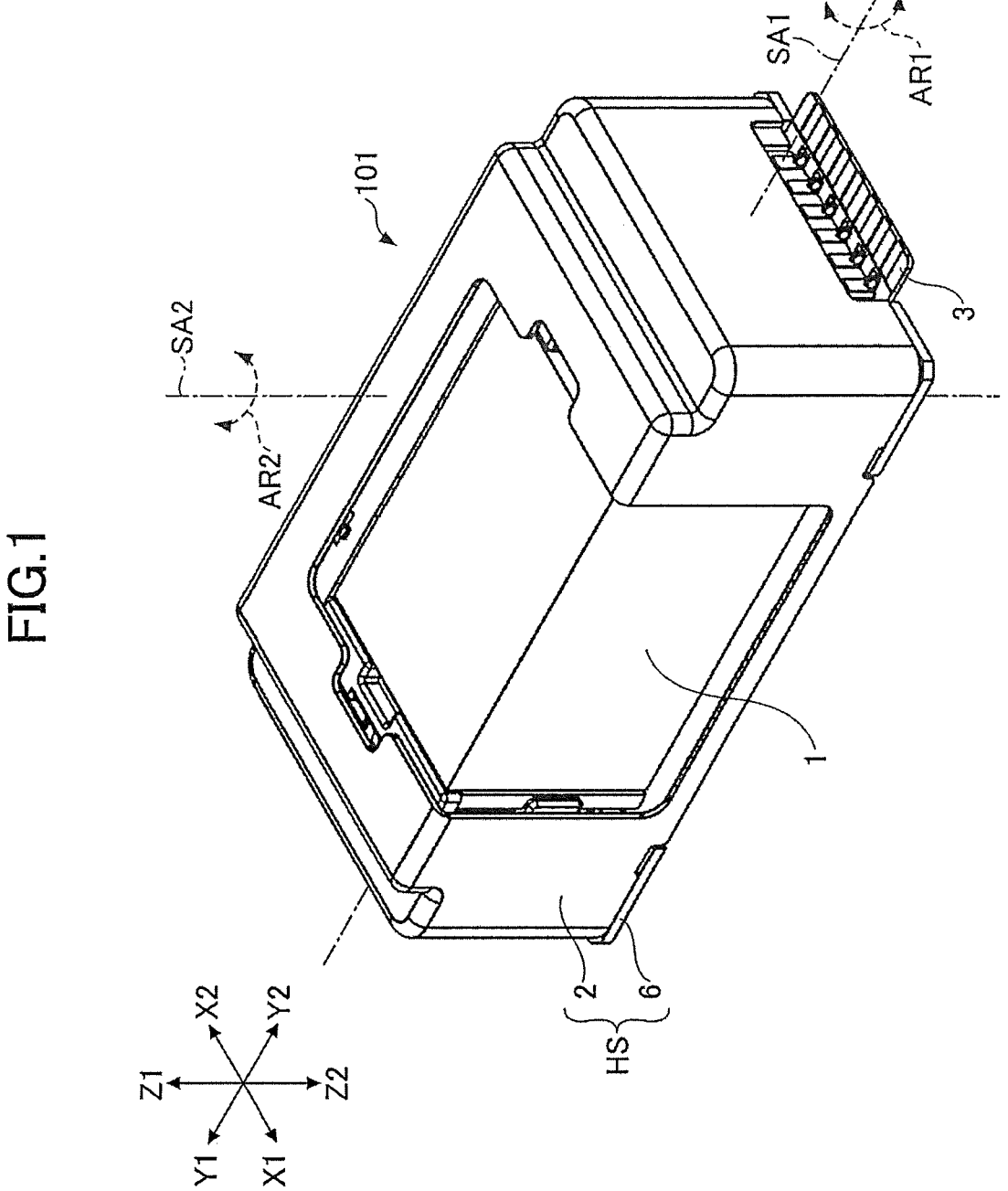
FIG. 1 is a perspective view of a reflector driving device.
Figure 2:
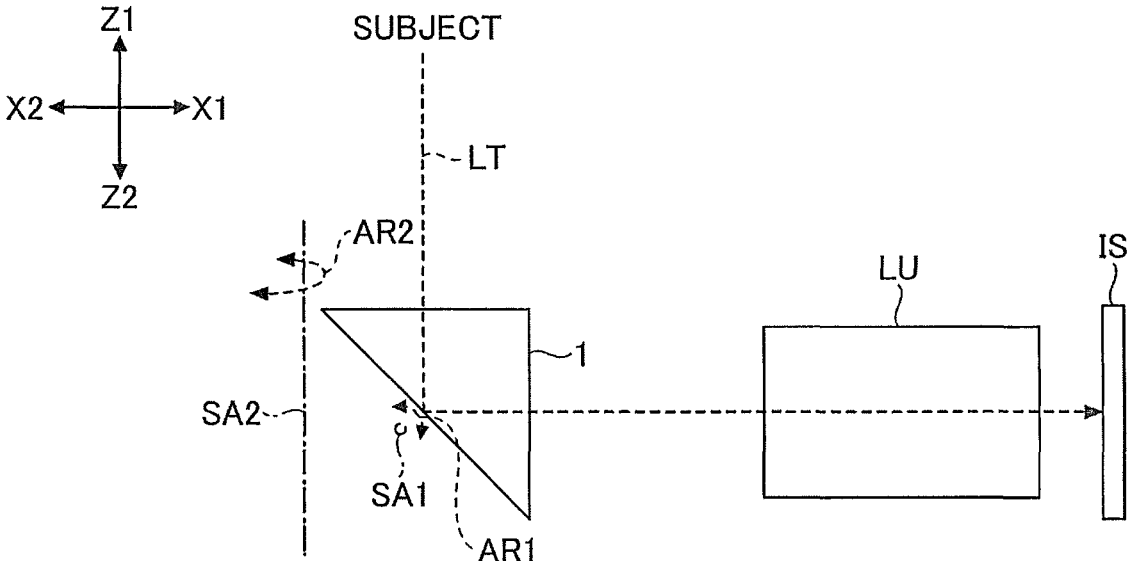
FIG. 2 is a schematic view of a camera module including the reflector driving device of FIG. 1.
Figure 3:
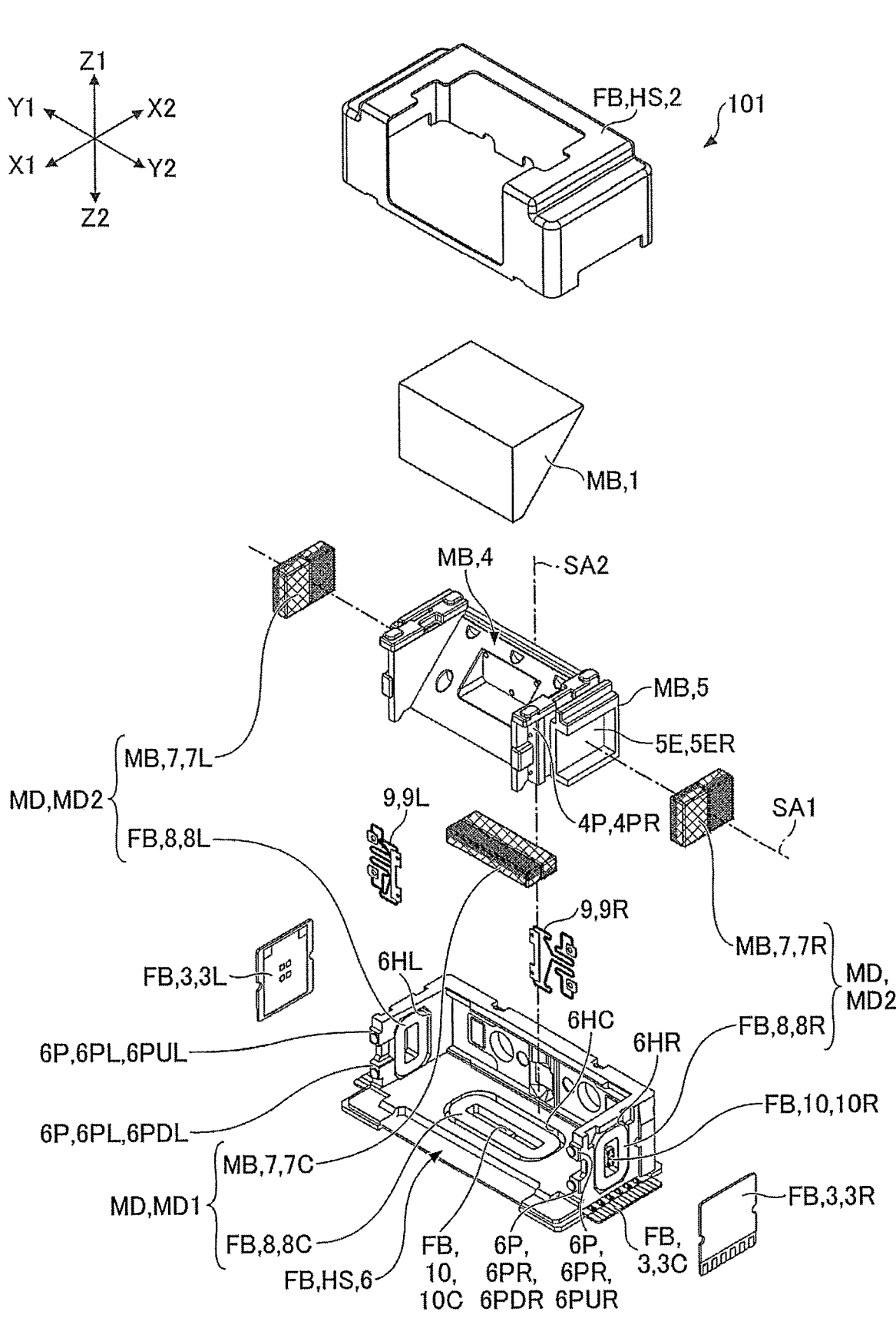
FIG. 3 is an exploded perspective view of the reflector driving device of FIG. 1.

Hereinafter, a reflector driving device 101 according to the embodiments of the present invention will be described with reference to the drawings. FIG. 1 is a perspective view of the reflector driving device 101. FIG. 2 is a schematic view of a camera module in a camera-equipped portable device including the reflector driving device 101. FIG. 3 is an exploded perspective view of the reflector driving device 101.

In FIG. 1 to FIG. 3, X1 denotes one direction of an X axis forming a three-dimensional rectangular coordinate system, and X2 denotes the other direction of the X axis. Also, Y1 denotes one direction of a Y axis forming the three-dimensional rectangular coordinate system, and Y2 denotes the other direction of the Y axis. Likewise, Z1 denotes one direction of a Z axis forming the three-dimensional rectangular coordinate system, and Z2 denotes the other direction of the Z axis. In the present embodiment, an X1 side of the reflector driving device 101 corresponds to a front side (front-face side) of the reflector driving device 101, and an X2 side of the reflector driving device 101 corresponds to a back side (rear-face side) of the reflector driving device 101. Also, a Y1 side of the reflector driving device 101 corresponds to a left-hand side of the reflector driving device 101, and a Y2 side of the reflector driving device 101 corresponds to a right-hand side of the reflector driving device 101. Further, a Z1 side of the reflector driving device 101 corresponds to an upper side of the reflector driving device 101, and a Z2 side of the reflector driving device 101 corresponds to a lower side of the reflector driving device 101. The same applies to the other drawings.

As illustrated in FIG. 1, the reflector driving device 101 is configured to swing a reflector 1 about a swing axis SA1 and a swing axis SA2. The reflector driving device 101 is used as, for example, an actuator for camera shake correction in the camera module. In the present embodiment, the swing axis SA1 serving as the first axis is an axis in parallel to the Y axis, and the swing axis SA2 serving as the second axis is an axis in parallel to the Z axis. Note that, the swing axis SA1 serving as the first axis may be an axis in parallel to the Z axis. In this case, the swing axis SA2 serving as the second axis may be an axis in parallel to the Y axis.

As illustrated in FIG. 2, the reflector driving device 101 is typically disposed at a position closer to a subject than a lens unit LU. The reflector driving device 101 is configured such that light LT from the subject is reflected by the reflector 1 and the reflected light reaches an image sensor IS through the lens unit LU.

Specifically, as illustrated in FIG. 3, the reflector driving device 101 includes a moving member MB and a fixing member FB. The moving member MB is housed in a housing HS of the fixing member FB. The housing HS includes a cover member 2 and a base member (second support member 6). In the present embodiment, a cover member 2 is formed of a non-magnetic metal, and the second support member 6 serving as the base member is formed of a synthetic resin.

The reflector driving device 101 is configured such that a driving mechanism MD can swing the moving member MB relative to the fixing member FB. Specifically, as illustrated in FIG. 1 and FIG. 2, the reflector driving device 101 is configured to rotate the reflector 1 relative to the housing HS about the swing axis SA1 as indicated by a double-headed arrow AR1 and about the swing axis SA2 as indicated by a double-headed arrow AR2.

The moving member MB is a member supported by the fixing member FB. As illustrated in FIG. 3, the moving member MB includes the reflector 1, a reflector-retaining member 4, a first support member and a magnetic field-generating member 7.

The reflector 1 is an optical element for refracting light. Specifically, as illustrated in FIG. 2, the reflector 1 is configured to reflect the light LT incident from the subject toward the lens unit LU. In the present embodiment, the reflector 1 is a prism. The reflector 1 may be a mirror.

The reflector-retaining member 4 is configured to retain the reflector 1. In the present embodiment, the reflector-retaining member 4 is formed of a synthetic resin. The reflector 1 is bonded via an adhesive to the reflector-retaining member 4.

The first support member 5 is configured to support the reflector-retaining member 4 so that the reflector-retaining member 4 is swingable about the swing axis SA1 serving as the first axis. In the present embodiment, the first support member 5 is formed of a synthetic resin.

The magnetic field-generating member 7 is a constituent member of the driving mechanism MD. In the present embodiment, the magnetic field-generating member 7 is formed of bipolar-magnetized permanent magnets and includes a middle magnet 7C, a left-hand magnet 7L, and a right-hand magnet 7R. The middle magnet 7C is formed of a combination of two dipole magnets, and fixed via an adhesive to a lower (Z2-side) surface of the reflector-retaining member 4. The left-hand magnet 7L is formed of a combination of two dipole magnets, and fixed via an adhesive to the left-hand wall portion of the first support member 5. The right-hand magnet 7R is formed of a combination of two dipole magnets, and fixed via an adhesive to the right-hand wall portion of the first support member 5. In FIG. 3, for ease of understanding, the permanent magnet is given a rough cross pattern in the N pole thereof and a fine cross pattern in the S pole thereof. The same applies to the other drawings. Note that, the middle magnet 7C, the left-hand magnet 7L, the right-hand magnet 7R, or any combination thereof may be formed of one quadrupole magnet.

Figure 4A:
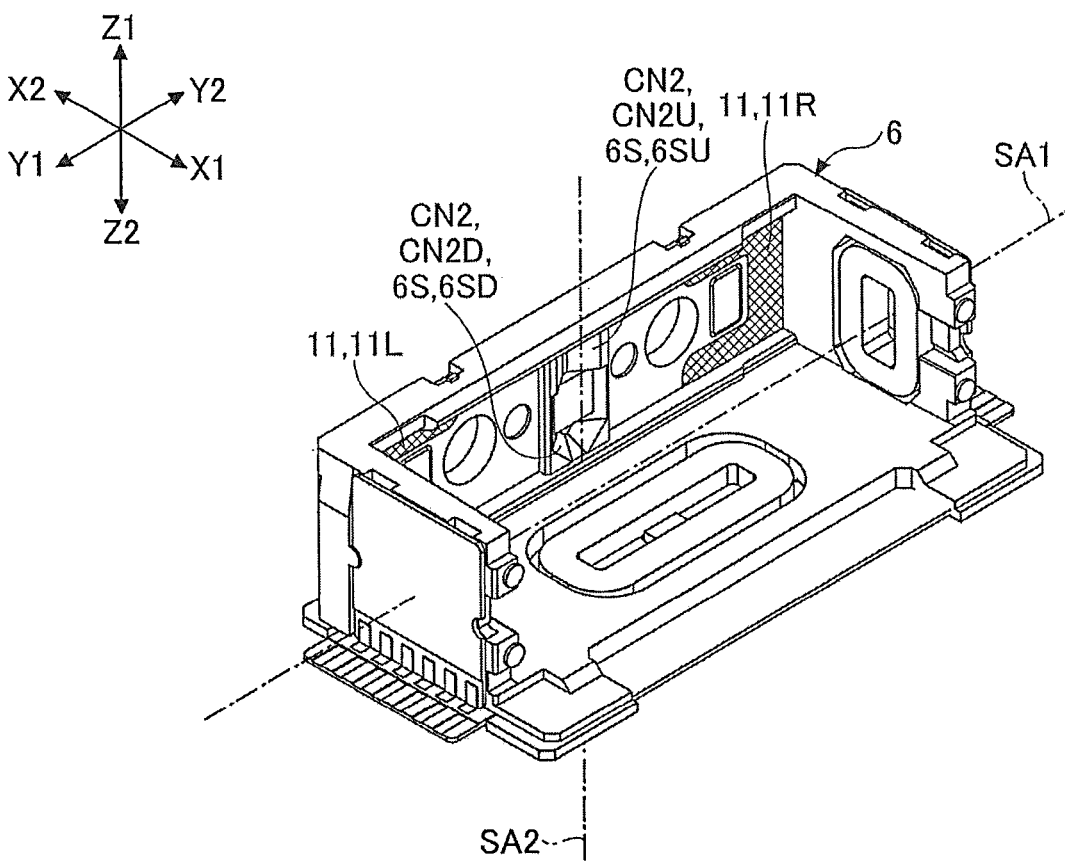
FIG. 4A is a perspective view of a fixing member.
Figure 4B:
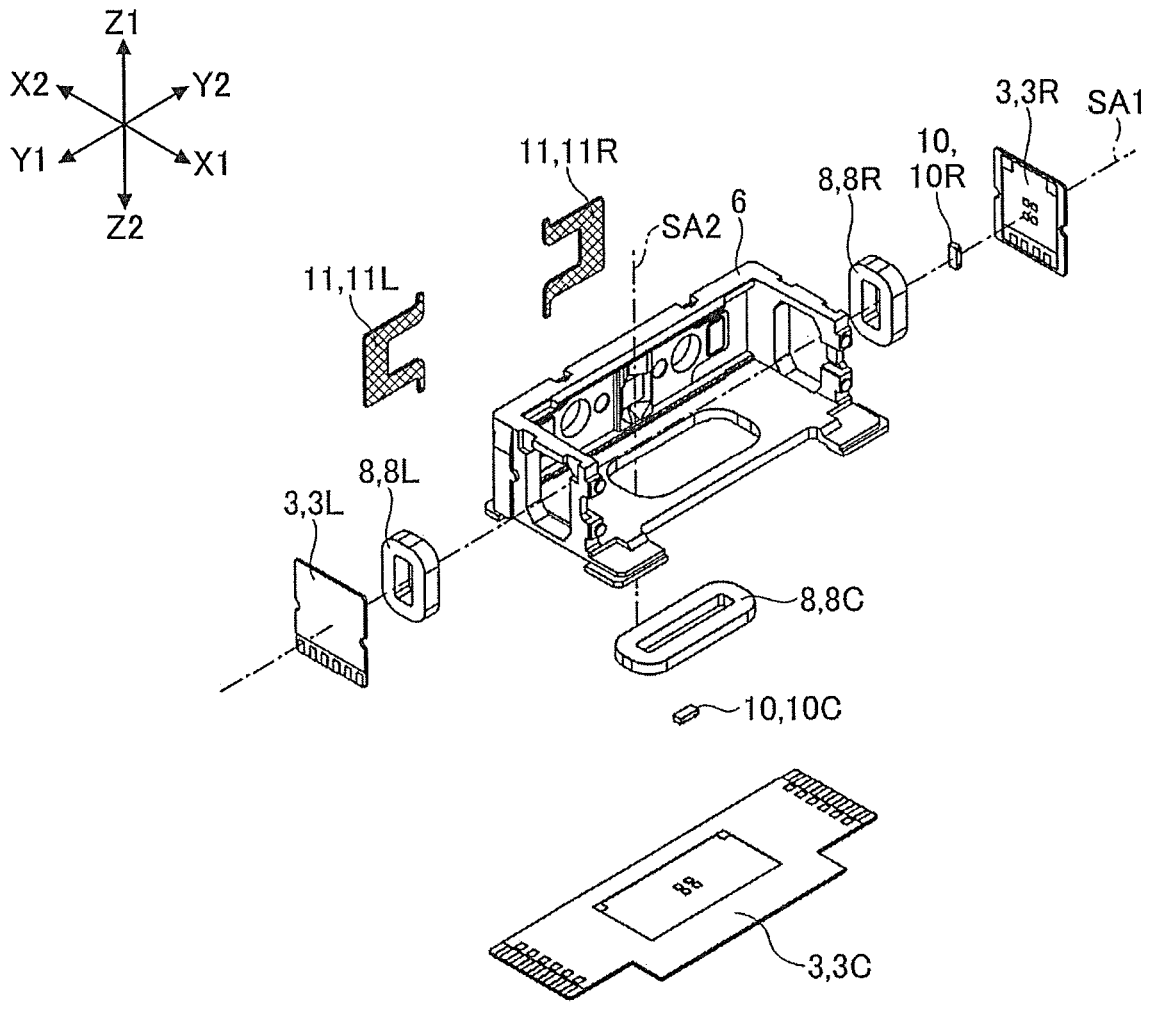
FIG. 4B is an exploded detailed view of the fixing member.

The fixing member FB is configured to support the moving member MB. Specifically, as illustrated in FIG. 4A and FIG. 4B, the fixing member FB includes a wiring board 3, the second support member 6, a coil 8, and a sensor 10. FIG. 4A and FIG. 4B are detailed views of the fixing member FB. Specifically, FIG. 4A is a perspective view of the fixing member FB, and FIG. 4B is an exploded perspective view of the fixing member FB. Note that, in FIG. 4A and FIG. 4B, for ease of understanding, the cover member 2 is not illustrated.

The wiring board 3 is a member for connecting each of the coil 8 and the sensor 10 to an external control portion having a power supply function. In the present embodiment, the wiring board 3 is a flexible wiring board. Note that, the wiring board 3 may be a rigid wiring board or a rigid flexible wiring board. Also, the wiring board 3 is fixed via an adhesive to the second support member 6.

The second support member 6 is configured to support the first support member 5 so that the first support member 5 is swingable about the swing axis SA2 serving as the second axis having an axis-line direction (Z-axis direction) perpendicular to an axis-line direction (Y-axis direction) of the swing axis SA1 serving as the first axis. Also, the second support member 6 includes a magnetic member 11 embedded in a back-side wall portion thereof. In the present embodiment, the magnetic member 11 is embedded in the back-side wall portion of the second support member 6 through insert molding. Note that, in FIG. 4A and FIG. 4B, for ease of understanding, the magnetic member 11 is given a cross pattern.

The magnetic member 11 is a constituent member of the driving mechanism MD. The magnetic member 11 includes: a left-hand magnetic member 11L that faces the left-hand magnet 7L in the direction in parallel to the X axis and functions to attract the left-hand magnet 7L toward the X2 side (back side); and a right-hand magnetic member 11R that faces the right-hand magnet 7R in the direction in parallel to the X axis and functions to attract the right-hand magnet 7R toward the X2 side (back side). Note that, the left-hand magnetic member 11L and the right-hand magnetic member 11R may be integrally formed. Also, the magnetic member 11 may be omitted. Also, the left-hand magnetic member 11L may face the left-hand magnet 7L via the synthetic resin forming the second support member 6. The same applies to the right-hand magnetic member 11R.

Also, the magnetic member 11 may be attached to an inner surface of the cover member 2 so that the magnetic member 11 faces the left-hand magnet 7L and the right-hand magnet 7R in the direction in parallel to the X axis and can attract the left-hand magnet 7L and the right-hand magnet 7R toward the X1 side (front side).

In the present embodiment, the left-hand magnetic member 11L and the right-hand magnetic member 11R are formed to have the same shape. In other words, the left-hand magnetic member 11L and the right-hand magnetic member 11R are formed to become the same part. Note that, the left-hand magnetic member 11L and the right-hand magnetic member 11R may have different shapes.

The coil 8 is a constituent member of the driving mechanism MD. In the present embodiment, the coil 8 is a wire-wound coil that is formed through winding of an electrically conductive wire coated with an insulating material on the surface thereof, and is fixed to the wiring board 3. For ease of understanding, FIG. 3 does not illustrate a detailed wound state of the electrically conductive wire. The same applies to other drawings illustrating the coil 8. The coil 8 may be, for example, a layer-stacked coil or a thin-film coil. In this case, the coil 8 may be integrally formed with the wiring board 3.

Specifically, the coil 8 is attached to the wiring board 3 fixed to the second support member 6, and is disposed so as to be unmovable relative to the second support member 6. In the present embodiment, the wiring board 3 includes a left-hand wiring board 3L, a middle wiring board 3C, and a right-hand wiring board 3R. Conductive patterns formed on the left-hand wiring board 3L, the middle wiring board 3C, and the right-hand wiring board 3R are bonded to each other via solder. The coil 8 includes a left-hand coil 8L, a middle coil 8C, and a right-hand coil 8R.

More specifically, the left-hand coil 8L is attached to the left-hand wiring board 3L, and in this state disposed so as to be fitted into a left-hand penetrating portion 6HL formed in the left-hand wall portion of the second support member 6. The middle coil 8C is attached to the middle wiring board 3C, and in this state disposed so as to be fitted into a middle penetrating portion 6HC formed in the bottom wall portion of the second support member 6. Also, the right-hand coil 8R is attached to the right-hand wiring board 3R, and in this state disposed so as to be fitted into a right-hand penetrating portion 6HR formed in the right-hand wall portion of the second support member 6.

The sensor 10 is configured to detect the position of the moving member MB. In the present embodiment, the sensor 10 is formed of a giant magneto resistive effect (GMR) element that can detect a magnetic field generated by the magnetic field-generating member 7. Note that, the sensor 10 may be configured to detect the position of the moving member MB by utilizing another magneto resistive element such as a semiconductor magneto resistive (SMR) element, an anisotropic magneto resistive (AMR) element, or a tunnel magneto resistive (TMR) element. Alternatively, the sensor may be configured to detect the position of the moving member MB by utilizing a Hall element.

Specifically, the sensor 10 includes a middle sensor 10C that can detect a magnetic field generated by the middle magnet 7C; and a right-hand sensor 10R that can detect a magnetic field generated by the right-hand magnet 7R.

The middle sensor 10C is attached to the middle wiring board 3C, with the middle sensor 10C being surrounded by the middle coil 8C. The middle sensor 10C is configured to detect the position of the reflector-retaining member 4 that swings about the swing axis SA1.

The right-hand sensor 10R is attached to the right-hand wiring board 3R, with the right-hand sensor 10R being surrounded by the right-hand coil 8R. The right-hand sensor 10R is configured to detect the position of the first support member 5 that swings about the swing axis SA2. The sensor 10 may include a left-hand sensor instead of the right-hand sensor 10R or in addition to the right-hand sensor 10R. In this case, the left-hand sensor is attached to the left-hand wiring board 3L, with the left-hand sensor being surrounded by the left-hand coil 8L. The left-hand sensor is configured to detect the position of the first support member 5 that swings about the swing axis SA2.

The moving member MB is biased by the biasing member 9 and pressed against the fixing member FB. Specifically, the biasing member 9 includes in the direction in parallel to the X axis: the first biasing member configured to bias the reflector-retaining member 4 toward the first support member 5 (X2 side); and the second biasing member configured to bias the first support member 5 toward the second support member 6 (X2 side). In the present embodiment, the biasing member 9 is formed of a spring member, and serves as both of the first biasing member and the second biasing member.

Specifically, the biasing member 9 is formed of a pair of spring members (a left-hand spring member 9L and a right-hand spring member 9R), and is configured to realize a function of biasing the reflector-retaining member 4 toward the X2 side (back side) and a function of biasing the first support member 5 toward the X2 side (back side).

Note that, the first biasing member and the second biasing member may be separate and independent members. For example, the first biasing member may include one or more spring members, and the second biasing member may include one or more different spring members.

With this configuration, the biasing member 9 can prevent the reflector-retaining member 4 from moving in a direction away from the swing axis SA1 and can prevent the first support member 5 from moving in a direction away from the swing axis SA2.

Figure 5:
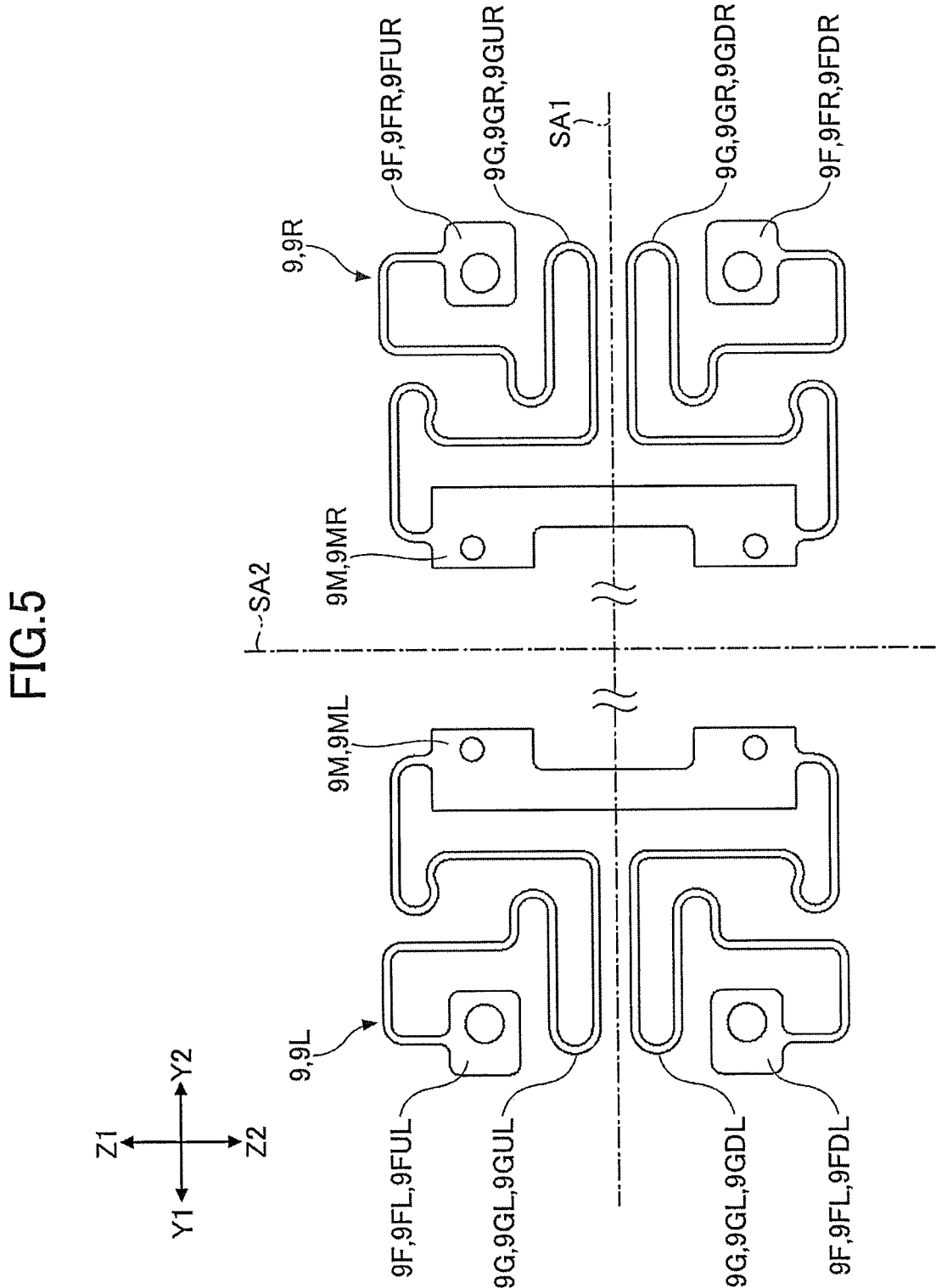
FIG. 5 is a front view of a biasing member.

Next, referring to FIG. 5, details of the biasing member 9 will be described. FIG. 5 is a front view of the biasing member 9.

The biasing member 9 includes: an inner fixing portion 9M to be fixed to a base portion 4P (see FIG. 3) of a lateral wall portion of the reflector-retaining member 4; an outer fixing portion 9F to be fixed to a base portion 6P (see FIG. 3) of a lateral wall portion of the second support member 6; and an elastic arm portion 9G that connects the inner fixing portion 9M and the outer fixing portion 9F to each other.

Specifically, the biasing member 9 includes a right-hand spring member 9R and a left-hand spring member 9L that are disposed to be spaced from each other.

The right-hand spring member 9R includes: a right-hand inner fixing portion 9MR to be fixed to a right-hand base portion 4PR (see FIG. 3) of the right-hand wall portion of the reflector-retaining member 4; a right-hand outer fixing portion 9FR to be fixed to a right-hand base portion 6PR (see FIG. 3) of the right-hand wall portion of the second support member 6; and a right-hand elastic arm portion 9GR that connects the right-hand inner fixing portion 9MR and the right-hand outer fixing portion 9FR to each other. The right-hand outer fixing portion 9FR includes: a right-hand upper outer fixing portion 9FUR to be fixed to a right-hand upper base portion 6PUR (see FIG. 3) of the second support member 6; and a right-hand lower outer fixing portion 9FDR to be fixed to a right-hand lower base portion 6PDR (see FIG. 3) of the second support member 6. Also, the right-hand elastic arm portion 9GR includes a right-hand upper elastic arm portion 9GUR that connects the right-hand inner fixing portion 9MR and the right-hand upper outer fixing portion 9FUR to each other; and a right-hand lower elastic arm portion 9GDR that connects the right-hand inner fixing portion 9MR and the right-hand lower outer fixing portion 9FDR to each other. Note that, the right-hand upper outer fixing portion 9FUR and the right-hand lower outer fixing portion 9FDR may be integrally formed like the right-hand inner fixing portion 9MR. Conversely, the right-hand inner fixing portion 9MR may be divided into an upper portion and a lower portion.

Likewise, the left-hand spring member 9L includes: a left-hand inner fixing portion 9ML to be fixed to a left-hand base portion 4PL (not seeable in FIG. 3) of the left-hand wall portion of the reflector-retaining member 4; a left-hand outer fixing portion 9FL to be fixed to a left-hand base portion 6PL (see FIG. 3) of the left-hand wall portion of the second support member 6; and a left-hand elastic arm portion 9GL that connects the left-hand inner fixing portion 9ML and the left-hand outer fixing portion 9FL to each other. The left-hand outer fixing portion 9FL includes: a left-hand upper outer fixing portion 9FUL to be fixed to a left-hand upper base portion 6PUL (see FIG. 3) of the left-hand wall portion of the second support member 6; and a left-hand lower outer fixing portion 9FDL to be fixed to a left-hand lower base portion 6PDL (see FIG. 3) of the left-hand wall portion of the second support member 6. Also, the left-hand elastic arm portion 9GL includes: a left-hand upper elastic arm portion 9GUL that connects the left-hand inner fixing portion 9ML and the left-hand upper outer fixing portion 9FUL to each other; and a left-hand lower elastic arm portion 9GDL that connects the left-hand inner fixing portion 9ML and the left-hand lower outer fixing portion 9FDL to each other. Note that, the left-hand upper outer fixing portion 9FUL and the left-hand lower outer fixing portion 9FDL may be integrally formed like the left-hand inner fixing portion 9ML. Conversely, the left-hand inner fixing portion 9ML may be divided into an upper portion and a lower portion.

Also, in the present embodiment, as illustrated in FIG. 5, the biasing member 9 is attached to the reflector-retaining member 4 and the second support member 6 such that in a front view, the swing axis SA1 is positioned between the left-hand upper elastic arm portion 9GUL and the left-hand lower elastic arm portion 9GDL and the swing axis SA1 is positioned between the right-hand upper elastic arm portion 9GUR and the right-hand lower elastic arm portion 9GDR.

Figure 6B:
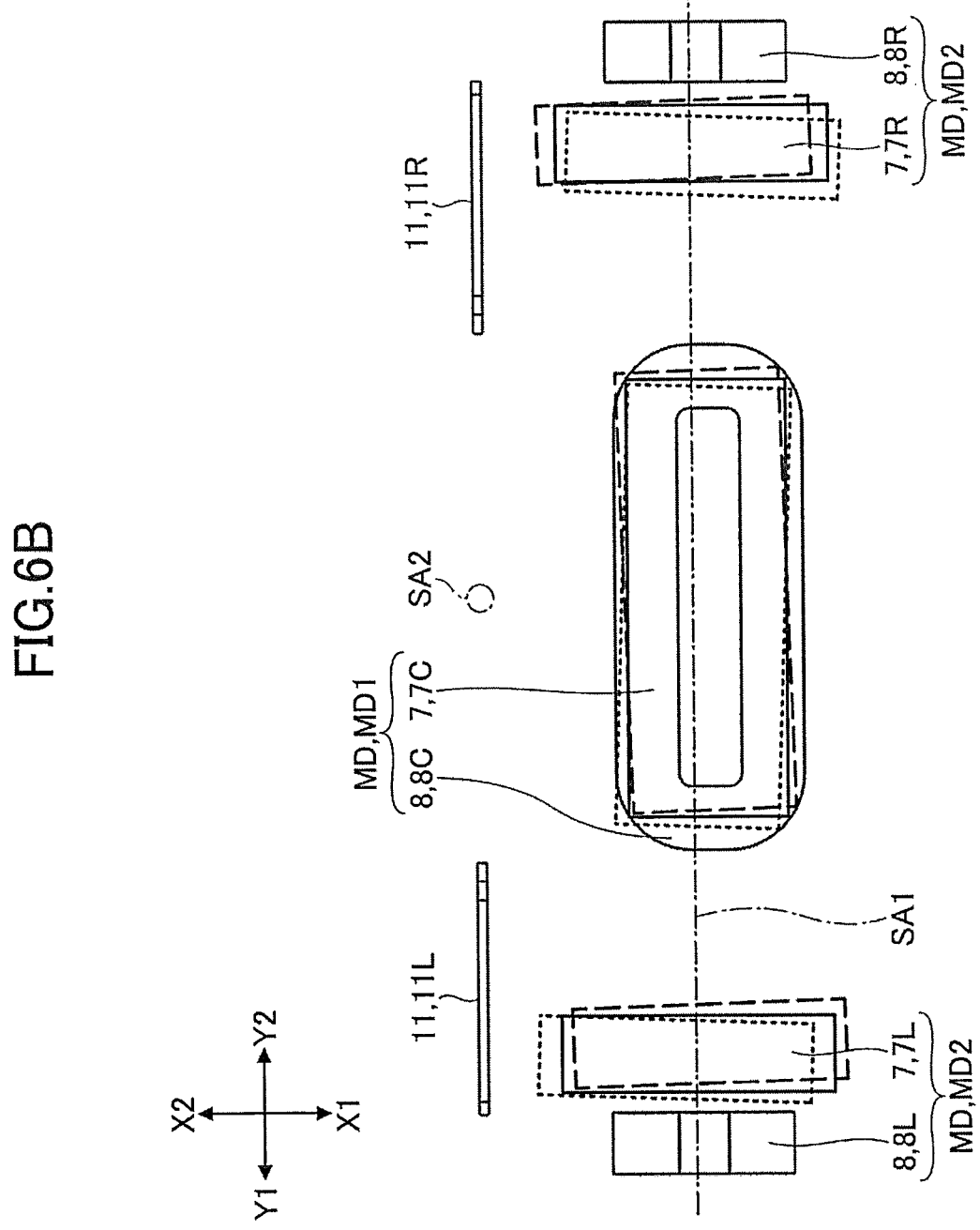
FIG. 6B is a top view of the driving mechanism.

Next, referring to FIG. 6A and FIG. 6B, details of the driving mechanism MD will be described. FIG. 6A and FIG. 6B are detailed drawings of the driving mechanism MD. In FIG. 6A and FIG. 6B, for ease of understanding, the members other than the driving mechanism MD in the reflector driving device 101 are not illustrated. Specifically, FIG. 6A is a right-hand lateral view of the driving mechanism MD. FIG. 6B is a top view of the driving mechanism MD. In FIG. 6A and FIG. 6B, for ease of understanding, the magnetic field-generating member 7 is illustrated only with the outline thereof. Also, FIG. 6A and FIG. 6B use solid lines to illustrate the magnetic field-generating member 7 and the coil 8 in a state in which the driving mechanism MD is in the initial state. The initial state is a state in which both a first driving mechanism MD1 and a second driving mechanism MD2 do not drive; i.e., a state of the driving mechanism MD with no current flowing through any of the middle coil 8C, the left-hand coil 8L, and the right-hand coil 8R.

The driving mechanism MD is a mechanism configured to utilize an electromagnetic force to swing the moving member MB relative to the fixing member FB, and includes the magnetic field-generating member 7 and the coil 8. Specifically, the driving mechanism MD includes: the first driving mechanism MD1 configured to swing the reflector-retaining member 4 about the swing axis SA1; and the second driving mechanism MD2 configured to swing the first support member 5 about the swing axis SA2.

The first driving mechanism MD1 utilizes an electromagnetic force based on a magnetic field generated by the middle magnet 7C and on a current flowing through the middle coil 8C, thereby swinging the reflector-retaining member 4 relative to the first support member 5 about the swing axis SA1.

FIG. 6A, a right-hand lateral view, uses a dotted line to illustrate a state of the middle magnet 7C with the reflector-retaining member 4 swinging clockwise about the swing axis SA1, and uses a dashed line to illustrate a state of the middle magnet 7C with the reflector-retaining member 4 swinging counterclockwise about the swing axis SA1.

The second driving mechanism MD2 utilizes an electromagnetic force based on a magnetic field generated by the left-hand magnet 7L and on a current flowing through the left-hand coil 8L and an electromagnetic force based on a magnetic field generated by the right-hand magnet 7R and on a current flowing through the right-hand coil 8R, thereby swinging the first support member 5 relative to the second support member 6 about the swing axis SA2.

FIG. 6B, a top view, uses a dotted line to illustrate a state of the magnetic field-generating member 7 with the first support member 5 swinging clockwise about the swing axis SA2, and uses a dashed line to illustrate a state of the magnetic field-generating member 7 with the first support member 5 swinging counterclockwise about the swing axis SA2.

The magnetic member 11 is disposed so as to be able to assist a driving force (thrust) by the second driving mechanism MD2. The driving force by the second driving mechanism MD2 at a constant intensity of a current flowing through the left-hand coil 8L and the right-hand coil 8R becomes smaller as displacement of the left-hand magnet 7L from the position of the left-hand magnet 7L in the initial state becomes larger.

Specifically, the driving force by the second driving mechanism MD2 for swinging the first support member 5 about the swing axis SA2 becomes smaller as a swing angle (swing amount) becomes larger. This is because magnetic flux lines penetrating each of the left-hand coil 8L and the right-hand coil 8R become less as a result of movement of the magnetic field-generating member 7.

The magnetic member 11 is disposed so as to be able to compensate for such a reduction in the driving force by the second driving mechanism MD2. In the present embodiment, the magnetic member 11 includes the left-hand magnetic member 11L and the right-hand magnetic member 11R. Specifically, as illustrated in FIG. 6B, the left-hand magnetic member 11L is embedded in the second support member 6 so as to face the left-hand magnet 7L in a direction in which the second biasing member biases the first support member 5 (direction in parallel to the X axis); i.e., the left-hand magnetic member 11L is embedded in the second support member 6 so as to be positioned backward of the left-hand magnet 7L with a gap. Likewise, the right-hand magnetic member 11R is embedded in the second support member 6 so as to face the right-hand magnet 7R in a direction in which the second biasing member biases the first support member 5 (direction in parallel to the X axis); i.e., the right-hand magnetic member 11R is embedded in the second support member 6 so as to be positioned backward of the right-hand magnet 7R with a gap. Note that, as illustrated in FIG. 4A, the magnetic member 11 is partially embedded in the second support member 6 such that the front surface thereof is exposed; however, the magnetic member 11 may be embedded in the second support member 6 such that the front surface thereof is not exposed.

With this configuration, a left-hand attractive force, which is an attractive force acting between the left-hand magnetic member 11L and the left-hand magnet 7L, becomes larger as the left-hand magnet 7L becomes closer to the left-hand magnetic member 11L when the first support member 5 swings clockwise about the swing axis SA2 as indicated by the dotted line in FIG. 6B. Therefore, the left-hand attractive force can compensate for the driving force by the second driving mechanism MD2 that becomes smaller as the left-hand magnet 7L becomes closer to the left-hand magnetic member 11L.

Meanwhile, a right-hand attractive force, which is an attractive force acting between the right-hand magnetic member 11R and the right-hand magnet 7R, becomes larger as the right-hand magnet 7R becomes closer to the right-hand magnetic member 11R when the first support member 5 swings about the swing axis SA2 as indicated by the dashed line in FIG. 6B. Therefore, the right-hand attractive force can compensate for the driving force by the second driving mechanism MD2 that becomes smaller as the right-hand magnet 7R becomes closer to the right-hand magnetic member 11R.

In the present embodiment, the magnetic member 11 is configured such that a resultant force of the left-hand attractive force and the right-hand attractive force and of the driving force by the second driving mechanism MD2 at a constant intensity of a current flowing through the left-hand coil 8L and the right-hand coil 8R becomes approximately constant irrespective of the swing angle (swing amount) of the first support member 5. This configuration readily ensures linearity of a relationship between the intensity of a current flowing through the left-hand coil 8L and the right-hand coil 8R, and the driving force by the second driving mechanism MD2, thereby being able to enhance stability of product characteristics of the reflector driving device 101. Also, since this configuration can accept a higher spring constant of the spring member of the biasing member 9, it is possible to suppress changes of the product characteristics of the reflector driving device 101 by the influence of gravity. Also, since this configuration can accept a higher spring constant of the spring member of the biasing member 9, it is possible to readily adjust resonance frequency of the moving member MB. Also, this configuration is configured such that a restoring force of the biasing member 9 becomes larger than the attractive force acting between the magnetic member 11 and the magnetic field-generating member 7. In other words, this configuration is configured such that when supply of a current to the left-hand coil 8L and the right-hand coil 8R is stopped, the moving member MB returns to a position in the initial state by the restoring force of the biasing member 9. Therefore, this configuration can prevent the magnetic field-generating member 7 from attaching to and remaining attached to the magnetic member 11 by the attractive force acting between the magnetic member 11 and the magnetic field-generating member 7.

Figure 7A:
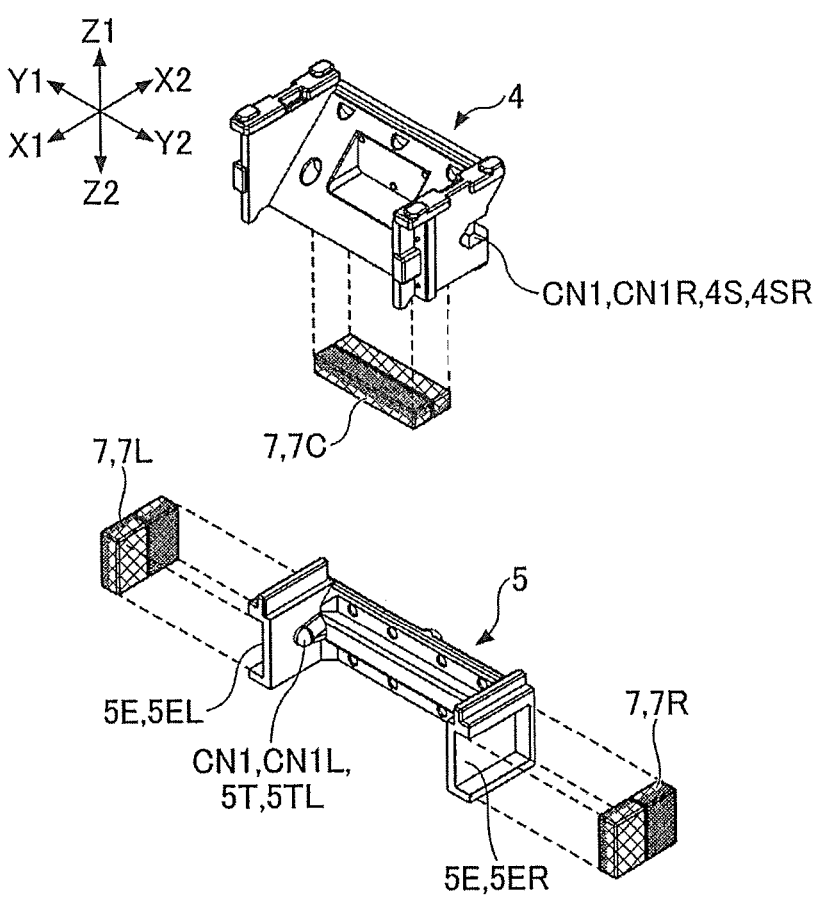
FIG. 7A is an exploded perspective front view of a moving member as viewed from the upper right diagonal direction.
Figure 7B:
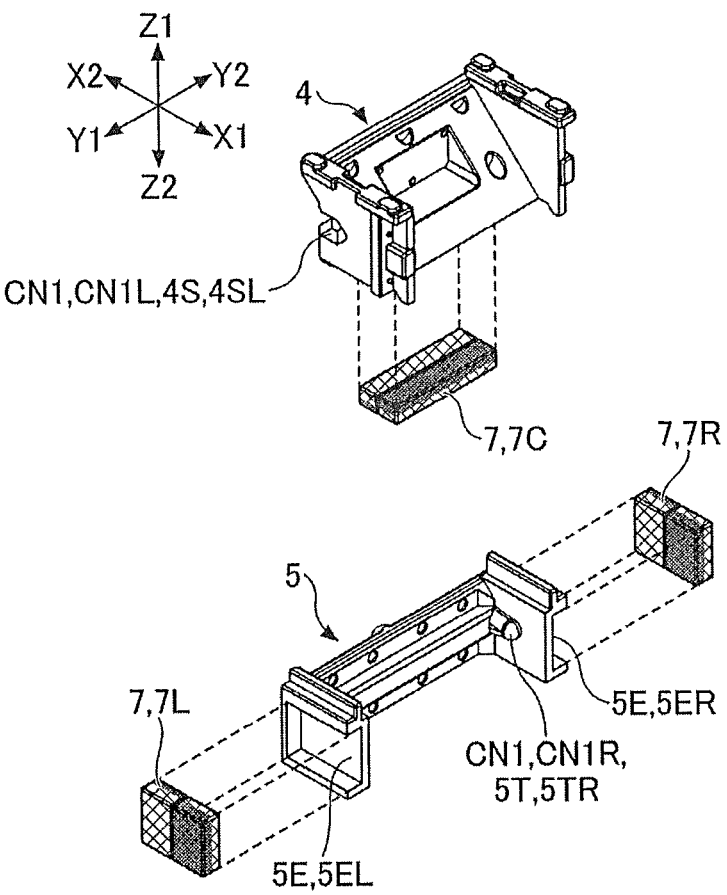
FIG. 7B is an exploded perspective front view of the moving member as viewed from the upper left diagonal direction.
Figure 7C:
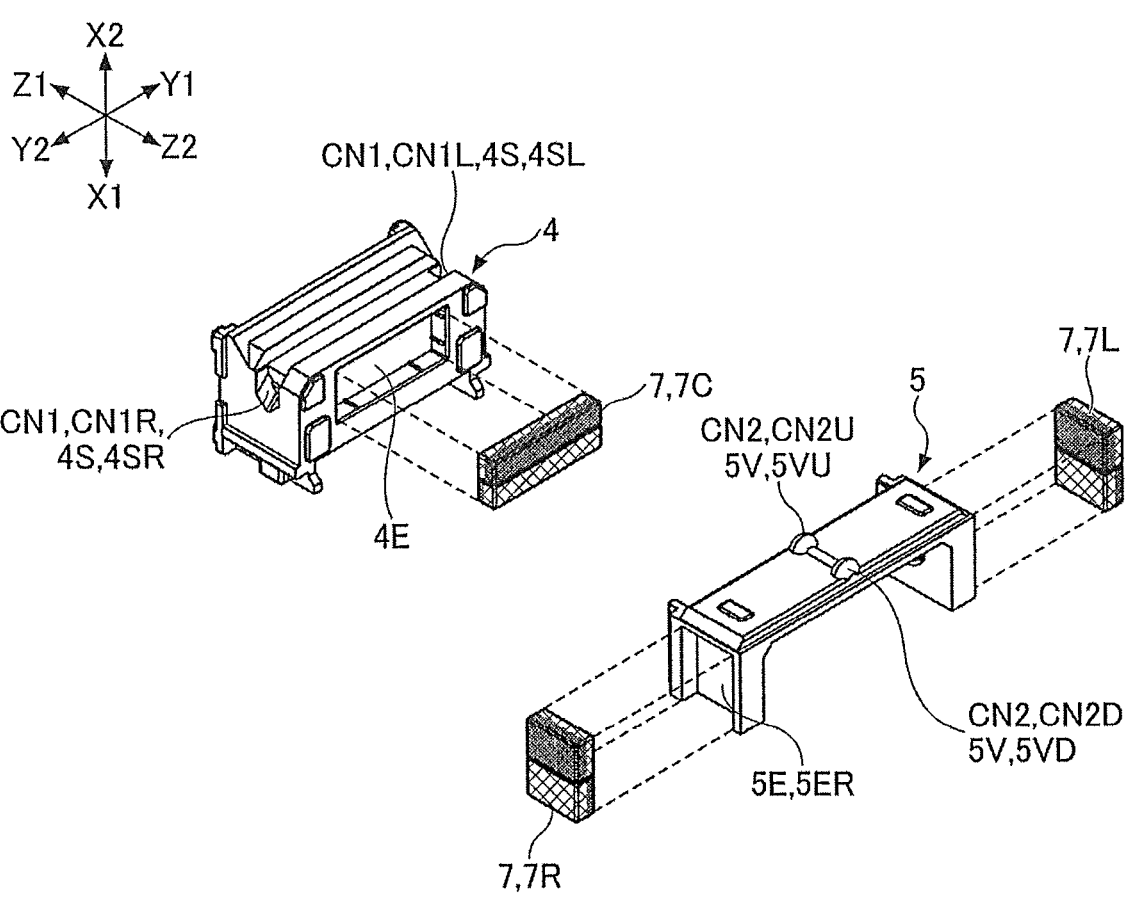
FIG. 7C is an exploded perspective back view of the moving member as viewed from the lower right diagonal direction.

Next, referring to FIG. 7A to FIG. 7C, details of the moving member MB will be described. FIG. 7A to FIG. 7C are exploded perspective views of the moving member MB as viewed from three different angles. Specifically, FIG. 7A is an exploded perspective front view of the moving member MB as viewed from the upper right diagonal direction. FIG. 7B is an exploded perspective front view of the moving member MB as viewed from the upper left diagonal direction. FIG. 7C is an exploded perspective back view of the moving member MB as viewed from the lower right diagonal direction.

The reflector-retaining member 4 is provided with a recessed portion 4E that can house the magnetic field-generating member 7. Specifically, as illustrated in FIG. 7C, the bottom wall portion of the reflector-retaining member 4 is provided with the recessed portion 4E that can house the middle magnet 7C.

The first support member 5 is also provided with a recessed portion 5E that can house the magnetic field-generating member 7. Specifically, as illustrated in FIG. 7B, the left-hand wall portion of the first support member 5 is provided with a left-hand recessed portion 5EL that can house the left-hand magnet 7L. Also, as illustrated in FIG. 7A, the right-hand wall portion of the first support member 5 is provided with a right-hand recessed portion 5ER that can house the right-hand magnet 7R.

The reflector-retaining member 4 and the first support member 5 are connected by a first shank portion CN1 so that the reflector-retaining member 4 becomes swingable relative to the first support member 5.

The first shank portion CN1 is a mechanism configured to connect the reflector-retaining member 4 and the first support member 5 to each other so that the reflector-retaining member 4 becomes swingable relative to the first support member 5. The first shank portion CN1 includes a recessed portion 4S formed in the reflector-retaining member 4 and a projecting portion 5T formed in the first support member 5.

Specifically, the first shank portion CN1 includes a left-hand shank portion CN1L and a right-hand shank portion CN1R. The left-hand shank portion CN1L includes: a left-hand recessed portion 4SL formed in a back-side end portion on an outer side (left-hand side) of the left-hand wall portion of the reflector-retaining member 4; and a left-hand projecting portion 5TL formed on an inner side (right-hand side) of the left-hand wall portion of the first support member 5.

Likewise, the right-hand shank portion CN1R includes: a right-hand recessed portion 4SR formed in a back-side end portion on an outer side (right-hand side) of the right-hand wall portion of the reflector-retaining member 4; and a right-hand projecting portion 5TR formed on an inner side (left-hand side) of the right-hand wall portion of the first support member 5.

Figure 8A:
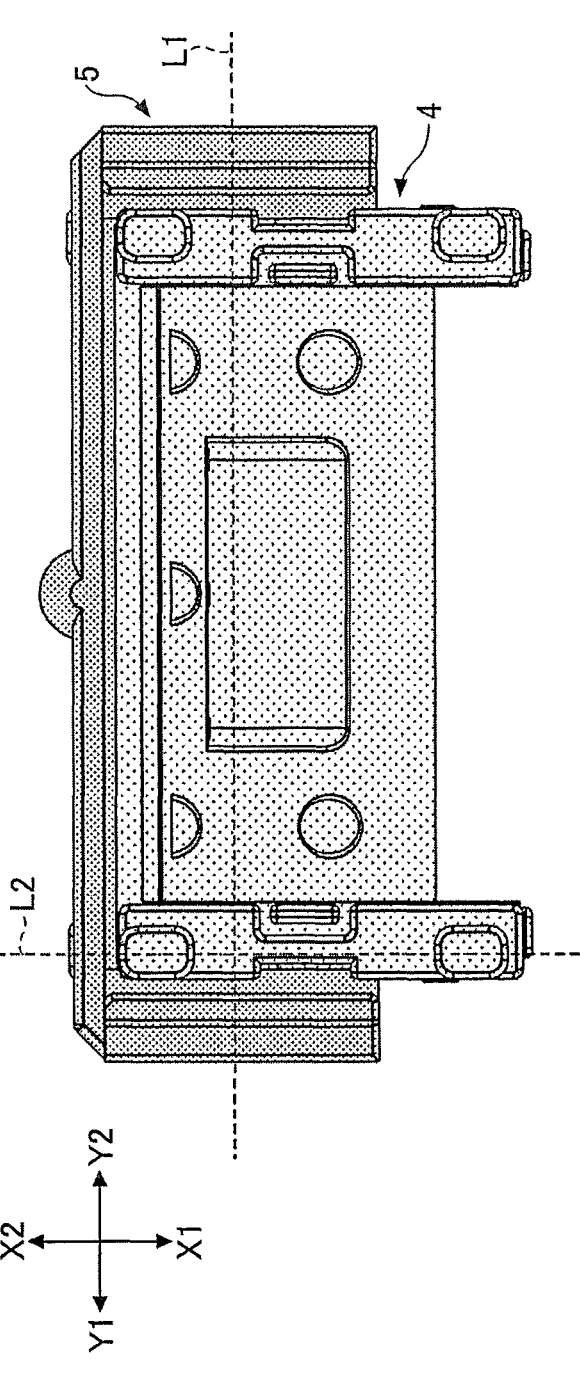
FIG. 8A is a top view of a combination of the reflector-retaining member and a first support member.
Figure 8B:
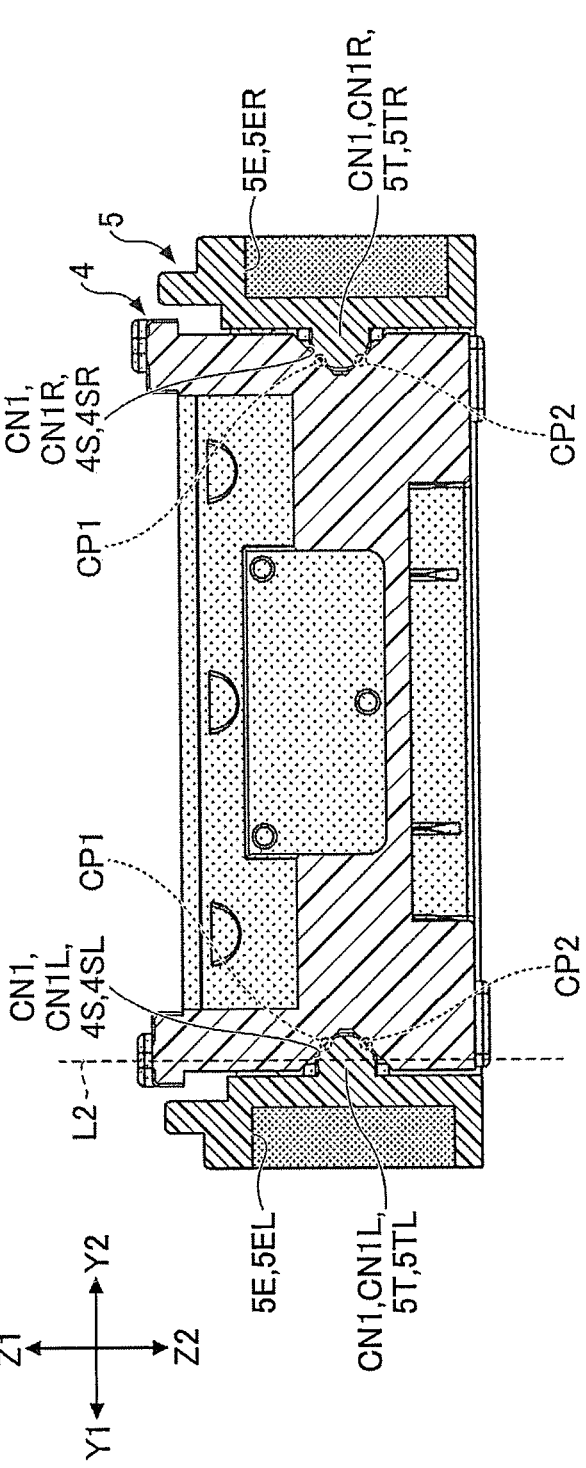
FIG. 8B is a cross-sectional view of the combination of the reflector-retaining member and the first support member.
Figure 8C:
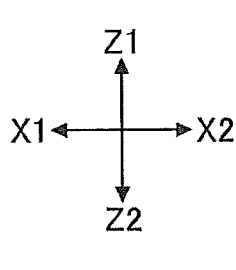
FIG. 8C is a cross-sectional view of the combination of the reflector-retaining member and the first support member.
Figure 8C:
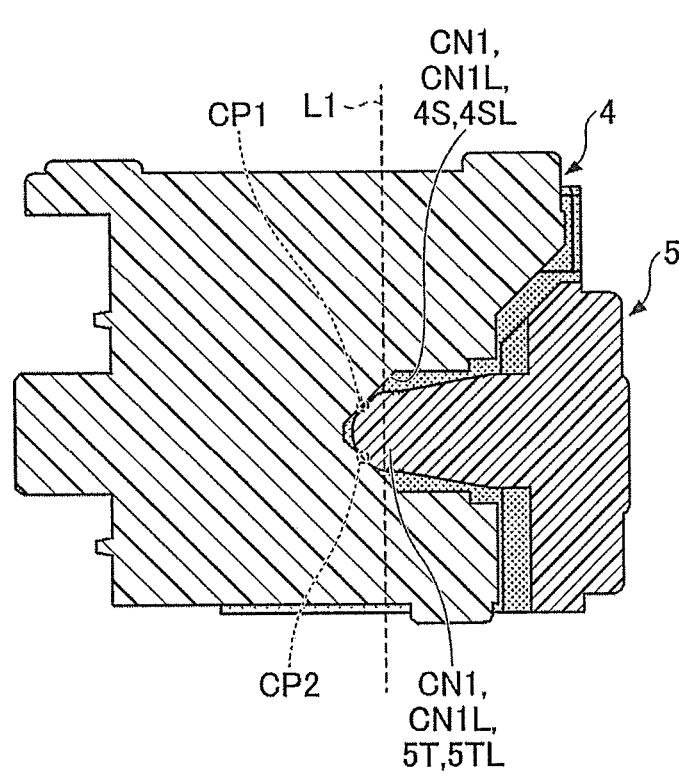

Here, referring to FIG. 8A to FIG. 8C, a state of the first shank portion CN1 with the reflector-retaining member 4 and the first support member 5 being combined will be described. FIG. 8A to FIG. 8C are detailed views of combinations of the reflector-retaining member 4 and the first support member 5. Specifically, FIG. 8A is a top view of the combination of the reflector-retaining member 4 and the first support member 5. FIG. 8B is a cross-sectional view of the combination of the reflector-retaining member 4 and the first support member 5 in a virtual plane in parallel to a YZ plane including a line segment L1 in FIG. 8A. FIG. 8C is a cross-sectional view of the combination of the reflector-retaining member 4 and the first support member 5 in a virtual plane in parallel to an XZ plane including a line segment L2 in FIG. 8A. Note that, in FIG. 8A to FIG. 8C, for ease of understanding, the reflector-retaining member 4 is given a rough dot pattern, and the first support member 5 is given a fine dot pattern.

As illustrated in FIG. 8B and FIG. 8C, the left-hand projecting portion 5TL is formed so as to have a tip of an end-quarter of a spherical body, and the left-hand recessed portion 4SL is formed so as to have two inclined surfaces to contact the left-hand projecting portion 5TL at two points (a first contact point CP1 and a second contact point CP2) (so as to form a V-shaped groove). Each of the two inclined surfaces is formed to be inclined with respect to each of the X axis, the Y axis, and the Z axis. The same applies to the right-hand recessed portion 4SR and the right-hand projecting portion 5TR.

This configuration can suppress the reflector-retaining member 4 from displacing in an up-and-down direction and in a left-and-right direction when the reflector-retaining member 4 swings relative to the first support member 5.

Also, as illustrated in FIG. 7A to FIG. 7C, the first support member 5 and the second support member 6 are connected by a second shank portion CN2 so that the first support member 5 becomes swingable relative to the second support member 6.

The second shank portion CN2 is a mechanism configured to connect the first support member 5 and the second support member 6 to each other so that the first support member 5 becomes swingable relative to the second support member 6. The second shank portion CN2 includes: a projecting portion 5V formed in the first support member 5; and a recessed portion 6S (see FIG. 4A) formed in the second support member 6.

Specifically, the second shank portion CN2 includes an upper shank portion CN2U and a lower shank portion CN2D. The upper shank portion CN2U includes: an upper projecting portion 5VU formed in an upper-end middle portion on an outer side (back side) of the back-side wall portion of the first support member 5; and an upper recessed portion 6SU formed in a middle-upper portion on an inner side (front side) of the back-side wall portion of the second support member 6.

Likewise, the lower shank portion CN2D includes a lower projecting portion 5VD formed in a lower-end middle portion on an outer side (back side) of the back-side wall portion of the first support member 5; and a lower recessed portion 6SD formed in a middle-lower portion on an inner side (front side) of the back-side wall portion of the second support member 6.

Figure 9A:
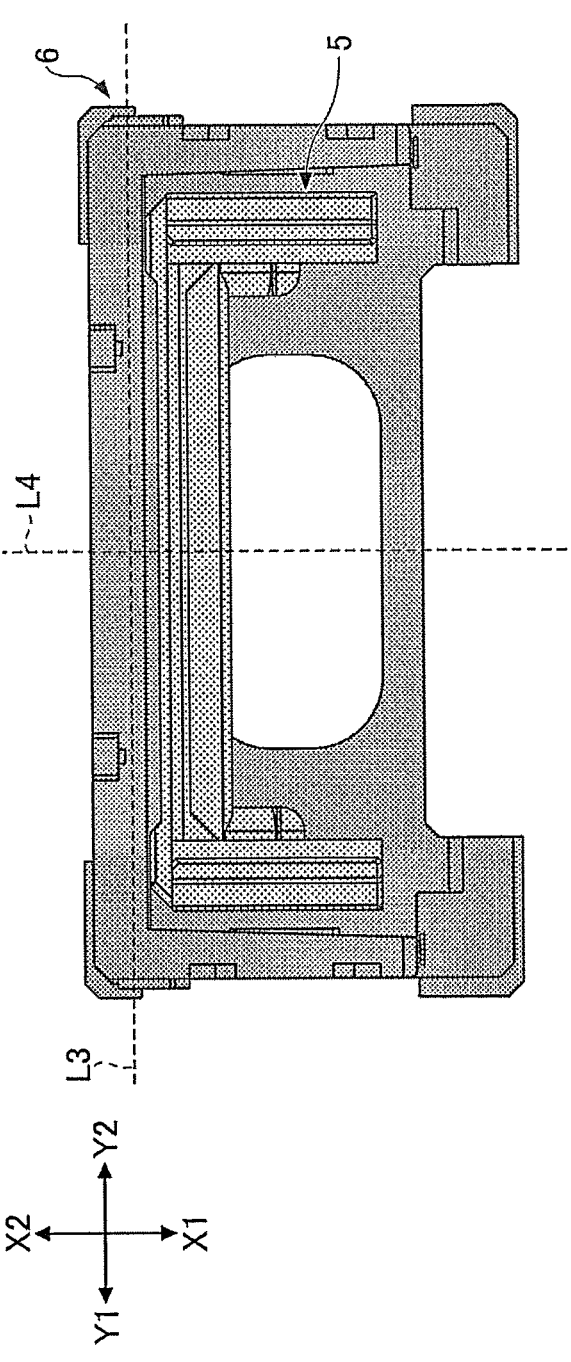
FIG. 9A is a top view of a combination of the first support member and a second support member.
Figure 9B:
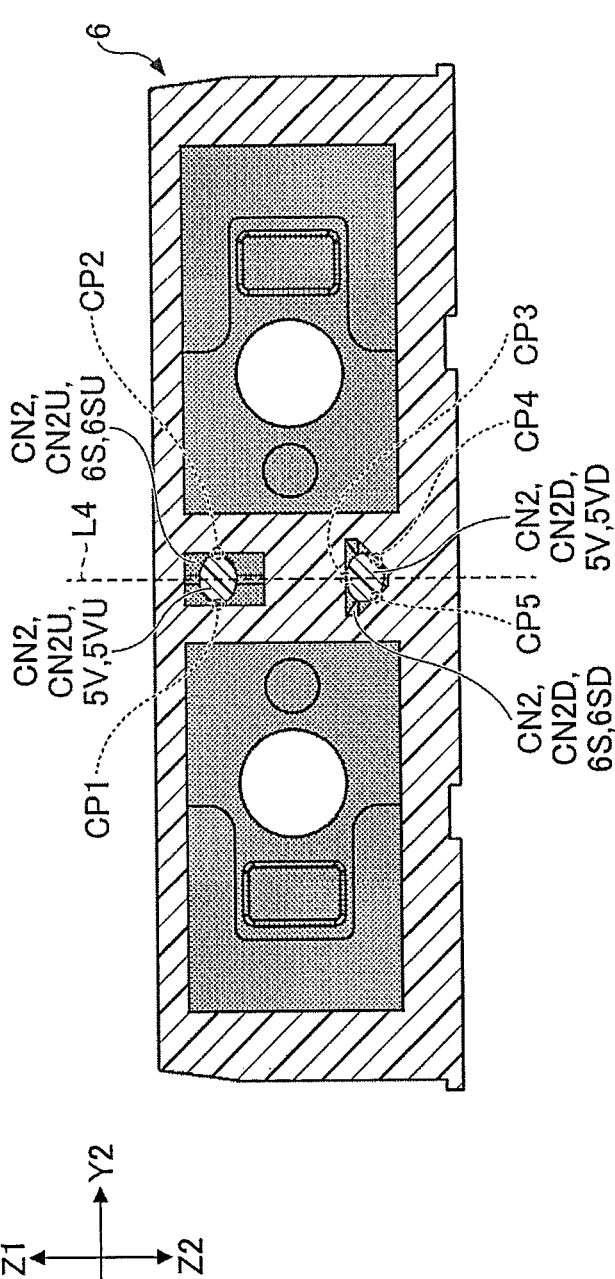
FIG. 9B is a cross-sectional view of the combination of the first support member and the second support member.
Figure 9C:
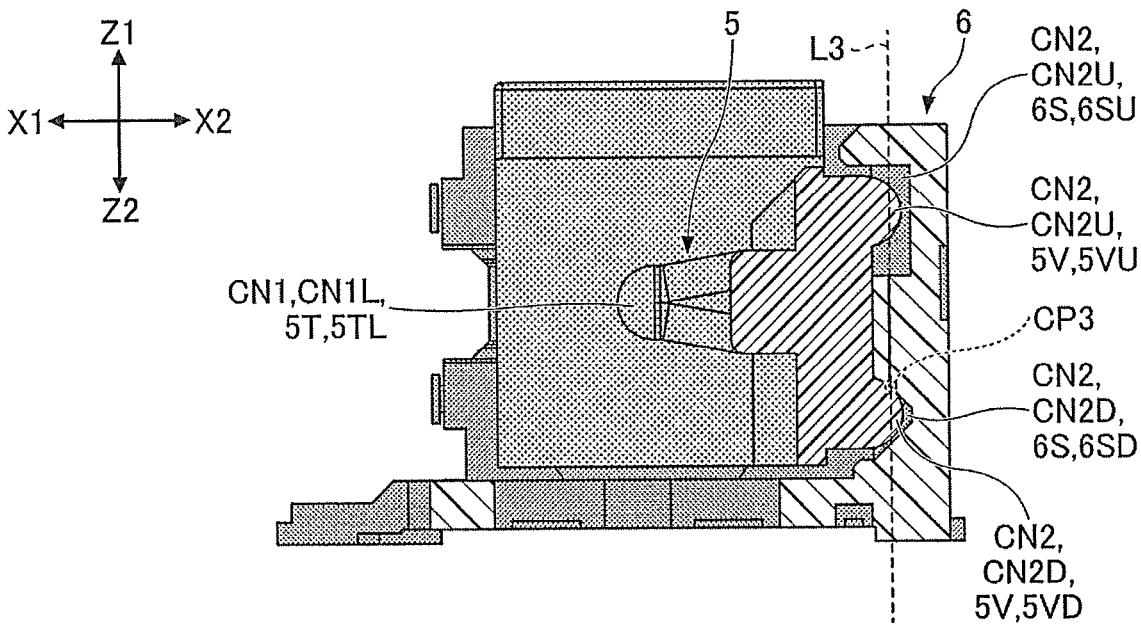
FIG. 9C is a cross-sectional view of the combination of the first support member and the second support member.

Here, referring to FIG. 9A to FIG. 9C, a state of the second shank portion CN2 with the first support member 5 and the second support member 6 being combined will be described. FIG. 9A to FIG. 9C are detailed views of combinations of the first support member 5 and the second support member 6. Specifically, FIG. 9A is a top view of the combination of the first support member 5 and the second support member 6. FIG. 9B is a cross-sectional view of the combination of the first support member 5 and the second support member 6 in a virtual plane in parallel to a YZ plane including a line segment L3 in FIG. 9A. FIG. 9C is a cross-sectional view of the combination of the first support member 5 and the second support member 6 in a virtual plane in parallel to an XZ plane including a line segment L4 in FIG. 9A. Note that, in FIG. 9A to FIG. 9C, for ease of understanding, the first support member 5 is given a fine dot pattern, and the second support member 6 is given a finer dot pattern.

As illustrated in FIG. 9B and FIG. 9C, the upper projecting portion 5VU is formed so as to have a tip of a hemispherical body, and the upper recessed portion 6SU is formed so as to have two inclined surfaces to contact the upper projecting portion 5VU at two points (the first contact point CP1 and the second contact point CP2) (so as to form a V-shaped groove). Each of the two inclined surfaces is formed to be inclined with respect to each of the X axis and the Y axis.

This configuration can suppress the first support member 5 from displacing in the left-and-right direction when the first support member 5 swings relative to the second support member 6.

The lower projecting portion 5VD is formed so as to have a tip of a hemispherical body, and the lower recessed portion 6SD is formed so as to have three inclined surfaces (so as to form a groove of a generally inverted triangular frustum shape) to contact the lower projecting portion 5VD at three points (a third contact point CP3 to a fifth contact point CP5). The groove of the generally inverted triangular frustum shape may be a groove of a generally inverted pyramidal shape (generally quadrangular frustum shape). The three inclined surfaces are formed to be inclined with respect to each of the X axis, the Y axis, and the Z axis.

This configuration can suppress the first support member 5 from displacing in the up-and-down direction and in the left-and-right direction when the first support member 5 swings relative to the second support member 6.

Figure 10A:
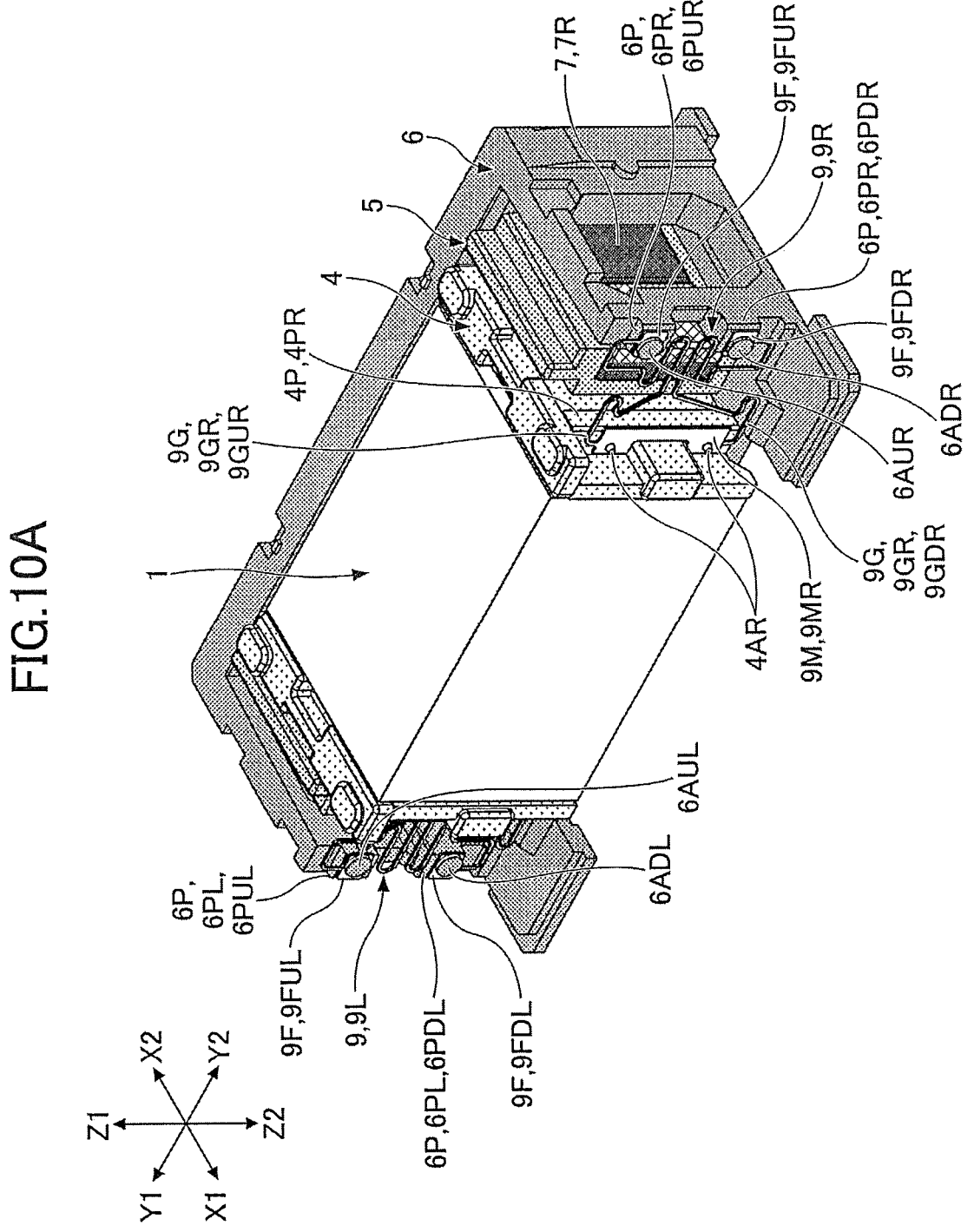
FIG. 10A is a perspective front view of the biasing member as viewed from the upper right diagonal direction, with the biasing member being disposed between the reflector-retaining member and the second support member.
Figure 10B:
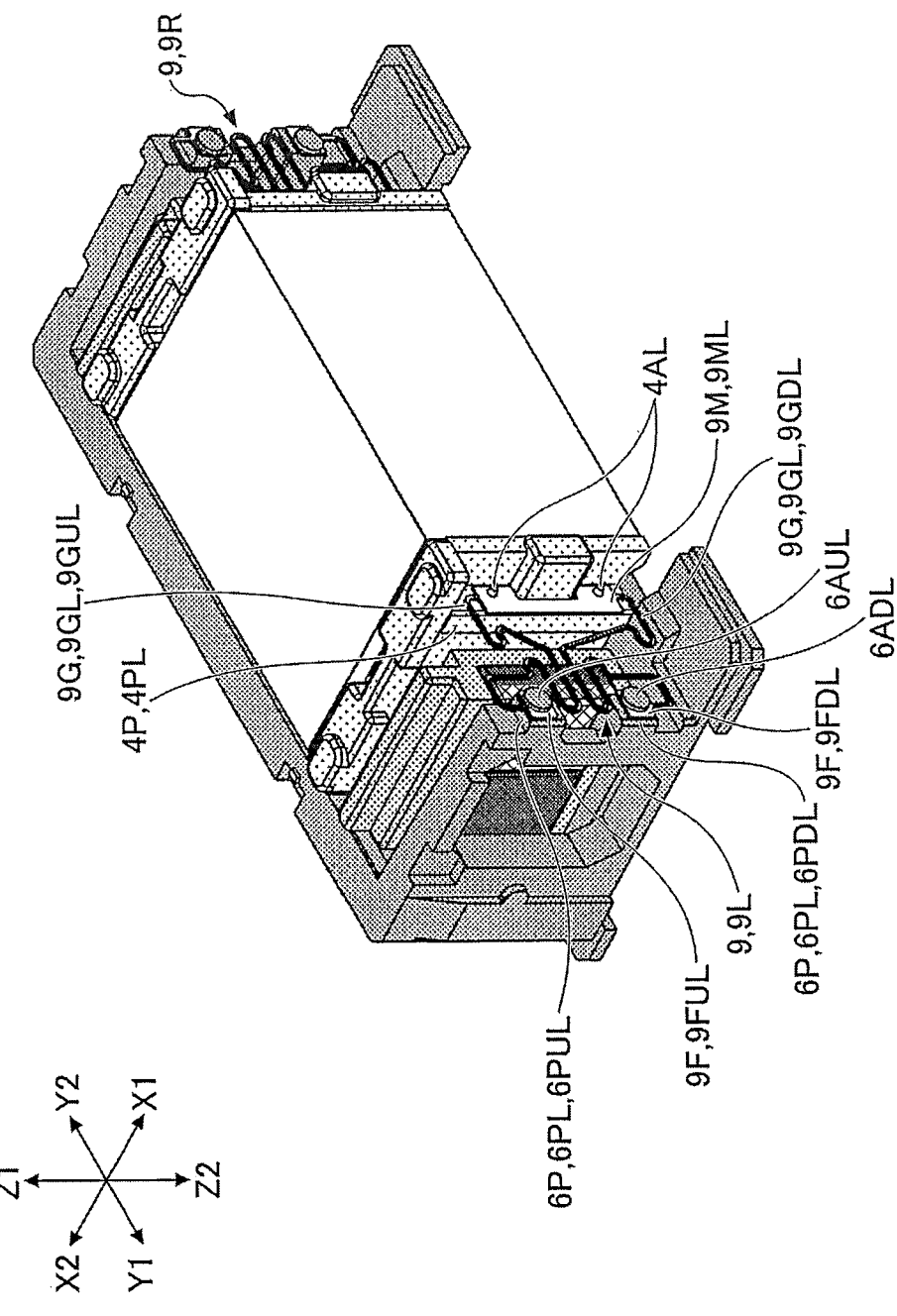
FIG. 10B is a perspective front view of the biasing member as viewed from the upper left diagonal direction, with the biasing member being disposed between the reflector-retaining member and the second support member.
Figure 11:
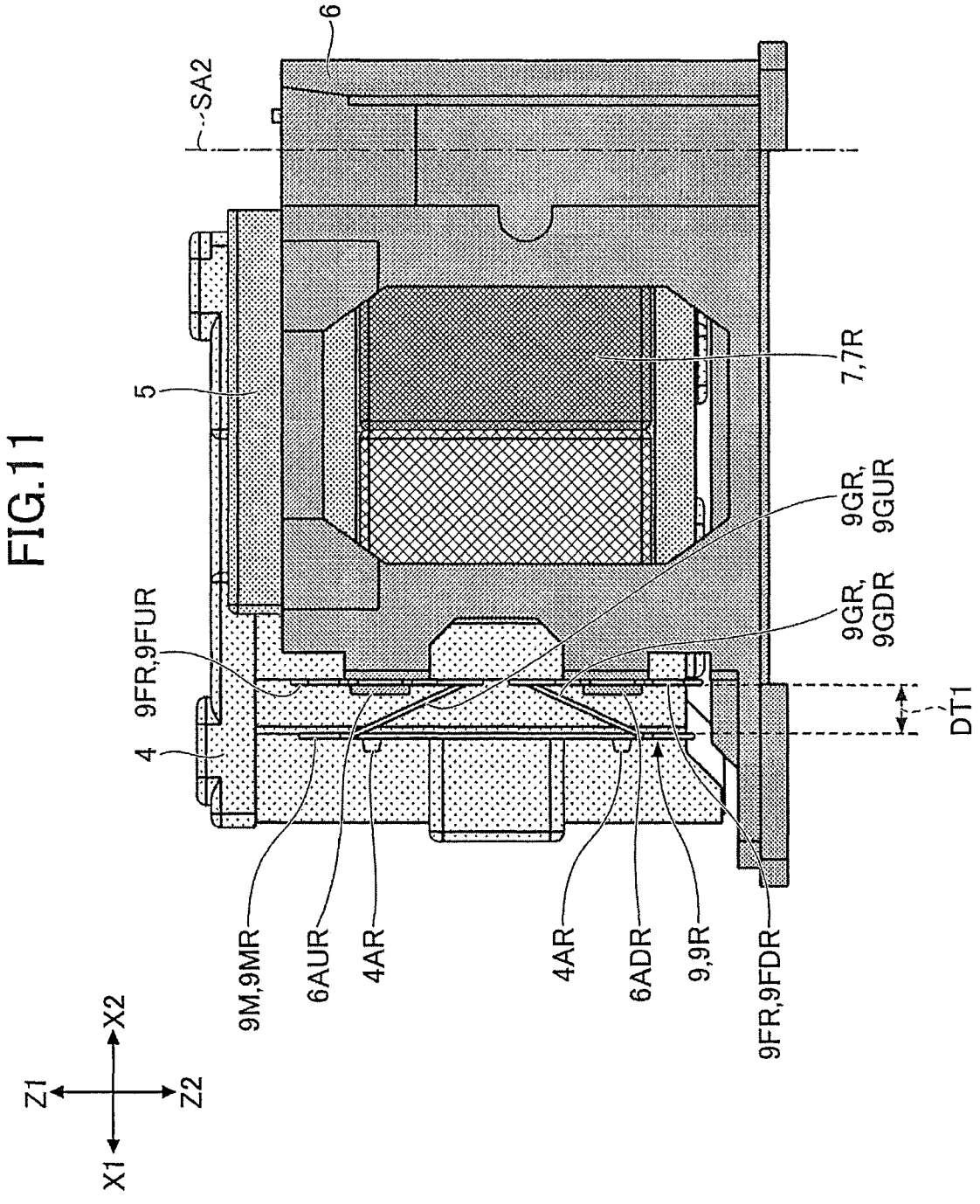
FIG. 11 is a right-hand lateral view of the biasing member disposed between the reflector-retaining member and the second support member.

Next, referring to FIG. 10A, FIG. 10B, and FIG. 11, details of the biasing member 9 will be described. FIG. 10A and FIG. 10B are perspective views of the biasing member 9 disposed between the reflector-retaining member 4 and the second support member 6. Specifically, FIG. 10A is a perspective front view from the upper right diagonal direction, and FIG. 10B is a perspective front view from the upper left diagonal direction. FIG. 11 is a right-hand lateral view of the biasing member 9 disposed between the reflector-retaining member 4 and the second support member 6. Note that, in FIG. 10A, FIG. 10B, and FIG. 11, for ease of understanding, the reflector-retaining member 4 is given a rough dot pattern, the first support member 5 is given a fine dot pattern, and the second support member 6 is given a finer dot pattern.

As described above, the biasing member 9 includes the right-hand spring member 9R and the left-hand spring member 9L that are disposed to be spaced from each other. Specifically, the right-hand spring member 9R includes: the right-hand inner fixing portion 9MR to be fixed to the right-hand base portion 4PR of the right-hand wall portion of the reflector-retaining member 4; the right-hand upper outer fixing portion 9FUR to be fixed to the right-hand upper base portion 6PUR of the right-hand wall portion of the second support member 6; the right-hand lower outer fixing portion 9FDR to be fixed to the right-hand lower base portion 6PDR of the right-hand wall portion of the second support member 6; the right-hand upper elastic arm portion 9GUR that connects the right-hand inner fixing portion 9MR and the right-hand upper outer fixing portion 9FUR to each other; and the right-hand lower elastic arm portion 9GDR that connects the right-hand inner fixing portion 9MR and the right-hand lower outer fixing portion 9FDR to each other.

In the present embodiment, the right-hand base portion 4PR of the right-hand wall portion of the reflector-retaining member 4 includes two round-shaped projecting bulges 4AR that project frontward (X1 direction) from the front (X1-side) surface. The bulges 4AR correspond to two through-holes formed in the right-hand inner fixing portion 9MR.

Specifically, the right-hand inner fixing portion 9MR is attached and fixed to the right-hand base portion 4PR including the bulges 4AR. Fixation of the right-hand inner fixing portion 9MR to the right-hand base portion 4PR is realized through application of an adhesive to the bulges 4AR inserted into the through-holes formed in the right-hand inner fixing portion 9MR.

Also, in the present embodiment, the right-hand upper base portion 6PUR of the right-hand wall portion of the second support member 6 includes a round-shaped projecting right-hand upper bulge 6AUR that projects frontward (X1 direction) from the front (X1-side) surface. The right-hand lower base portion 6PDR of the right-hand wall portion of the second support member 6 includes a round-shaped projecting right-hand lower bulge 6ADR that projects frontward (X1 direction) from the front (X1-side) surface. The right-hand upper bulge 6AUR corresponds to a through-hole formed in the right-hand upper outer fixing portion 9FUR, and the right-hand lower bulge 6ADR corresponds to a through-hole formed in the right-hand lower outer fixing portion 9FDR.

Specifically, the right-hand upper outer fixing portion 9FUR is attached and fixed to the right-hand upper base portion 6PUR formed in the right-hand upper bulge 6AUR. Fixation of the right-hand upper outer fixing portion 9FUR to the right-hand upper base portion 6PUR is realized through thermal caulking of the right-hand upper bulge 6AUR inserted into the through-hole formed in the right-hand upper outer fixing portion 9FUR. The right-hand lower outer fixing portion 9FDR is attached and fixed to the right-hand lower base portion 6PDR including the right-hand lower bulge 6ADR. Fixation of the right-hand lower outer fixing portion 9FDR to the right-hand lower base portion 6PDR is realized through thermal caulking of the right-hand lower bulge 6ADR inserted into the through-hole formed in the right-hand lower outer fixing portion 9FDR.

In FIG. 10A and FIG. 10B, the right-hand upper bulge 6AUR and the right-hand lower bulge 6ADR are illustrated in a state in which the tips thereof are deformed after thermal caulking. The same applies to other drawings illustrating the right-hand upper bulge 6AUR and the right-hand lower bulge 6ADR.

Likewise, the left-hand spring member 9L includes: the left-hand inner fixing portion 9ML to be fixed to the left-hand base portion 4PL of the left-hand wall portion of the reflector-retaining member 4; the left-hand upper outer fixing portion 9FUL to be fixed to the left-hand upper base portion 6PUL of the left-hand wall portion of the second support member 6; the left-hand lower outer fixing portion 9FDL to be fixed to the left-hand lower base portion 6PDL of the left-hand wall portion of the second support member 6; the left-hand upper elastic arm portion 9GUL that connects the left-hand inner fixing portion 9ML and the left-hand upper outer fixing portion 9FUL to each other; and the left-hand lower elastic arm portion 9GDL that connects the left-hand inner fixing portion 9ML and the left-hand lower outer fixing portion 9FDL to each other.

In the present embodiment, the left-hand base portion 4PL of the left-hand wall portion of the reflector-retaining member 4 includes two round-shaped projecting bulges 4AL that project frontward (X1 direction) from the front (X1-side) surface. The bulges 4AL correspond to two through-holes formed in the left-hand inner fixing portion 9ML.

Specifically, the left-hand inner fixing portion 9ML is attached and fixed to the left-hand base portion 4PL including the bulges 4AL. Fixation of the left-hand inner fixing portion 9ML to the left-hand base portion 4PL is realized through application of an adhesive to the bulges 4AL inserted into the through-holes formed in the left-hand inner fixing portion 9ML.

Also, in the present embodiment, the left-hand upper base portion 6PUL of the left-hand wall portion of the second support member 6 includes a round-shaped projecting left-hand upper bulge GAUL that projects frontward (X1 direction) from the front (X1-side) surface, and the left-hand lower base portion 6PDL of the left-hand wall portion of the second support member 6 includes a round-shaped projecting left-hand lower bulge 6ADL that projects frontward (X1 direction) from the front (X1-side) surface. The left-hand upper bulge GAUL corresponds to a through-hole formed in the left-hand upper outer fixing portion 9FUL, and the left-hand lower bulge 6ADL corresponds to a through-hole formed in the left-hand lower outer fixing portion 9FDL.

Specifically, the left-hand upper outer fixing portion 9FUL is attached and fixed to the left-hand upper base portion 6PUL formed in the left-hand upper bulge 6AUL. Fixation of the left-hand upper outer fixing portion 9FUL to the left-hand upper base portion 6PUL is realized through thermal caulking of the left-hand upper bulge GAUL inserted into a through-hole formed in the left-hand upper outer fixing portion 9FUL. The left-hand lower outer fixing portion 9FDL is attached and fixed to the left-hand lower base portion 6PDL including the left-hand lower bulge 6ADL. Fixation of the left-hand lower outer fixing portion 9FDL to the left-hand lower base portion 6PDL is realized through thermal caulking of the left-hand lower bulge 6ADL inserted into the through-hole formed in the left-hand lower outer fixing portion 9FDL.

In FIG. 10A and FIG. 10B, the left-hand upper bulge GAUL and the left-hand lower bulge 6ADL are illustrated in a state in which the tips thereof are deformed after thermal caulking. The same applies to other drawings illustrating the left-hand upper bulge GAUL and the left-hand lower bulge 6ADL.

Also, as illustrated in FIG. 11, the right-hand spring member 9R is fixed to the reflector-retaining member 4 and the second support member 6 such that the right-hand inner fixing portion 9MR and the right-hand outer fixing portion 9FR become approximately parallel to each other in the initial state in which both of the first driving mechanism MD1 and the second driving mechanism MD2 do not drive. Specifically, in the initial state, the right-hand inner fixing portion 9MR and the right-hand outer fixing portion 9FR are disposed to be spaced with a gap DT1 in the X-axis direction and are fixed to the reflector-retaining member 4 and the second support member 6 so as to be approximately parallel to each other along the Z-axis direction. In other words, the reflector-retaining member 4 and the second support member 6 are configured such that an attachment surface of the reflector-retaining member 4 to which the right-hand inner fixing portion 9MR is to be attached and an attachment surface of the second support member 6 to which the right-hand outer fixing portion 9FR is to be attached become approximately parallel to each other in the initial state. The same applies to the left-hand spring member 9L.

With this arrangement, in the initial state, the biasing member 9 including the left-hand spring member 9L and the right-hand spring member 9R can bias the reflector-retaining member 4 backward (X2 side) and at the same time can bias the first support member 5 backward (X2 side). That is, the biasing member 9 can serve as the first biasing member and at the same time can serve as the second biasing member. In other words, the biasing member 9 can have both of the function as the first biasing member and the function as the second biasing member.

Figure 12:
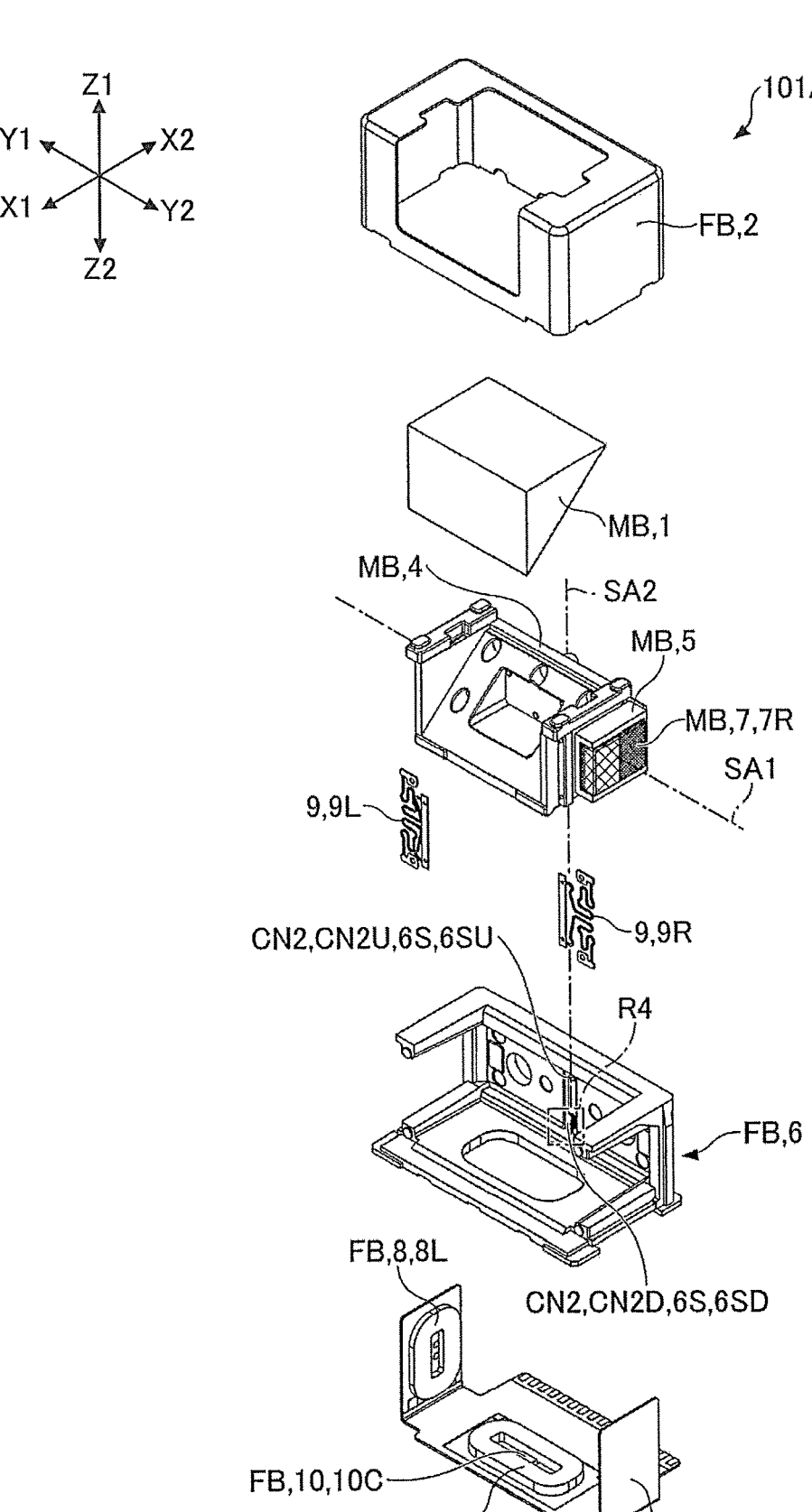
FIG. 12 is an exploded perspective view of another configuration example of the reflector driving device.
Figure 13A:
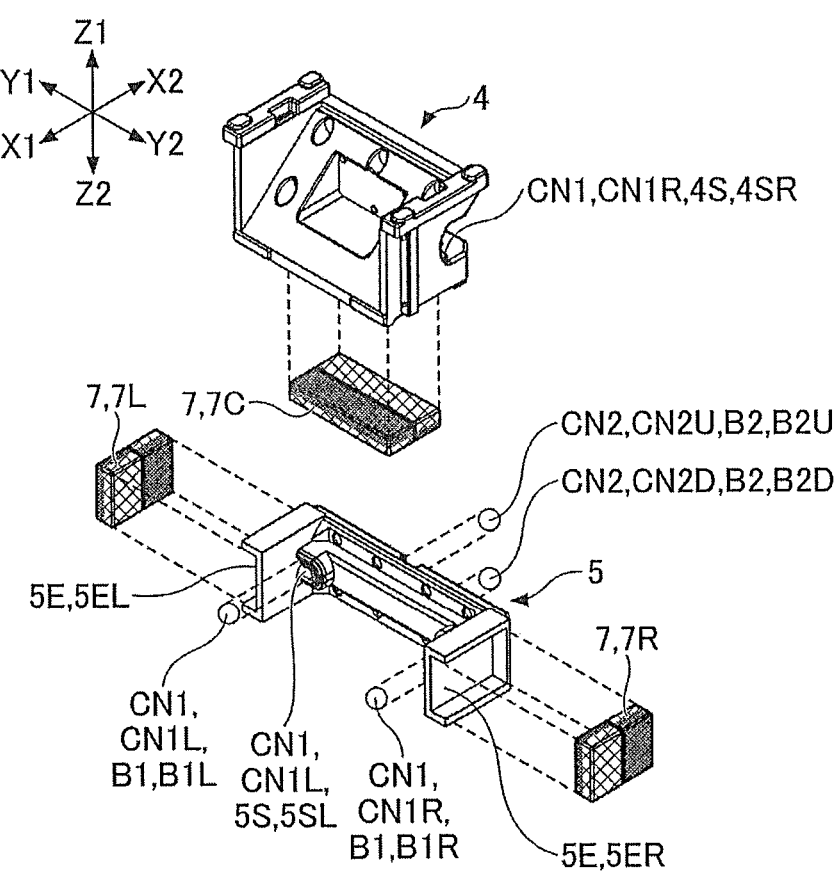
FIG. 13A is an exploded perspective front view of the moving member of the reflector driving device of FIG. 12, as viewed from the upper right diagonal direction.
Figure 13B:
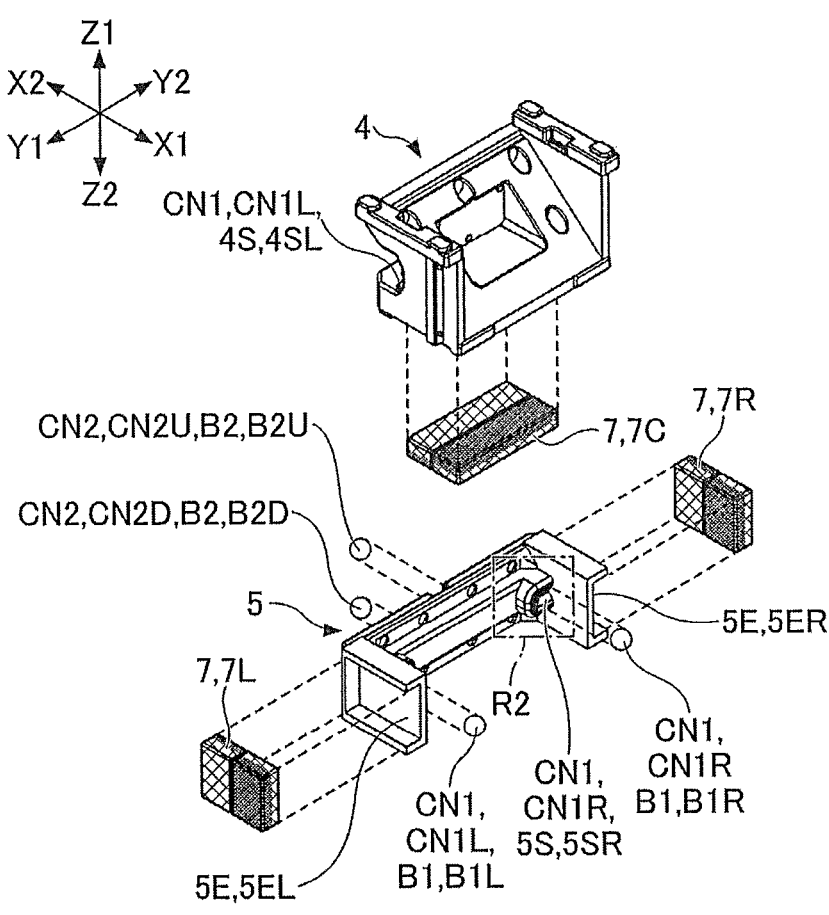
FIG. 13B is an exploded perspective front view of the moving member of the reflector driving device of FIG. 12, as viewed from the upper left diagonal direction.
Figure 13C:
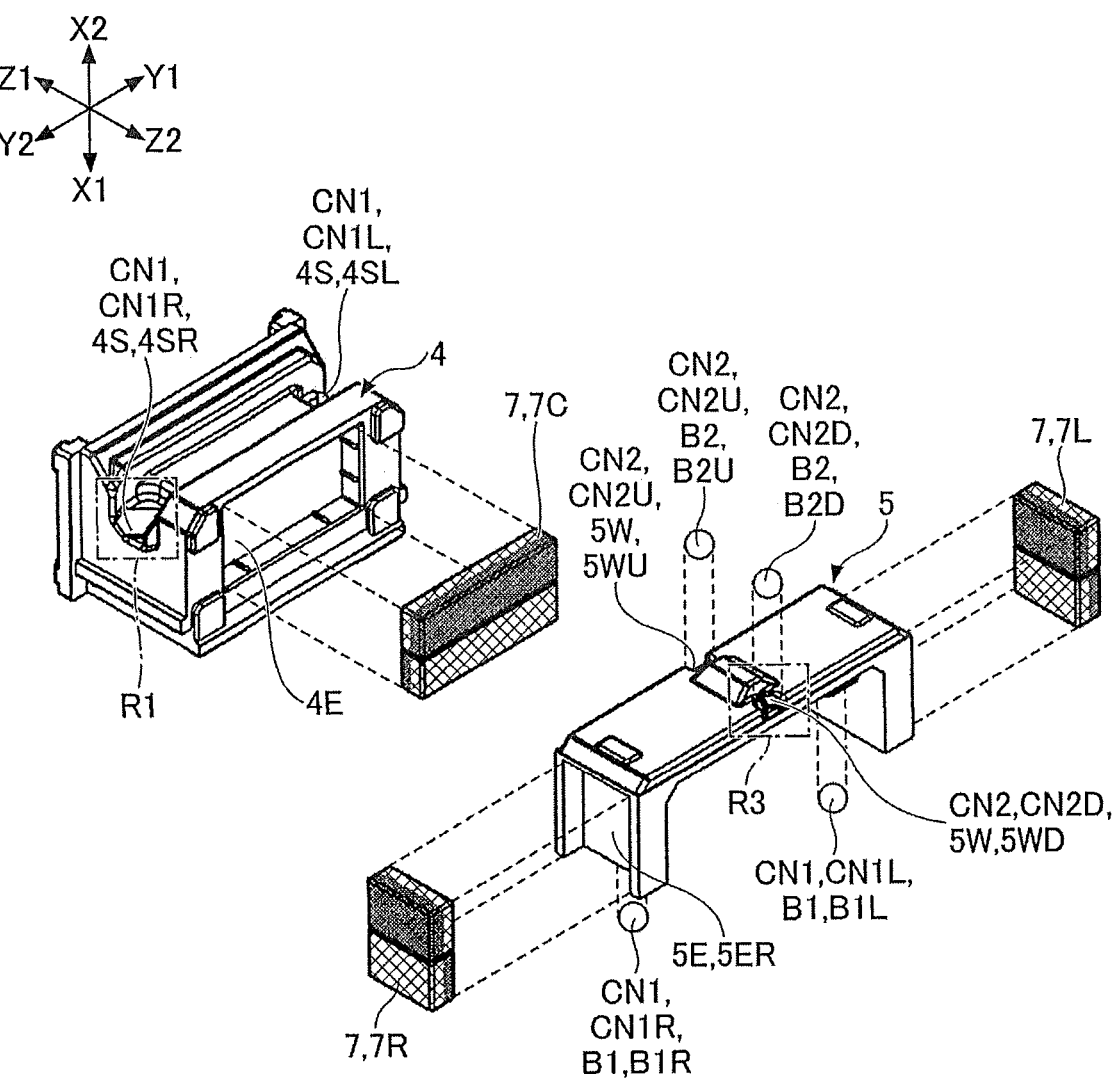
FIG. 13C is an exploded perspective back view of the moving member of the reflector driving device of FIG. 12, as viewed from the lower right diagonal direction.

Next, referring to FIG. 12 and FIG. 13A to FIG. 13C, a reflector driving device 101A, another configuration example of the reflector driving device 101, will be described. FIG. 12, corresponding to FIG. 3, is an exploded perspective view of the reflector driving device 101A. FIG. 13A to FIG. 13C, respectively corresponding to FIG. 7A to FIG. 7C, are exploded perspective views of the moving member MB as viewed from three different angles. Specifically, FIG. 13A is an exploded perspective front view of the moving member MB as viewed from the upper right diagonal direction. FIG. 13B is an exploded perspective front view of the moving member MB as viewed from the upper left diagonal direction. FIG. 13C is an exploded perspective back view of the moving member MB as viewed from the lower right diagonal direction.

As illustrated in FIG. 12, the reflector driving device 101A is different from the reflector driving device 101 in that the middle coil 8C, the left-hand coil 8L, and the right-hand coil 8R are attached to one single wiring board 3. In the reflector driving device 101, the middle coil 8C is attached to the middle wiring board 3C, the left-hand coil 8L is attached to the left-hand wiring board 3L, and the right-hand coil 8R is attached to the right-hand wiring board 3R.

Also, as illustrated in FIG. 13A to FIG. 13C, the reflector driving device 101A is different from the reflector driving device 101 in that the first shank portion CN1 includes: the recessed portion 4S formed in the reflector-retaining member 4; a recessed portion 5S formed in the first support member 5; and a first ball B1. In the reflector driving device 101, the first shank portion CN1 includes: the recessed portion 4S formed in the reflector-retaining member 4; and the projecting portion 51 formed in the first support member 5. Also, as illustrated in FIG. 12 and FIG. 13A to FIG. 13C, the reflector driving device 101A is different from the reflector driving device 101 in that the second shank portion CN2 includes: a recessed portion 5W formed in the first support member 5; the recessed portion 6S formed in the second support member 6; and a second ball B2. In the reflector driving device 101, the second shank portion CN2 includes: the projecting portion 5V formed in the first support member 5; and the recessed portion 6S formed in the second support member 6.

In the reflector driving device 101A, similar to the case of the reflector driving device 101, the reflector-retaining member 4 and the first support member 5 are connected by the first shank portion CN1 so that the reflector-retaining member 4 becomes swingable relative to the first support member 5.

Specifically, the first shank portion CN1 includes the left-hand shank portion CN1L and the right-hand shank portion CN1R. The left-hand shank portion CN1L includes: the left-hand recessed portion 4SL formed in the back-side end portion on the outer side (left-hand side) of the left-hand wall portion of the reflector-retaining member 4; a left-hand recessed portion 5SL formed on the inner side (right-hand side) of the left-hand wall portion of the first support member 5; and a left-hand ball B1L held between the left-hand recessed portion 4SL and the left-hand recessed portion 5SL.

Likewise, the right-hand shank portion CN1R includes: the right-hand recessed portion 4SR formed in the back-side end portion on the outer side (right-hand side) of the right-hand wall portion of the reflector-retaining member 4; a right-hand recessed portion 5SR formed on the inner side (left-hand side) of the right-hand wall portion of the first support member 5; and a right-hand ball B1R held between the right-hand recessed portion 4SR and the right-hand recessed portion 5SR.

Figure 14A:
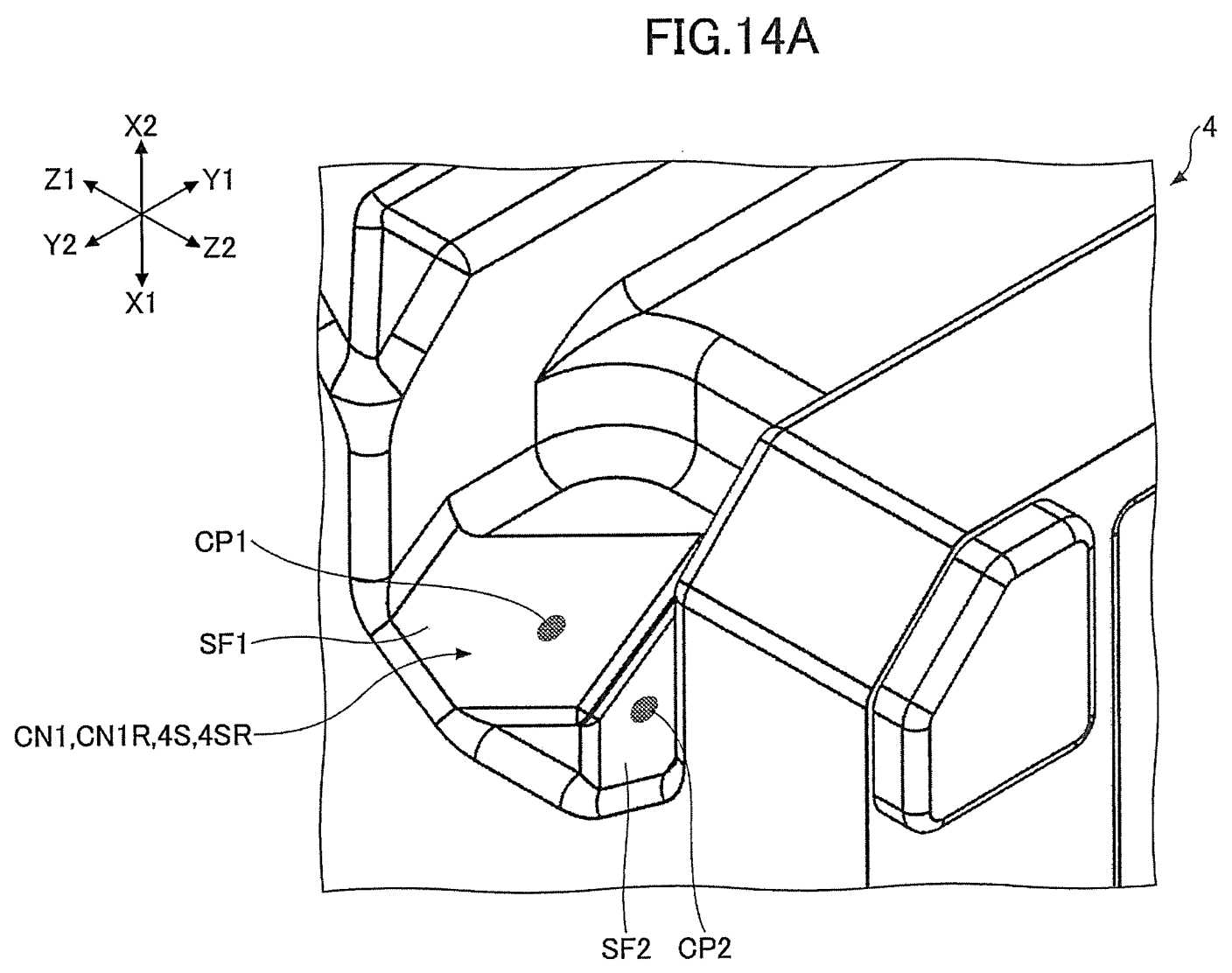
Figure 14B:
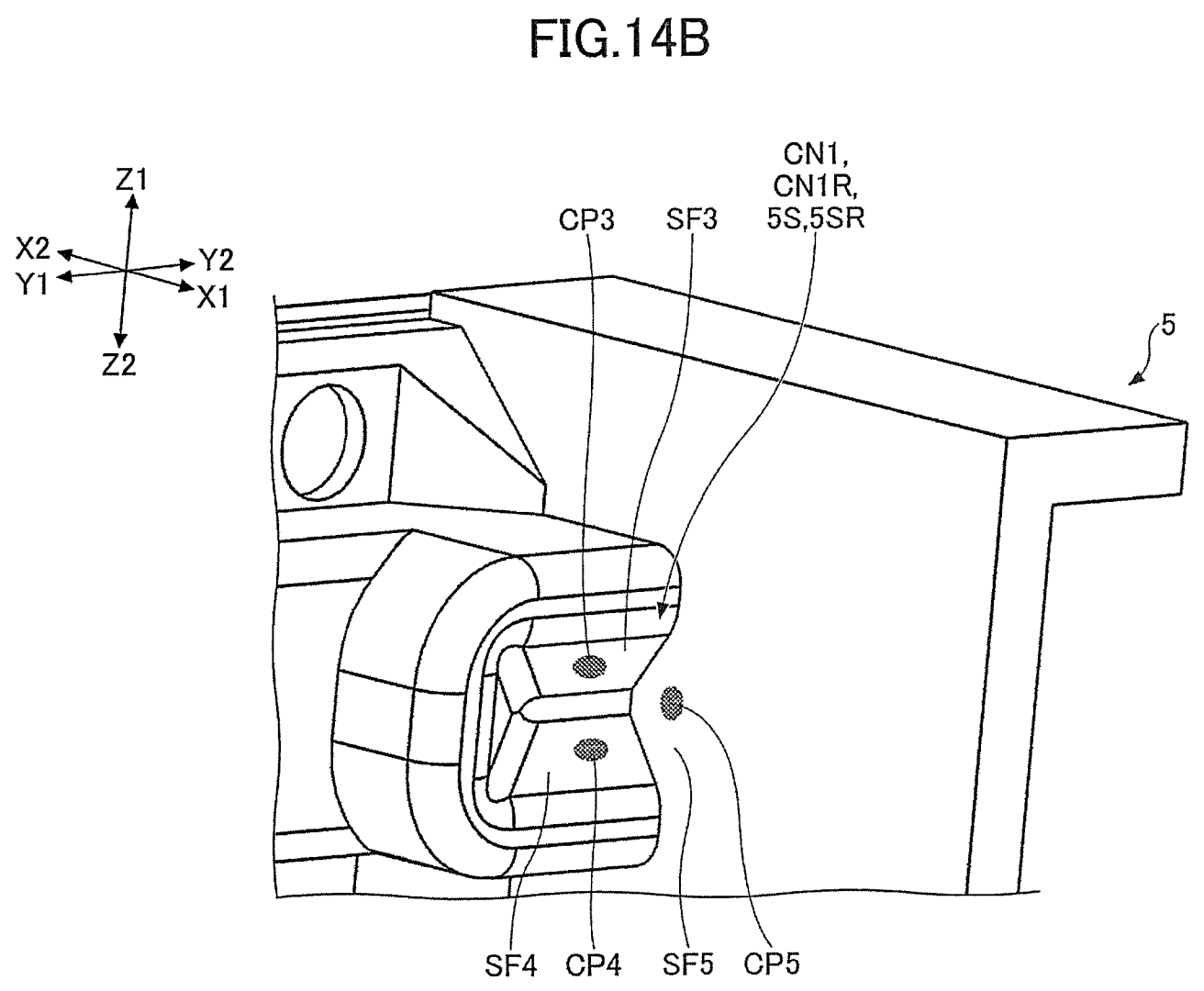

Here, referring to FIG. 14A and FIG. 14B, a state of the first shank portion CN1 with the reflector-retaining member 4 and the first support member 5 being combined will be described. FIG. 14A and FIG. 14B are enlarged views of the first shank portion CN1. Specifically, FIG. 14A is an enlarged view of the right-hand recessed portion 4SR of the right-hand shank portion CN1R, and corresponds to an enlarged view of a region R1 surrounded by a chain line in FIG. 13C. FIG. 14B is an enlarged view of the right-hand recessed portion 5SR of the right-hand shank portion CN1R, and corresponds to an enlarged view of a region R2 surrounded by a chain line in FIG. 13B.

As illustrated in FIG. 14A, the right-hand recessed portion 4SR is configured to include two inclined surfaces (a first surface SF1 and a second surface SF2) to contact the right-hand ball B1R at two points (the first contact point CP1 and the second contact point CP2). Each of the two inclined surfaces is formed to be inclined with respect to each of the X axis, the Y axis, and the Z axis. The same applies to the left-hand recessed portion 4SL. In FIG. 14A, for ease of understanding, contact portions between the reflector-retaining member 4 and the right-hand ball B1R are given fine cross patterns.

Also, as illustrated in FIG. 14B, the right-hand recessed portion 5SR is configured to include two inclined surfaces (a third surface SF3 and a fourth surface SF4) to contact the right-hand ball B1R at three points (the third contact point CP3, the fourth contact point CP4, and the fifth contact point CP5). Each of the two inclined surfaces is formed to be inclined with respect to each of the X axis and the Z axis, and to extend in parallel to the Y axis. The same applies to the left-hand recessed portion 5SL. In FIG. 14B, for ease of understanding, contact portions between the first support member 5 and the right-hand ball B1R are given fine cross patterns.

When the reflector-retaining member 4 is biased backward by the biasing member 9, the reflector-retaining member 4 presses the right-hand ball B1R against the right-hand recessed portion 5SR of the first support member 5 via the first surface SF1 and the second surface SF2 of the right-hand recessed portion 4SR. In other words, the reflector-retaining member 4 presses the right-hand ball B1R against the third surface SF3 and the fourth surface SF4 of the right-hand recessed portion 5SR of the first support member 5.

As illustrated in FIG. 14A, the first surface SF1 and the second surface SF2 are oblique frontward toward the right-hand side (Y2 side). Therefore, the reflector-retaining member 4 biases the right-hand ball B1R not only backward but also rightward, and can press the right-hand ball B1R against a fifth surface SF5 of the first support member 5. The fifth surface SF5 is a surface on the inner side (left-hand side) of the right-hand wall portion of the first support member 5.

In this way, the first shank portion CN1 is configured such that as illustrated in FIG. 14A, the right-hand recessed portion 4SR of the reflector-retaining member 4 and the right-hand ball B1R contact at two points and, as illustrated in FIG. 14B, the right-hand recessed portion 5SR of the first support member 5 and the right-hand ball B1R contact at three points. The same applies to a relationship among: the left-hand recessed portion 4SL of the reflector-retaining member 4; the left-hand recessed portion 5SL of the first support member 5; and the left-hand ball B1L.

This configuration can suppress the reflector-retaining member 4 from displacing in the left-and-right direction when the reflector-retaining member 4 swings relative to the first support member 5. As a result, this configuration can suppress rattling of the first ball B1 of the first shank portion CN1.

Also, in the reflector driving device 101A, similar to the case of the reflector driving device 101, the first support member 5 and the second support member 6 are connected by the second shank portion CN2 so that the first support member 5 becomes swingable relative to the second support member 6.

Specifically, the second shank portion CN2 includes the upper shank portion CN2U and the lower shank portion CN2D. The upper shank portion CN2U includes: an upper recessed portion 5WU formed in the upper-end middle portion on the outer side (back side) of the back-side wall portion of the first support member 5; an upper recessed portion 6SU formed in a middle-upper portion on the inner side (front side) of the back-side wall portion of the second support member 6; and an upper ball B2U held between the upper recessed portion 5WU and the upper recessed portion 6SU.

Likewise, the lower shank portion CN2D includes: a lower recessed portion 5WD in the lower-end middle portion on the outer side (back side) of the back-side wall portion of the first support member 5; a lower recessed portion 6SD formed in the middle-lower portion on the inner side (front side) of the back-side wall portion of the second support member 6; and a lower ball B2D held between the lower recessed portion 5WD and the lower recessed portion 6SD.

Figure 15A:
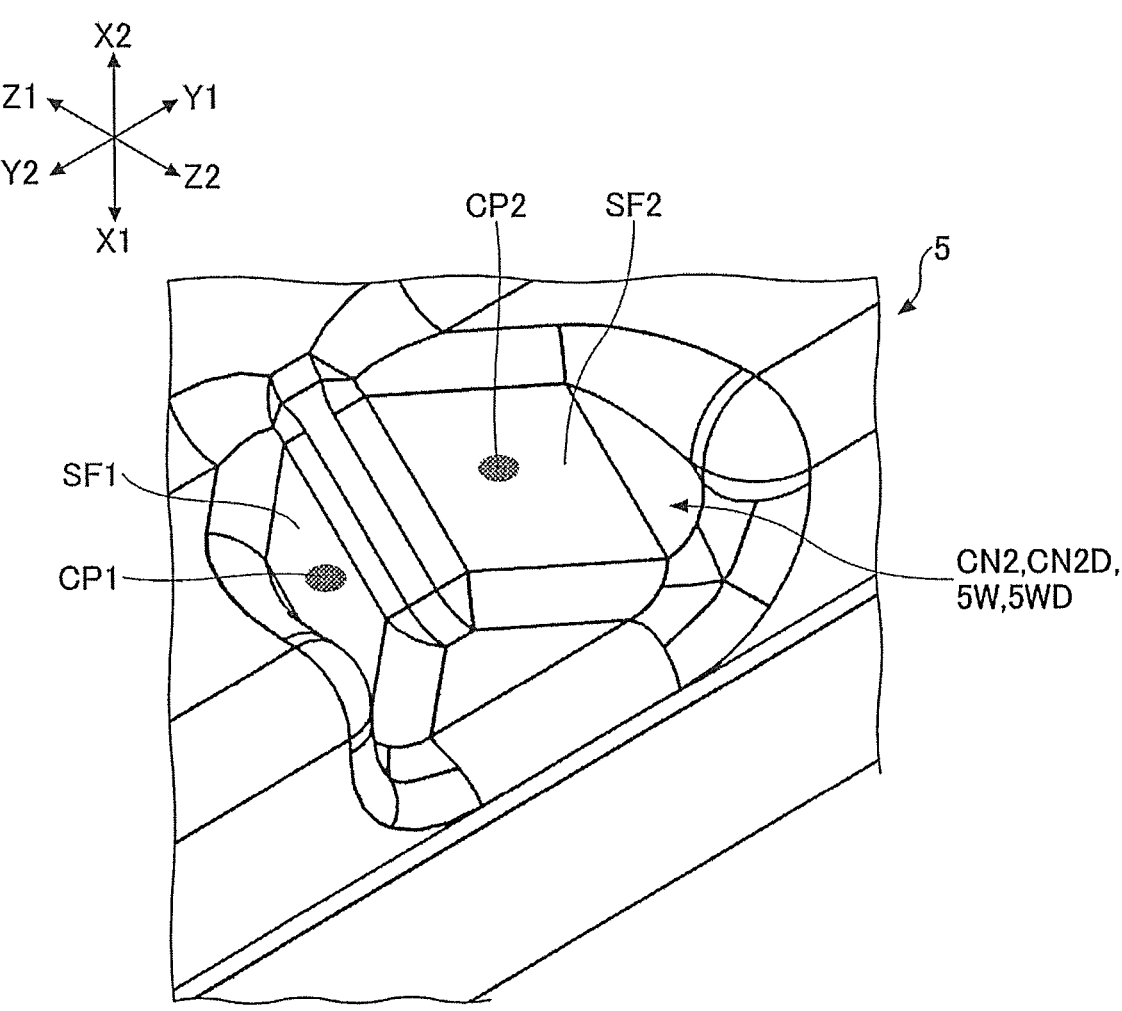
FIG. 15A is an enlarged view of a second shank portion.
Figure 15B:
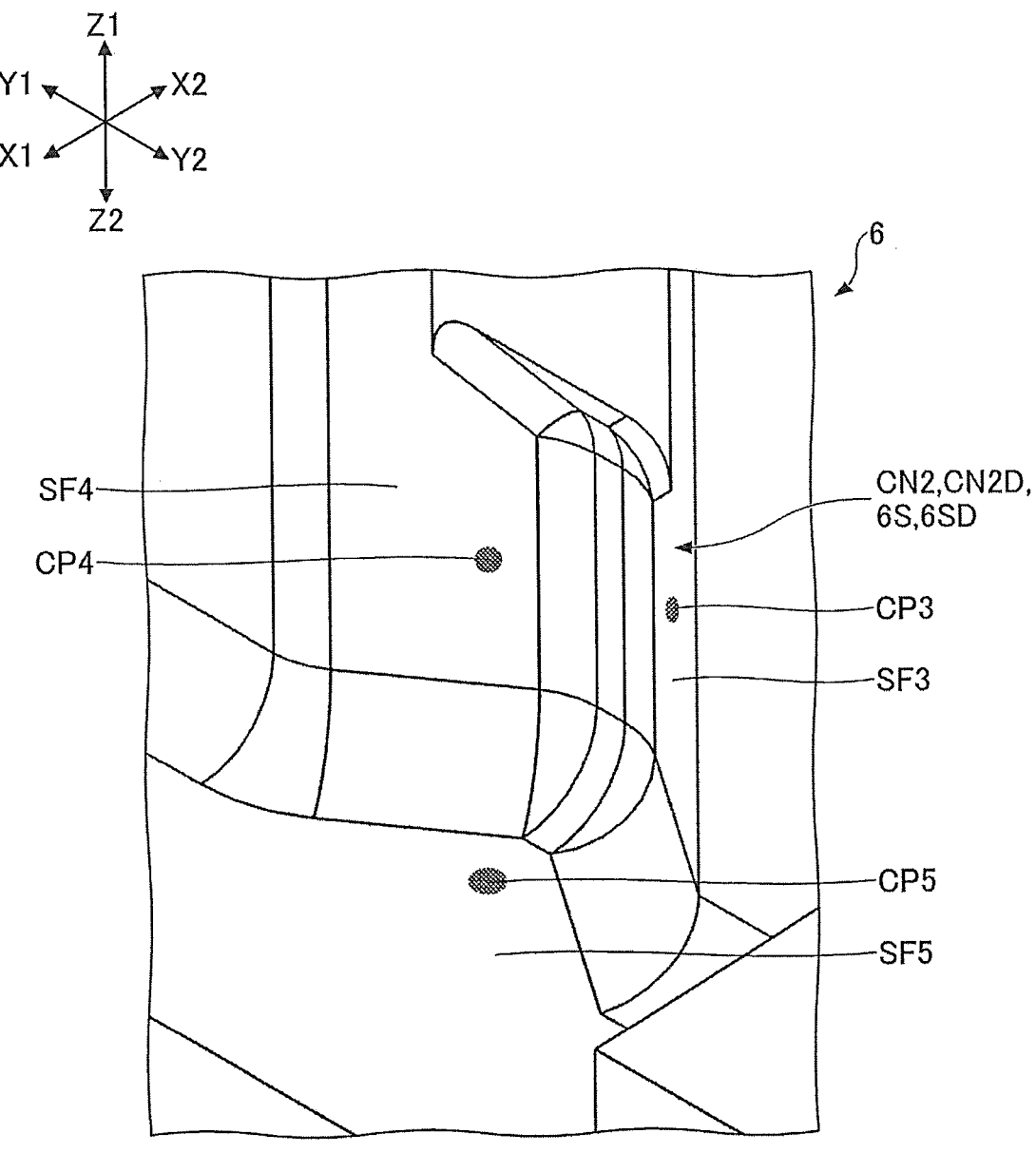
FIG. 15B is an enlarged view of the second shank portion.

Here, referring to FIG. 15A and FIG. 15B, a state of the second shank portion CN2 with the first support member 5 and the second support member 6 being combined will be described. FIG. 15A and FIG. 15B are enlarged views of the second shank portion CN2. Specifically, FIG. 15A is an enlarged view of the lower recessed portion 5WD of the lower shank portion CN2D, and corresponds to an enlarged view of a region R3 surrounded by a chain line in FIG. 13C. FIG. 15B is an enlarged view of the lower recessed portion 6SD of the lower shank portion CN2D, and corresponds to a region R4 surrounded by a chain line in FIG. 12.

As illustrated in FIG. 15A, the lower recessed portion 5WD is configured to include two inclined surfaces (the first surface SF1 and the second surface SF2) to contact the lower ball B2D at two points (the first contact point CP1 and the second contact point CP2). Each of the two inclined surfaces is formed to be inclined with respect to each of the X axis, the Y axis, and the Z axis. The same applies to the upper recessed portion 5WU. In FIG. 15A, for ease of understanding, contact portions between the first support member 5 and the lower ball B2D are given fine cross patterns.

Also, as illustrated in FIG. 15B, the lower recessed portion 6SD is configured to include two inclined surfaces (the third surface SF3 and the fourth surface SF4) to contact the lower ball B2D at three points (the third contact point CP3, the fourth contact point CP4, and the fifth contact point CP5). Each of the two inclined surfaces is formed to be inclined with respect to each of the X axis and the Y axis, and to extend in parallel to the Z axis. The same applies to the upper recessed portion 6SU. In FIG. 15B, for ease of understanding, contact portions between the second support member 6 and the lower ball B2D are given fine cross patterns.

When the first support member 5 is biased backward by the biasing member 9, the first support member 5 presses the lower ball B2D against the lower recessed portion 6SD of the second support member 6 via the first surface SF1 and the second surface SF2 of the lower recessed portion 5WD. In other words, the first support member 5 presses the lower ball B2D against the third surface SF3 and the fourth surface SF4 of the lower recessed portion 6SD of the second support member 6.

As illustrated in FIG. 15A, the first surface SF1 and the second surface SF2 are oblique frontward toward the lower side (Z2 side). Therefore, the first support member 5 biases the lower ball B2D not only backward but also downward, and can press the lower ball B2D against the fifth surface SF5 of the second support member 6. The fifth surface SF5 is a surface on the inner side (upper side) of the bottom wall portion of the second support member 6.

In this way, the second shank portion CN2 is configured such that as illustrated in FIG. 15A, the lower recessed portion 5WD of the first support member 5 and the lower ball B2D contact at two points and, as illustrated in FIG. 15B, the lower recessed portion 6SD of the second support member 6 and the lower ball B2D contact at three points. The same applies to a relationship among: the upper recessed portion 5WU of the first support member 5; the upper recessed portion 6SU of the second support member 6; and the upper ball B2U.

This configuration can suppress the first support member 5 from displacing in the up-and-down direction when the first support member 5 swings relative to the second support member 6. As a result, this configuration can suppress rattling of the second ball B2 of the second shank portion CN2.

Note that, in the present embodiment, each of the first ball B1 and the second ball B2 is formed of a synthetic resin. Note that, the first ball B1 and the second ball B2 may be formed of other materials such as a metal.

The reflector driving device 101 according to the embodiments of the present invention (including the reflector driving device 101A as illustrated in FIG. 12) includes as illustrated in, for example, FIG. 3 or FIG. 12: the reflector-retaining member 4 configured to retain the reflector 1 that refracts light; the first support member 5 configured to support the reflector-retaining member 4 so as to be swingable about the swing axis SA1 serving as the first axis; the second support member 6 configured to support the first support member 5 so as to be swingable about the swing axis SA2 serving as the second axis having the axis-line direction (Z-axis direction) being not parallel to (being perpendicular to) the axis-line direction (Y-axis direction) of the swing axis SA1; the first driving mechanism MD1 configured to swing the reflector-retaining member 4 about the swing axis SA1; and the second driving mechanism MD2 configured to swing the first support member 5 about the swing axis SA2. Note that, the axis-line direction of the swing axis SA1 and the axis-line direction of the swing axis SA2 being perpendicular to each other includes: axis-line directions of the swing axis SA1 and the swing axis SA2 having a skew-position relationship being perpendicular to each other; or the swing axis SA1 or an extension of the swing axis SA1 and the swing axis SA2 or an extension of the swing axis SA2 being orthogonal to each other. The reflector driving device 101 further includes: the first biasing member configured to bias the reflector-retaining member 4 toward the first support member 5; and the second biasing member configured to bias the first support member 5 toward the second support member 6. In the example as illustrated in FIG. 3, the biasing member 9 serving as the first biasing member biases the reflector-retaining member 4 toward the first support member 5 (X2 side) in the direction being not parallel to (being perpendicular to) the axis-line direction (Y-axis direction) of the swing axis SA1 (direction in parallel to the X axis), and the biasing member 9 serving as the second biasing member biases the first support member 5 toward the second support member 6 (X2 side) in the direction being not parallel to (being perpendicular to) the axis-line direction (Z-axis direction) of the swing axis SA2 (direction in parallel to the X axis).

With this configuration, in which the reflector-retaining member 4 is biased toward the first support member 5 and the first support member is biased toward the second support member 6, the reflector driving device 101 can suppress rattling between the reflector-retaining member 4 and the first support member 5 and suppress rattling between the first support member 5 and the second support member 6. As a result, the reflector driving device 101 can more stably swing the reflector 1.

In the example as illustrated in FIG. 3, a first direction in which the first biasing member biases the reflector-retaining member 4 and a second direction in which the second biasing member biases the first support member 5 are identical. The first direction and the second direction are perpendicular to the axis-line directions of the swing axis SA1 and the swing axis SA2. In other words, the biasing member 9 serving as the first biasing member biases the reflector-retaining member 4 backward in the direction in parallel to the X axis, and the biasing member 9 serving as the second biasing member biases the first support member 5 backward in the direction in parallel to the X axis. This configuration can more reliably suppress rattling between the reflector-retaining member 4 and the first support member 5. Also, this configuration can enhance ease of assembly of the reflector driving device 101.

The first biasing member and the second biasing member may be formed of the same spring member provided between the reflector-retaining member 4 and the second support member 6. That is, the biasing member 9 serving as the spring member may serve as both of the first biasing member and the second biasing member. In other words, the first biasing member may be configured to serve as the second biasing member as well. This configuration can reduce the number of parts of the reflector driving device 101 as compared with the case in which the first biasing member and the second biasing member are realized by separate spring members.

As illustrated in FIG. 5, the biasing member 9 serving as the spring member is formed of a leaf spring, and may include: the inner fixing portion 9M serving as a first fixing portion to be fixed to the reflector-retaining member 4; the outer fixing portion 9F serving as a second fixing portion to be fixed to the second support member 6; and the elastic arm portion 9G that connects the inner fixing portion 9M and the outer fixing portion 9F to each other. In this case, in the initial state in which both of the first driving mechanism MD1 and the second driving mechanism MD2 do not drive, the inner fixing portion 9M and the outer fixing portion 9F are approximately parallel to each other. Specifically, as illustrated in FIG. 11, in the initial state, the inner fixing portion 9M and the outer fixing portion 9F are disposed to be spaced with the gap DT1 in the X-axis direction and are disposed to be approximately parallel to each other along the Z-axis direction. This configuration can realize ease of attachment of the biasing member 9 to the moving member MB.

As illustrated in FIG. 5, the biasing member 9 serving as the spring member may include: the left-hand spring member 9L serving as a first spring member; and the right-hand spring member 9R serving as a second spring member, the left-hand spring member 9L and the right-hand spring member 9R being disposed to be spaced from each other. In this case, each of the left-hand spring member 9L and the right-hand spring member 9R includes two elastic arm portions 9G that connect the inner fixing portion 9M and the outer fixing portion 9F to each other. Specifically, the left-hand spring member 9L includes two left-hand elastic arm portions 9GL that connect the left-hand inner fixing portion 9ML and the left-hand outer fixing portion 9FL to each other. Also, the right-hand spring member 9R includes two right-hand elastic arm portions 9GR that connect the right-hand inner fixing portion 9MR and the right-hand outer fixing portions 9FR to each other. In a front view, the swing axis SA1 is positioned between the two left-hand elastic arm portions 9GL (the left-hand upper elastic arm portion 9GUL and the left-hand lower elastic arm portion 9GDL) and is positioned between the two right-hand elastic arm portions 9GR (the right-hand upper elastic arm portion 9GUR and the right-hand lower elastic arm portion 9GDR) of the right-hand spring member 9R. In the example as illustrated in FIG. 5, each of the left-hand spring member 9L and the right-hand spring member 9R is, in a front view, top-and-bottom symmetrical with respect to the swing axis SA1. Also, in the example as illustrated in FIG. 5, the left-hand spring member 9L and the right-hand spring member 9R are, in a front view, left-and-right symmetrical with respect to the swing axis SA2. With this configuration, the biasing member 9 can bias the reflector-retaining member 4 toward the swing axis SA1 in a well-balanced manner as compared with the case in which the swing axis SA1 is not positioned between the two left-hand elastic arm portions 9GL of the left-hand spring member 9L or the swing axis SA1 is not positioned between the two right-hand elastic arm portions 9GR of the right-hand spring member 9R. Therefore, the reflector driving device 101 can more stably swing the reflector 1.

As illustrated in FIG. 4A and FIG. 7A to FIG. 7C, the reflector driving device 101 may include: the first shank portion CN1 that connects the reflector-retaining member 4 so as to be swingable about the swing axis SA1; and the second shank portion CN2 that connects the first support member 5 so as to be swingable about the swing axis SA2. In this case, the position of the first shank portion CN1 and the position of the second shank portion CN2 are different in the direction in which the biasing member 9 serving as the first biasing member biases the reflector-retaining member 4 (direction in parallel to the X axis). In the examples as illustrated in FIG. 4A and FIG. 7A to FIG. 7C, the position of the first shank portion CN1 in the direction in parallel to the X axis is positioned frontward (X1 side) of the position of the second shank portion CN2. This configuration can reliably prevent interference between swing of the reflector-retaining member 4 about the swing axis SA1 and swing of the first support member 5 about the swing axis SA2, thereby reliably realizing two respective swing motions.

Specifically, the first shank portion CN1 may include a portion integrally formed with the reflector-retaining member 4 and a portion integrally formed with the first support member 5, and/or the second shank portion CN2 may include a portion integrally formed with the first support member 5 and a portion integrally formed with the second support member 6. In the examples as illustrated in FIG. 4A and FIG. 7A to FIG. 7C, the first shank portion CN1 includes the recessed portion 4S integrally formed with the reflector-retaining member 4 and the projecting portion 51 integrally formed with the first support member 5, and the second shank portion CN2 includes the projecting portion 5V integrally formed with the first support member 5 and the recessed portion 6S integrally formed with the second support member 6. This configuration can reduce production cost of the shank portion as compared with the case in which the shank portion is formed using a ball.

Alternatively, as illustrated in FIG. 13A to FIG. 13C, the first shank portion CN1 may include the first ball B1 disposed between the reflector-retaining member 4 and the first support member 5, and/or the second shank portion CN2 may include the second ball B2 between the first support member 5 and the second support member 6. This configuration can reduce a friction force acting on the shank portion in swinging the moving member MB relative to the fixing member FB as compared with the configuration in which a projecting portion and a recessed portion are brought into contact with each other. Note that, the first ball B1, the second ball B2, or both may be subjected to coating for lubrication, or may be coated with grease.

As illustrated in FIG. 3 and FIG. 7A to FIG. 7C, the first driving mechanism MD1 may include: a first magnetic field-generating member (the middle magnet 7C) movable along with the reflector-retaining member 4; and a first coil (the middle coil 8C) facing the first magnetic field-generating member (the middle magnet 7C). The second driving mechanism MD2 may include: a second magnetic field-generating member movable along with the first support member 5 (the left-hand magnet 7L and the right-hand magnet 7R); and the second coil (the left-hand coil 8L and the right-hand coil 8R) facing the second magnetic field-generating member (the left-hand magnet 7L and the right-hand magnet 7R). In this case, the first coil (the middle coil 8C) and the second coil (the left-hand coil 8L and the right-hand coil 8R), and the second support member 6 are disposed so as to be unmovable relative to each other. Note that, in the examples as illustrated in FIG. 3 and FIG. 7A to FIG. 7C, the first magnetic field-generating member (the middle magnet 7C) is fixed via an adhesive to the reflector-retaining member 4, but may be fixed to another member movable along with the reflector-retaining member 4. Likewise, the second magnetic field-generating member (the left-hand magnet 7L and the right-hand magnet 7R) is fixed via an adhesive to the first support member 5, but may be fixed to another member movable along with the first support member 5. This configuration can realize ease of feeding electrical power to the coil 8. This is because there is no need to provide the coil 8 to the first support member 5 configured to be swingable relative to the second support member 6. In the above-described embodiments, the wiring board 3 provided with the first coil (the middle coil 8C) and the second coil (the left-hand coil 8L and the right-hand coil 8R) is fixed to the second support member 6. In the example as illustrated in FIG. 3, the wiring board 3 includes three wiring boards (the middle wiring board 3C provided with the middle coil 8C, the left-hand wiring board 3L provided with the left-hand coil 8L, and the right-hand wiring board 3R provided with the right-hand coil 8R). In the example as illustrated in FIG. 12, the wiring board 3 includes one single wiring board (the wiring board 3 provided with the middle coil 8C, the left-hand coil 8L, and the right-hand coil 8R). Especially when the wiring board 3 is formed of a flexible wiring board, this configuration can reliably prevent a force by the flexible wiring board from acting on the first support member 5. The force by the flexible wiring board is, for example, a restoring force generated by the flexible wiring board in a curved state.

As illustrated in FIG. 7A to FIG. 7C, the second magnetic field-generating member (the left-hand magnet 7L and the right-hand magnet 7R) may include: the left-hand magnet 7L disposed in the left-hand recessed portion 5EL serving as a first mounting portion of the first support member 5; and the right-hand magnet 7R disposed in the right-hand recessed portion 5ER serving as a second mounting portion of the first support member 5. In this case, the left-hand magnet 7L and the right-hand magnet 7R may be disposed so as to face each other via a plane that is orthogonal to the swing axis SA1 and includes the swing axis SA2. Also, the second coil (the left-hand coil 8L and the right-hand coil 8R) may include: the left-hand coil 8L provided correspondingly to the left-hand magnet 7L; and the right-hand coil 8R provided correspondingly to the right-hand magnet 7R. As illustrated in FIG. 6A and FIG. 6B, the magnetic member 11 (the left-hand magnetic member 11L and the right-hand magnetic member 11R) may be provided so as to face the second magnetic field-generating member (the left-hand magnet 7L and the right-hand magnet 7R) in the direction in which the biasing member 9 serving as the second biasing member biases the first support member 5 (direction in parallel to the X axis). Note that, a non-magnetic member of, for example, a synthetic resin may be present between the second magnetic field-generating member and the magnetic member 11. This configuration enables compensation for the driving force of the second driving mechanism MD2 by the attractive force acting between the second magnetic field-generating member and the magnetic member 11.

As illustrated in FIG. 6A and FIG. 6B, the magnetic member 11 may include: the left-hand magnetic member 11L serving as the first magnetic member corresponding to the left-hand magnet 7L; and the right-hand magnetic member 11R serving as the second magnetic member corresponding to the right-hand magnet 7R. As compared with the case in which the left-hand magnetic member 11L and the right-hand magnetic member 11R are integrally formed, this configuration produces the effect of being able to suppress interference between a magnetic force by the left-hand magnet 7L and a magnetic force by the right-hand magnet 7R through the magnetic member 11.

Also, the magnetic member 11 may be embedded in the second support member 6. Specifically, as illustrated in FIG. 4A, the magnetic member 11 may be partially embedded in the second support member 6, or may be entirely embedded in the second support member 6. This configuration can enhance accuracy of the position at which the magnetic member 11 is disposed in the second support member 6, as compared with the case in which the magnetic member 11 is attached to the second support member 6 via an adhesive or the like.

Note that, as illustrated in FIG. 2, the swing axis SA1 is orthogonal to a plane including an optical axis of incident light (light LT) incident on the reflector 1 and an optical axis of reflected light reflected by the reflector 1 (plane in parallel to the XZ plane) and the swing axis SA2 is parallel to the optical axis of incident light.

In the above, the embodiments of the present invention have been described in detail. However, the present invention should not be construed as being limited to the above-described embodiments. Various modifications, substitutions, and the like are applicable to the above-described embodiments without departing from the scope of claims recited. Also, the features described with reference to the above-described embodiments may be appropriately combined with each other unless there is any contradiction from the technical viewpoint.

For example, in the above-described embodiments, the first shank portion CN1 includes: the recessed portion 4S formed in the reflector-retaining member 4; and the projecting portion 5T formed in the first support member 5. However, the first shank portion CN1 may include: a projecting portion formed in the reflector-retaining member 4; and a recessed portion formed in the first support member 5.

Likewise, the second shank portion CN2 includes: the projecting portion 5V formed in the first support member 5; and the recessed portion 6S formed in the second support member 6. However, the second shank portion CN2 may include: a recessed portion formed in the first support member 5; and a projecting portion formed in the second support member 6.

Note that, the recessed portion, the projecting portion, or both may be subjected to coating for lubrication, or may be coated with grease.

Also, in the above-described embodiments, the projecting portion 5T formed in the first support member 5 is formed so as to have a tip of an end-quarter of a spherical body, and the projecting portion 5V formed in the first support member 5 is formed so as to have a tip of a hemispherical body. However, the projecting portion 5T, the projecting portion 5V, or both may be formed so as to have a tip of a partially cylindrical shape. In this case, a recessed portion corresponding to the projecting portion of the partially cylindrical shape may be formed so as to have a recessed surface of a partially cylindrical shape.

Also, one or more damping materials may be provided between the reflector-retaining member 4 and the first support member 5, between the first support member 5 and the second support member 6, between the reflector-retaining member 4 and the second support member 6, or any combination thereof. The damping material is, for example, a gel-like damper material formed by curing a flowable adhesive with UV rays or heat. Note that, the damping material may be formed of another material such as a thermosetting resin, a UV-curable resin, thermosetting silicone rubber, or UV-curable silicone rubber.

For example, the damping material may be provided between the outer surface of the lateral wall portion of the reflector-retaining member 4 and the inner surface of the lateral wall portion of the first support member 5. Alternatively, the damping material may be provided between the left-hand magnet 7L attached to the first support member 5 and the inner surface of the left-hand wall portion of the second support member 6 and may be provided between the right-hand magnet 7R attached to the first support member 5 and the inner surface of the right-hand wall portion of the second support member 6. Alternatively, the damping material may be provided between the outer surface of the lateral wall portion of the reflector-retaining member 4 and the inner surface of the lateral wall portion of the second support member 6.

Also, in the above-described embodiments, the biasing member 9 is configured to serve as both of: the first biasing member configured to bias the reflector-retaining member 4 toward the first support member 5 (X2 side) in the direction in parallel to the X axis; and the second biasing member configured to bias the first support member 5 toward the second support member 6 (X2 side) in the direction in parallel to the X axis. However, the first biasing member and the second biasing member may be separate and independent members. For example, the first biasing member may include one or more spring members, and the second biasing member may include one or more different spring members.

Figure 16:
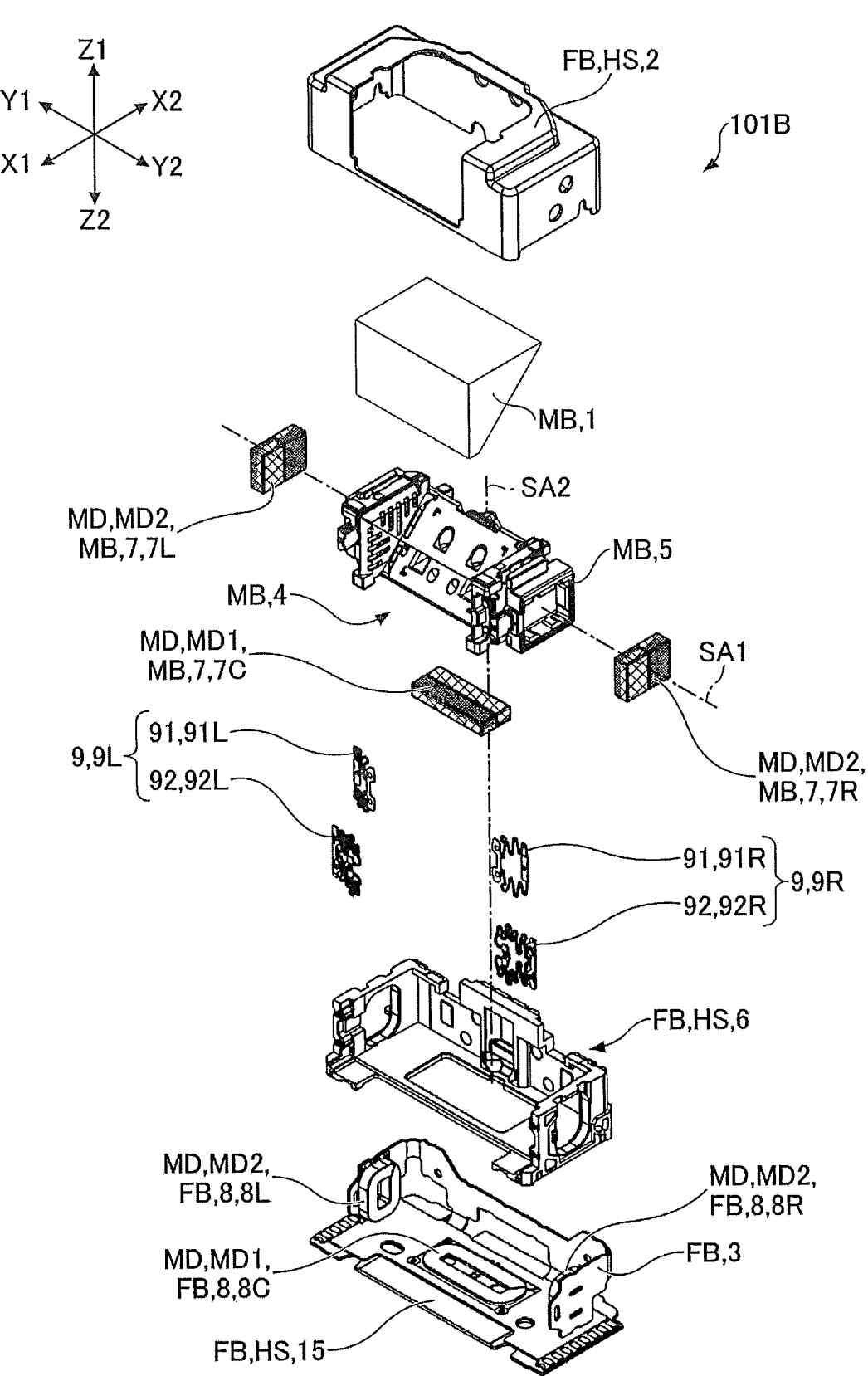
FIG. 16 is an exploded perspective view of still another configuration example of the reflector driving device.
Figure 17A:
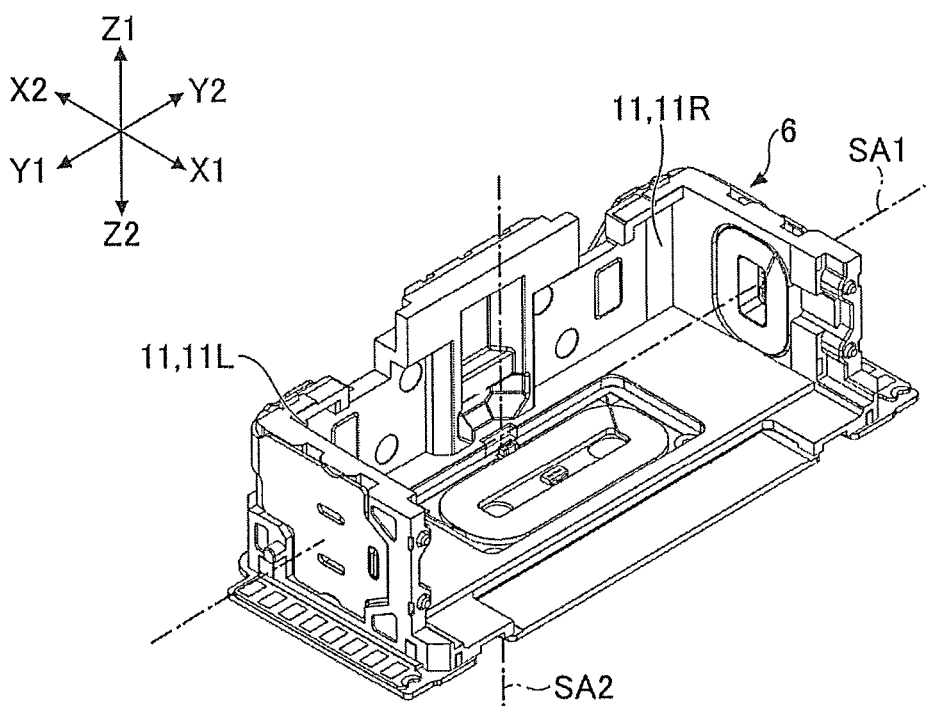
FIG. 17A is a perspective view of the fixing member of the reflector driving device of FIG. 16.
Figure 17B:
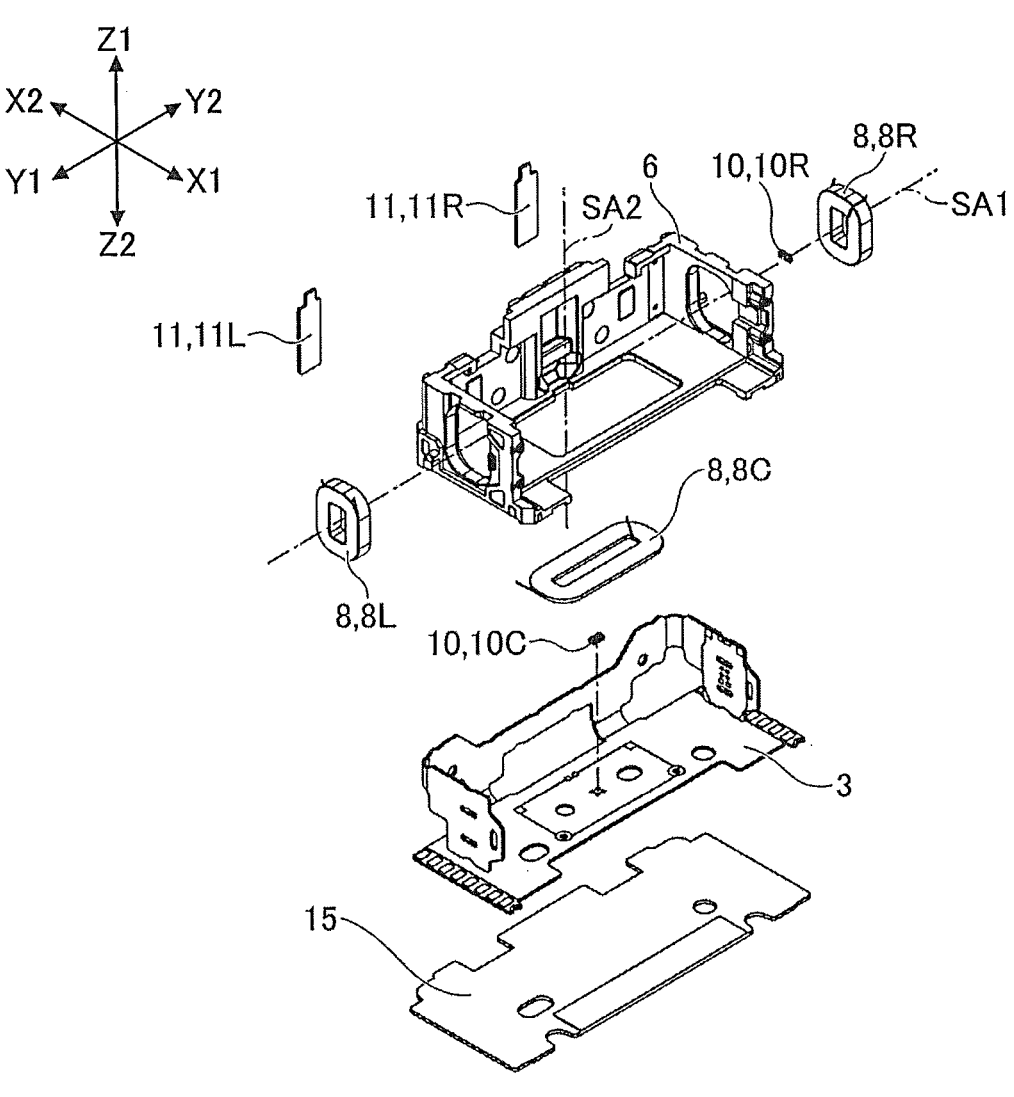
FIG. 17B is a perspective view of the fixing member of the reflector driving device of FIG. 16.

Here, referring to FIG. 16, FIG. 17A, and FIG. 17B, a reflector driving device 101B, still another configuration example of the reflector driving device 101, will be described. FIG. 16, corresponding to FIG. 3, is an exploded perspective view of the reflector driving device 101B. FIG. 17A, corresponding to FIG. 4A, is a perspective view of the fixing member FB. FIG. 17B, corresponding to FIG. 4B, is an exploded perspective view of the fixing member FB. Note that, in FIG. 17A and FIG. 17B, for ease of understanding, the cover member 2 is not illustrated.

As illustrated in FIG. 16, the reflector driving device 101B is different from the reflector driving device 101 in that the middle coil 8C, the left-hand coil 8L, and the right-hand coil 8R are attached to one single wiring board 3. In the reflector driving device 101, the middle coil 8C is attached to the middle wiring board 3C, the left-hand coil 8L is attached to the left-hand wiring board 3L, and the right-hand coil 8R is attached to the right-hand wiring board 3R. Also, as described in FIG. 17B, the reflector driving device 101B is different from the reflector driving device 101 in that the reflector driving device 101B includes a bottom plate 15 formed of a non-magnetic metal. Also, similar to the reflector driving device 101, the reflector driving device 101B includes the first shank portion CN1 (not seeable in FIG. 16) that includes the recessed portion formed in the reflector-retaining member 4 and the projecting portion formed in the first support member 5. Note that, similar to the reflector driving device 101A, the reflector driving device 101B may include the first shank portion including: the recessed portion formed in the reflector-retaining member 4; the recessed portion formed in the first support member and the first ball.

In this way, in the reflector driving device 101B, similar to the cases of the reflector driving device 101 and the reflector driving device 101A, the reflector-retaining member 4 and the first support member 5 are connected by the first shank portion CN1 so that the reflector-retaining member 4 becomes swingable relative to the first support member 5 about the swing axis SA1.

Also, similar to the reflector driving device 101, the reflector driving device 101B includes the second shank portion CN2 (not seeable in FIG. 16) that includes the projecting portion formed in the first support member 5 and the recessed portion formed in the second support member 6. However, similar to the reflector driving device 101A, the reflector driving device 101B may include the second shank portion including: the recessed portion formed in the first support member 5; the recessed portion formed in the second support member 6; and the second ball.

In this way, in the reflector driving device 101B, similar to the cases of the reflector driving device 101 and the reflector driving device 101A, the first support member 5 and the second support member 6 are connected by the second shank portion CN2 so that the first support member 5 becomes swingable relative to the second support member 6 about the swing axis SA2.

Also, as illustrated in FIG. 16, the reflector driving device 101B is different from the reflector driving device 101 in that the biasing member 9 includes a first biasing member 91 and a second biasing member 92. In the reflector driving device 101, the biasing member 9 is configured to serve as both of the first biasing member and the second biasing member.

Figure 18:
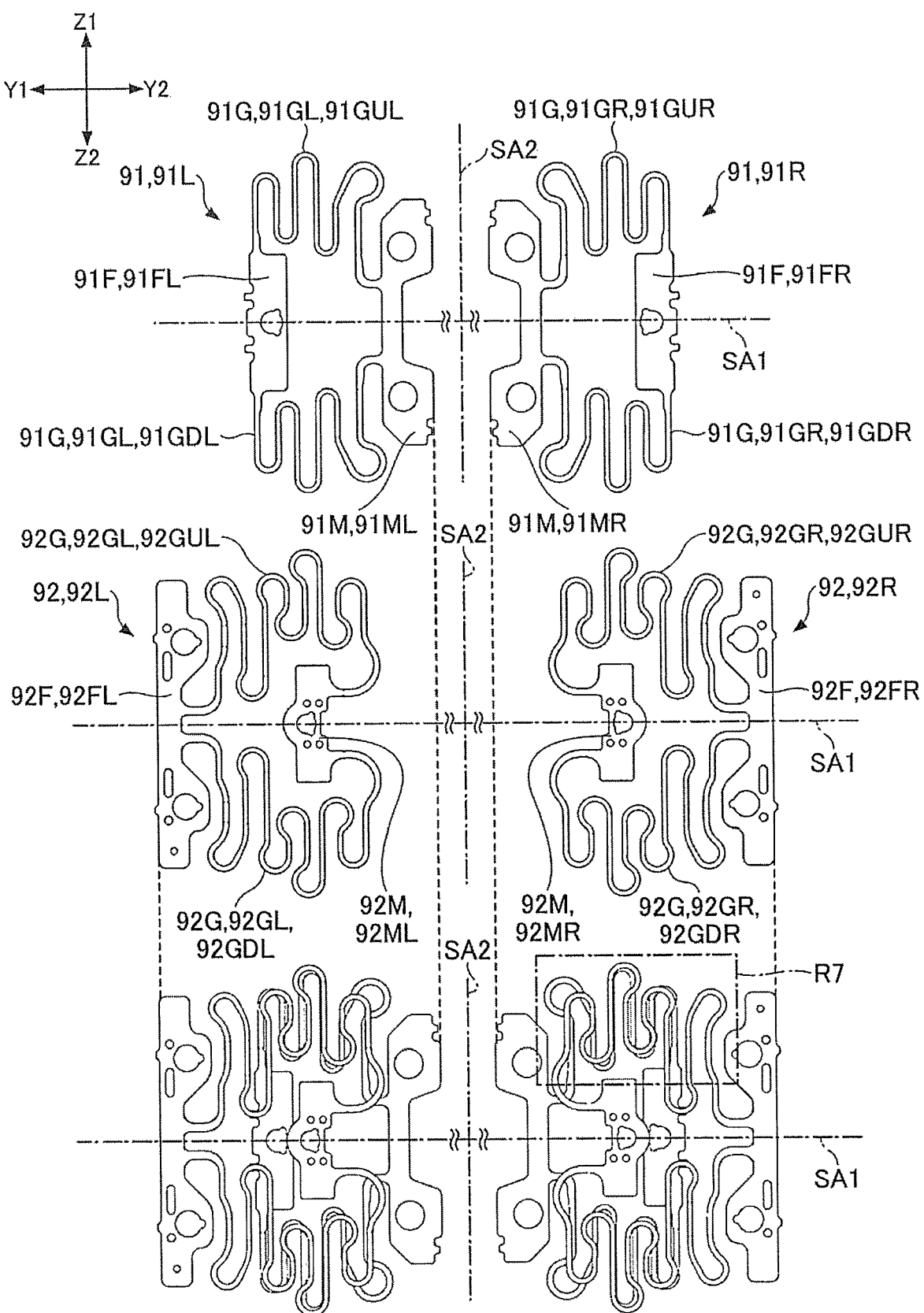
FIG. 18 is a front view of the biasing member of the reflector driving device of FIG. 16.

Next, referring to FIG. 18, details of the biasing member 9 of the reflector driving device 101B will be described. FIG. 18, corresponding to FIG. 5, is a front view of the biasing member 9 of the reflector driving device 101B in the initial state in which the driving mechanism MD does not drive. Specifically, the upper part of FIG. 18 illustrates a front view of the first biasing member 91, and the middle part of FIG. 18 illustrates a front view of the second biasing member 92. Also, the lower part of FIG. 18 illustrates a front view of the first biasing member 91 and the second biasing member 92, and corresponds to a combined view of the upper part of FIG. 18 and the middle part of FIG. 18.

As illustrated in the upper part of FIG. 18, the first biasing member 91 includes: an inner fixing portion 91M to be fixed to the reflector-retaining member 4; an outer fixing portion 91F to be fixed to the first support member 5; and an elastic arm portion 91G that connects the inner fixing portion 91M and the outer fixing portion 91F to each other. Specifically, the first biasing member 91 includes a left-hand inner spring member 91L and a right-hand inner spring member 91R that are disposed to be spaced from each other in the Y-axis direction.

The left-hand inner spring member 91L includes: a left-hand inner fixing portion 91ML to be fixed to the left-hand wall portion of the reflector-retaining member 4; a left-hand outer fixing portion 91FL to be fixed to the left-hand wall portion of the first support member 5; and a left-hand elastic arm portion 91GL that connects the left-hand inner fixing portion 91ML and the left-hand outer fixing portion 91FL to each other. The left-hand elastic arm portion 91GL includes: a left-hand upper elastic arm portion 91GUL that connects the upper portion of the left-hand inner fixing portion 91ML and the upper portion of the left-hand outer fixing portion 91FL to each other; and a left-hand lower elastic arm portion 91GDL that connects the lower portion of the left-hand inner fixing portion 91ML and the lower portion of the left-hand outer fixing portion 91FL to each other. Note that, the left-hand inner fixing portion 91ML, the left-hand outer fixing portion 91FL, or both may be divided into an upper portion and a lower portion.

Likewise, the right-hand inner spring member 91R includes: a right-hand inner fixing portion 91MR to be fixed to the right-hand wall portion of the reflector-retaining member 4; a right-hand outer fixing portion 91FR to be fixed to the right-hand wall portion of the first support member 5; and a right-hand elastic arm portion 91GR that connects the right-hand inner fixing portion 91MR and the right-hand outer fixing portion 91FR to each other. The right-hand elastic arm portion 91GR includes: a right-hand upper elastic arm portion 91GUR that connects the upper portion of the right-hand inner fixing portion 91MR and the upper portion of the right-hand outer fixing portion 91FR to each other; and a right-hand lower elastic arm portion 91GDR that connects the lower portion of the right-hand inner fixing portion 91MR and the lower portion of the right-hand outer fixing portion 91FR to each other. Note that, the right-hand inner fixing portion 91MR, the right-hand outer fixing portion 91FR, or both may be divided into an upper portion and a lower portion.

Also, in the example as illustrated in FIG. 18, the first biasing member 91 is attached to the reflector-retaining member 4 and the first support member 5 such that in a front view, the swing axis SA1 is positioned between the left-hand upper elastic arm portion 91GUL and the left-hand lower elastic arm portion 91GDL and the swing axis SA1 is positioned between the right-hand upper elastic arm portion 91GUR and the right-hand lower elastic arm portion 91GDR. Also, in the example as illustrated in FIG. 18, the left-hand upper elastic arm portion 91GUL and the left-hand lower elastic arm portion 91GDL are configured to be line symmetrical with respect to the swing axis SA1, and the right-hand upper elastic arm portion 91GUR and the right-hand lower elastic arm portion 91GDR are configured to be line symmetrical with respect to the swing axis SA1.

Also, as illustrated in the middle part of FIG. 18, the second biasing member 92 includes: an inner fixing portion 92M to be fixed to the first support member 5; an outer fixing portion 92F to be fixed to the second support member 6; and an elastic arm portion 92G that connects the inner fixing portion 92M and the outer fixing portion 92F to each other. Specifically, the second biasing member 92 includes a left-hand outer spring member 92L and a right-hand outer spring member 92R that are disposed to be spaced from each other in the Y-axis direction.

The left-hand outer spring member 92L includes: a left-hand inner fixing portion 92ML to be fixed to the left-hand wall portion of the first support member 5; a left-hand outer fixing portion 92FL to be fixed to the left-hand wall portion of the second support member 6; and a left-hand elastic arm portion 92GL that connects the left-hand inner fixing portion 92ML and the left-hand outer fixing portion 92FL to each other. The left-hand elastic arm portion 92GL includes: a left-hand upper elastic arm portion 92GUL that connects the upper portion of the left-hand inner fixing portion 92ML and the upper portion of the left-hand outer fixing portion 92FL to each other; and a left-hand lower elastic arm portion 92GDL that connects the lower portion of the left-hand inner fixing portion 92ML and the lower portion of the left-hand outer fixing portion 92FL to each other. Note that, the left-hand inner fixing portion 92ML, the left-hand outer fixing portion 92FL, or both may be divided into an upper portion and a lower portion.

Likewise, the right-hand outer spring member 92R includes: a right-hand inner fixing portion 92MR to be fixed to the right-hand wall portion of the first support member 5; a right-hand outer fixing portion 92FR to be fixed to the right-hand wall portion of the second support member 6; and a right-hand elastic arm portion 92GR that connects the right-hand inner fixing portion 92MR and the right-hand outer fixing portion 92FR to each other. The right-hand elastic arm portion 92GR includes: a right-hand upper elastic arm portion 92GUR that connects the upper portion of the right-hand inner fixing portion 92MR and the upper portion of the right-hand outer fixing portion 92FR to each other; and a right-hand lower elastic arm portion 92GDR that connects the lower portion of the right-hand inner fixing portion 92MR and the lower portion of the right-hand outer fixing portion 92FR to each other. Note that, the right-hand inner fixing portion 92MR, the right-hand outer fixing portion 92FR, or both may be divided into an upper portion and a lower portion.

Also, in the example as illustrated in FIG. 18, the second biasing member 92 is attached to the first support member 5 and the second support member 6 such that in a front view, the swing axis SA1 is positioned between the left-hand upper elastic arm portion 92GUL and the left-hand lower elastic arm portion 92GDL and the swing axis SA1 is positioned between the right-hand upper elastic arm portion 92GUR and the right-hand lower elastic arm portion 92GDR. Also, in the example as illustrated in FIG. 18, the left-hand upper elastic arm portion 92GUL and the left-hand lower elastic arm portion 92GDL are configured to be line symmetrical with respect to the swing axis SA1, and the right-hand upper elastic arm portion 92GUR and the right-hand lower elastic arm portion 92GDR are configured to be line symmetrical with respect to the swing axis SA1.

Note that, in the illustrated example, the left-hand inner spring member 91L and the left-hand outer spring member 92L constitute the left-hand spring member 9L, and the right-hand inner spring member 91R and the right-hand outer spring member 92R constitute the right-hand spring member 9R.

Next, referring to FIG. 19A to FIG. 19D, FIG. 20A, and FIG. 20B, a connection relationship between: the first biasing member 91 and the second biasing member 92; and the reflector-retaining member 4, the first support member 5, and the second support member 6 will be described.

Figure 19A:
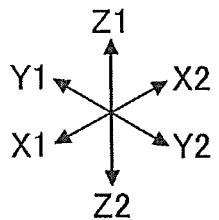
FIG. 19A is a perspective front view of the biasing member as viewed from the upper right diagonal direction, with the biasing member being attached to the reflector-retaining member, the first support member, and the second support member of the reflector driving device of FIG. 16.
Figure 19A:
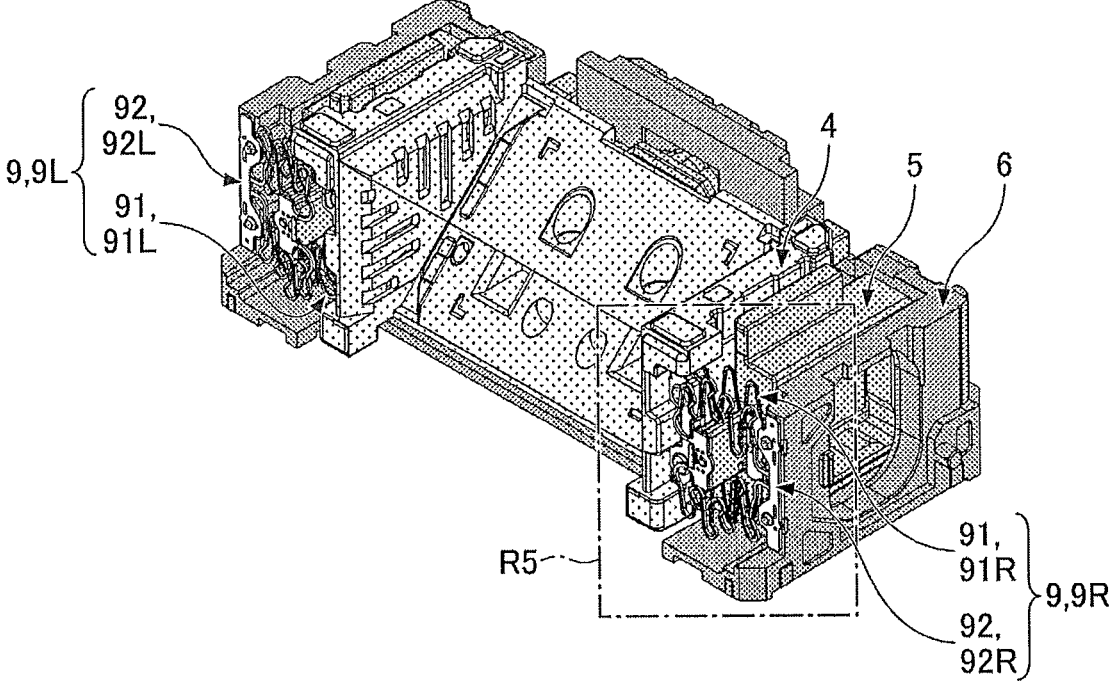
Figure 19B:
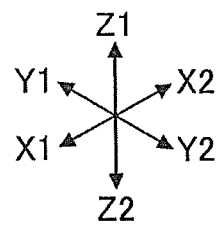
FIG. 19B is a perspective front view of a first biasing member as viewed from the upper right diagonal direction, with the first biasing member being attached to the reflector-retaining member and the first support member of the reflector driving device of FIG. 16.
Figure 19B:
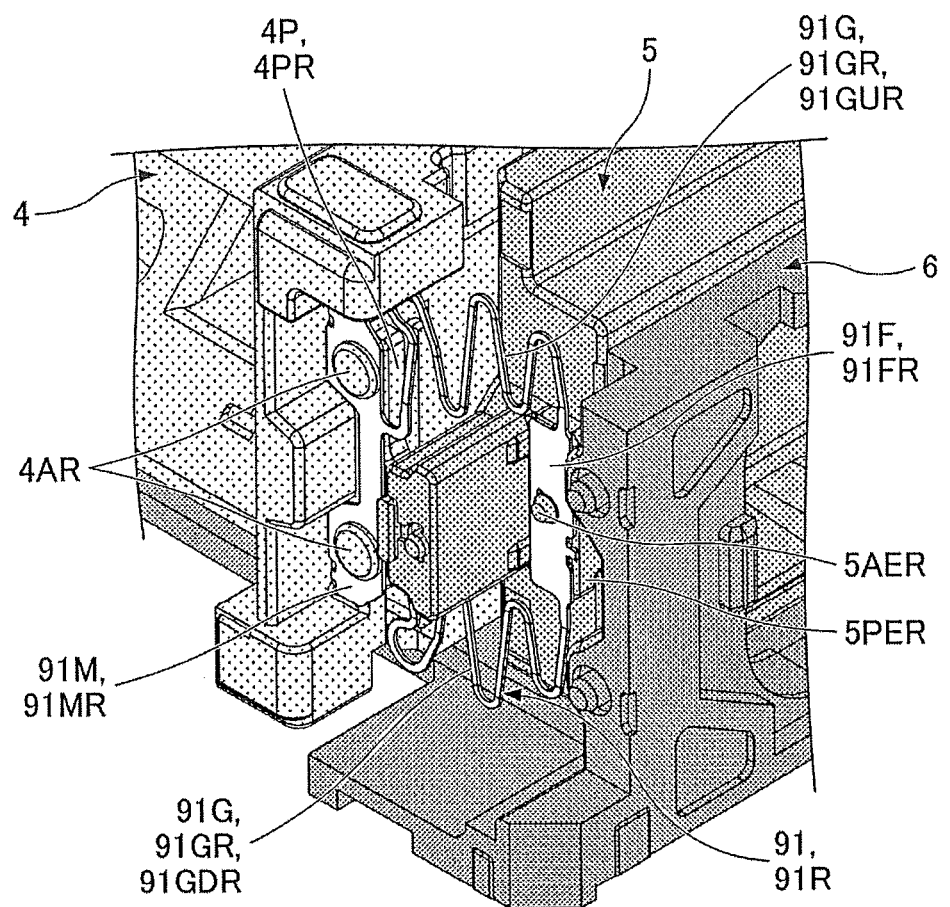
Figure 19C:
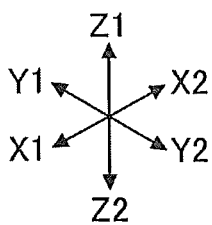
FIG. 19C is a perspective front view of a second biasing member as viewed from the upper right diagonal direction, with the second biasing member being attached to the first support member and the second support member of the reflector driving device of FIG. 16.
Figure 19C:
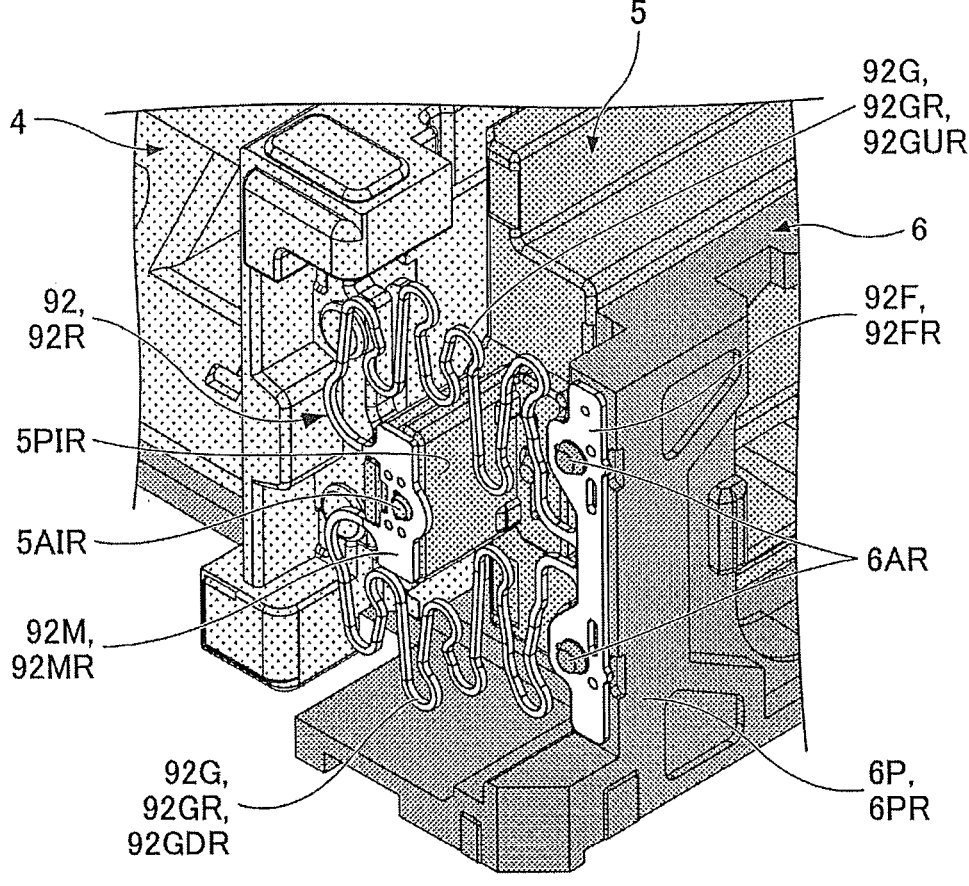
Figure 19D:
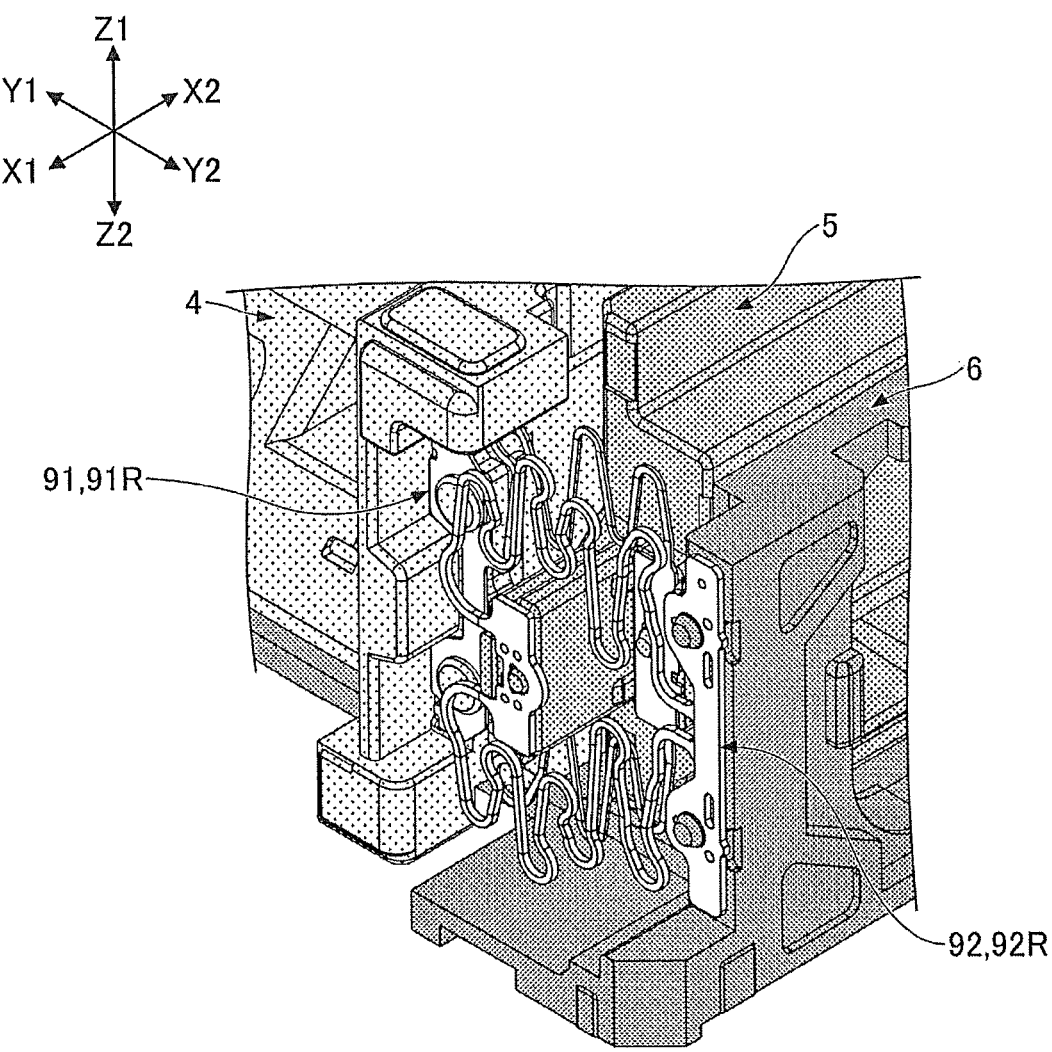
FIG. 19D is a perspective front view of the first biasing member and the second biasing member of the reflector driving device of FIG. 16, as viewed from the upper right diagonal direction.

FIG. 19A to FIG. 19D are perspective views of the biasing member 9 attached to the reflector-retaining member 4, the first support member 5, and the second support member 6. Specifically, FIG. 19A, corresponding to FIG. 10A, is a perspective view of the entirety of the reflector-retaining member 4, the first support member 5, the second support member 6, and the biasing member 9. FIG. 19B to FIG. 19D correspond to enlarged views of a region R5 surrounded by a chain line in FIG. 19A. More specifically, FIG. 19B is a perspective view of the right-hand inner spring member 91R attached to the reflector-retaining member 4 and the first support member, FIG. 19C is a perspective view of the right-hand outer spring member 92R attached to the first support member 5 and the second support member 6, and FIG. 19D is a perspective view of the right-hand inner spring member 91R and the right-hand outer spring member 92R. Note that, in FIG. 19A to FIG. 19D, for ease of understanding, the reflector-retaining member 4 is given a rough dot pattern, the first support member 5 is given a fine dot pattern, and the second support member 6 is given a finer dot pattern.

Figure 20A:
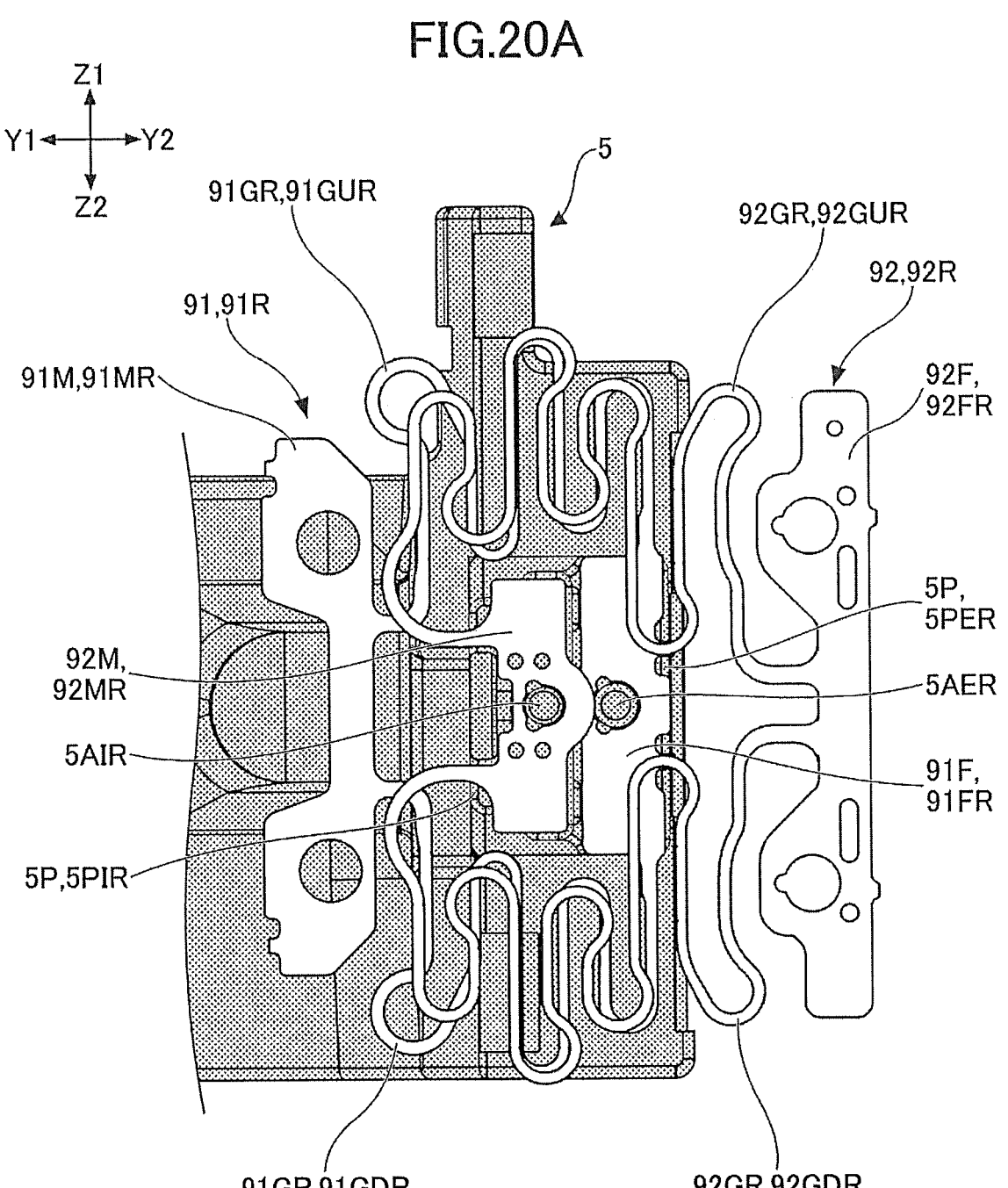
FIG. 20A is a front view of the first biasing member and the second biasing member of the reflector driving device of FIG. 16.
Figure 20B:
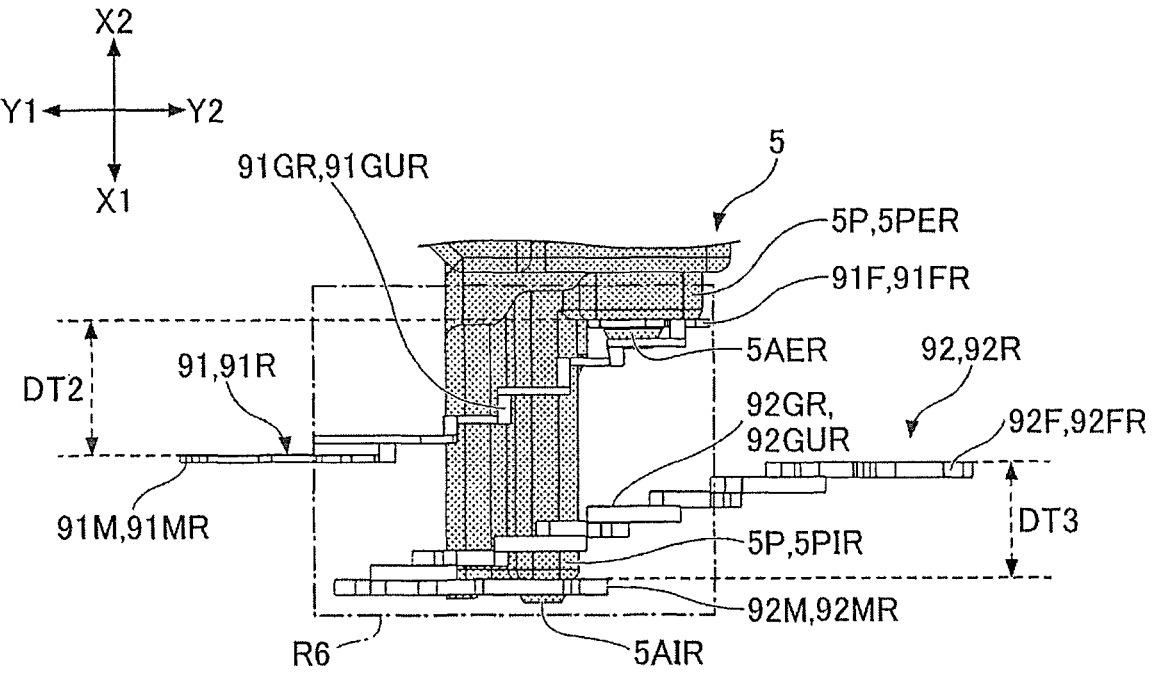
FIG. 20B is a top view of the first biasing member and the second biasing member of the reflector driving device of FIG. 16.

FIG. 20A and FIG. 20B illustrate the biasing member 9 attached to the first support member 5. Specifically, FIG. 20A is a front view of the biasing member 9 (the right-hand spring member 9R) attached to the first support member 5, and FIG. is a top view of the biasing member 9 (the right-hand spring member 9R) attached to the first support member 5. Note that, in FIG. 20A and FIG. for ease of understanding, the first support member 5 is given a dot pattern.

The following description made referring to FIG. 19A to FIG. 19D, FIG. 20A, and FIG. 20B is related to the arrangement of the right-hand inner spring member 91R and the right-hand outer spring member 92R, but the same applies to the arrangement of the left-hand inner spring member 91L and the left-hand outer spring member 92L.

As described above, the right-hand spring member 9R includes the right-hand inner spring member 91R and the right-hand outer spring member 92R that are disposed to be spaced from each other in the X-axis direction. Specifically, as illustrated in FIG. 19B, the right-hand inner spring member 91R includes: the right-hand inner fixing portion 91MR to be fixed to the right-hand base portion 4PR of the right-hand wall portion of the reflector-retaining member 4; the right-hand outer fixing portion 91FR to be fixed to a right-hand outer base portion 5PER of the right-hand wall portion of the first support member 5; the right-hand upper elastic arm portion 91GUR that connects the upper portion of the right-hand inner fixing portion 91MR and the upper portion of the right-hand outer fixing portion 91FR to each other; and the right-hand lower elastic arm portion 91GDR that connects the lower portion of the right-hand inner fixing portion 91MR and the lower portion of the right-hand outer fixing portion 91FR to each other.

In the illustrated example, the right-hand base portion 4PR of the right-hand wall portion of the reflector-retaining member 4 includes, as illustrated in FIG. 19B, two round-shaped projecting bulges 4AR that project frontward (X1 direction) from the front (X1-side) surface. The bulges 4AR correspond to two through-holes formed in the right-hand inner fixing portion 91MR.

Specifically, the right-hand inner fixing portion 91MR is attached and fixed to the right-hand base portion 4PR including the bulges 4AR. Fixation of the right-hand inner fixing portion 91MR to the right-hand base portion 4PR is realized through thermal caulking of the bulge 4AR inserted into the through-hole formed in the right-hand inner fixing portion 91MR.

In FIG. 19A to FIG. 19D, the bulges 4AR are illustrated in a state in which the tips thereof are deformed after thermal caulking. The same applies to other drawings illustrating the bulges 4AR. Note that, fixation of the right-hand inner fixing portion 91MR to the right-hand base portion 4PR may be realized through application of an adhesive to the bulges 4AR inserted into the through-holes formed in the right-hand inner fixing portion 91MR.

Also, in the illustrated example, the right-hand outer base portion 5PER of the right-hand wall portion of the first support member 5 includes, as illustrated in FIG. 19B, a round-shaped projecting right-hand outer bulge 5AER that projects frontward (X1 direction) from the front (X1-side) surface. The right-hand outer bulge 5AER corresponds to the through-hole formed in the right-hand outer fixing portion 91FR.

Specifically, the right-hand outer fixing portion 91FR is attached and fixed to the right-hand outer base portion 5PER including the right-hand outer bulge 5AER. Fixation of the right-hand outer fixing portion 91FR to the right-hand outer base portion 5PER is realized through application of an adhesive to the right-hand outer bulge 5AER inserted into the through-hole formed in the right-hand outer fixing portion 91FR. Note that, fixation of the right-hand outer fixing portion 91FR to the right-hand outer base portion 5PER may be realized through thermal caulking of the right-hand outer bulge 5AER inserted into the through-hole formed in the right-hand outer fixing portion 91FR.

Also, as illustrated in FIG. 19C, the right-hand outer spring member 92R includes: the right-hand inner fixing portion 92MR to be fixed to a right-hand inner base portion 5PIR of the right-hand wall portion of the first support member 5; the right-hand outer fixing portion 92FR to be fixed to the right-hand base portion 6PR of the right-hand wall portion of the second support member 6; the right-hand upper elastic arm portion 92GUR that connects the upper portion of the right-hand inner fixing portion 92MR and the upper portion of the right-hand outer fixing portion 92FR to each other; and the right-hand lower elastic arm portion 92GDR that connects the lower portion of the right-hand inner fixing portion 92MR and the lower portion of the right-hand outer fixing portion 92FR to each other.

In the illustrated example, the right-hand inner base portion 5PIR of the right-hand wall portion of the first support member 5 includes, as illustrated in FIG. 19C, a round-shaped projecting right-hand inner bulge 5AIR that projects frontward (X1 direction) from the front (X1-side) surface. The right-hand inner bulge 5AIR corresponds to the through-hole formed in the right-hand inner fixing portion 92MR.

Specifically, the right-hand inner fixing portion 92MR is attached and fixed to the right-hand inner base portion 5PIR including the right-hand inner bulge 5AIR. Fixation of the right-hand inner fixing portion 92MR to the right-hand inner base portion 5PIR is realized through application of an adhesive to the right-hand inner bulge 5AIR inserted into the through-hole formed in the right-hand inner fixing portion 92MR. Note that, fixation of the right-hand inner fixing portion 92MR to the right-hand inner base portion 5PIR may be realized through thermal caulking of the right-hand inner bulge 5AIR inserted into the through-hole formed in the right-hand inner fixing portion 92MR.

Also, in the illustrated example, the right-hand base portion 6PR of the right-hand wall portion of the second support member 6 includes, as illustrated in FIG. 19C, two round-shaped projecting right-hand bulges 6AR that project frontward (X1 direction) from the front (X1-side) surface. The right-hand bulges 6AR correspond to two through-holes formed in the right-hand outer fixing portion 92FR.

Specifically, the right-hand outer fixing portion 92FR is attached and fixed to the right-hand base portion 6PR including the right-hand bulges 6AR. Fixation of the right-hand outer fixing portion 92FR to the right-hand base portion 6PR is realized through application of an adhesive to the right-hand bulges 6AR inserted into the through-holes formed in the right-hand outer fixing portion 92FR. Note that, fixation of the right-hand outer fixing portion 92FR to the right-hand base portion 6PR may be realized through thermal caulking of the right-hand bulges 6AR inserted into the through-holes formed in the right-hand outer fixing portion 92FR.

Also, as illustrated in FIG. 20A and FIG. the right-hand inner spring member 91R is fixed to the reflector-retaining member 4 and the first support member 5 such that the right-hand inner fixing portion 91MR and the right-hand outer fixing portion 91FR become approximately parallel to each other in the initial state in which both of the first driving mechanism MD1 and the second driving mechanism MD2 do not drive. Specifically, in the initial state, the right-hand inner fixing portion 91MR and the right-hand outer fixing portion 91FR are disposed with the gap DT2 in the X-axis direction as illustrated in FIG. 20B, and are fixed to the reflector-retaining member 4 and the first support member 5 so as to be approximately parallel to each other along the Z-axis direction as illustrated in FIG. 20A. In other words, the reflector-retaining member 4 and the first support member 5 are configured such that an attachment surface of the reflector-retaining member 4 to which the right-hand inner fixing portion 91MR is to be attached and an attachment surface of the first support member 5 to which the right-hand outer fixing portion 91FR is to be attached become approximately parallel to each other in the initial state. The same applies to the left-hand inner spring member 91L.

Also, as illustrated in FIG. 20A and FIG. the right-hand outer spring member 92R is fixed to the first support member 5 and the second support member 6 such that the right-hand inner fixing portion 92MR and the right-hand outer fixing portion 92FR become approximately parallel to each other in the initial state in which both of the first driving mechanism MD1 and the second driving mechanism MD2 do not drive. Specifically, in the initial state, the right-hand inner fixing portion 92MR and the right-hand outer fixing portion 92FR are disposed with the gap DT3 in the X-axis direction as illustrated in FIG. 20B, and are fixed to the first support member 5 and the second support member 6 so as to be approximately parallel to each other along the Z-axis direction as illustrated in FIG. 20A. In other words, the first support member 5 and the second support member 6 are configured such that an attachment surface of the first support member 5 to which the right-hand inner fixing portion 92MR is to be attached and an attachment surface of the second support member 6 to which the right-hand outer fixing portion 92FR is to be attached become approximately parallel to each other in the initial state. The same applies to the left-hand outer spring member 92L.

With this arrangement, in the initial state, the biasing member 9, which includes: the left-hand spring member 9L including the left-hand inner spring member 91L and the left-hand outer spring member 92L; and the right-hand spring member 9R including the right-hand inner spring member 91R and the right-hand outer spring member 92R, can bias the reflector-retaining member 4 backward (X2 side) and at the same time can bias the first support member 5 backward (X2 side). That is, in the initial state, the biasing member 9, which includes: the first biasing member 91 including the left-hand inner spring member 91L and the right-hand inner spring member 91R; and the second biasing member 92 including the left-hand outer spring member 92L and the right-hand outer spring member 92R, can bias the reflector-retaining member 4 backward (X2 side) and at the same time can bias the first support member 5 backward (X2 side).

Figure 21:
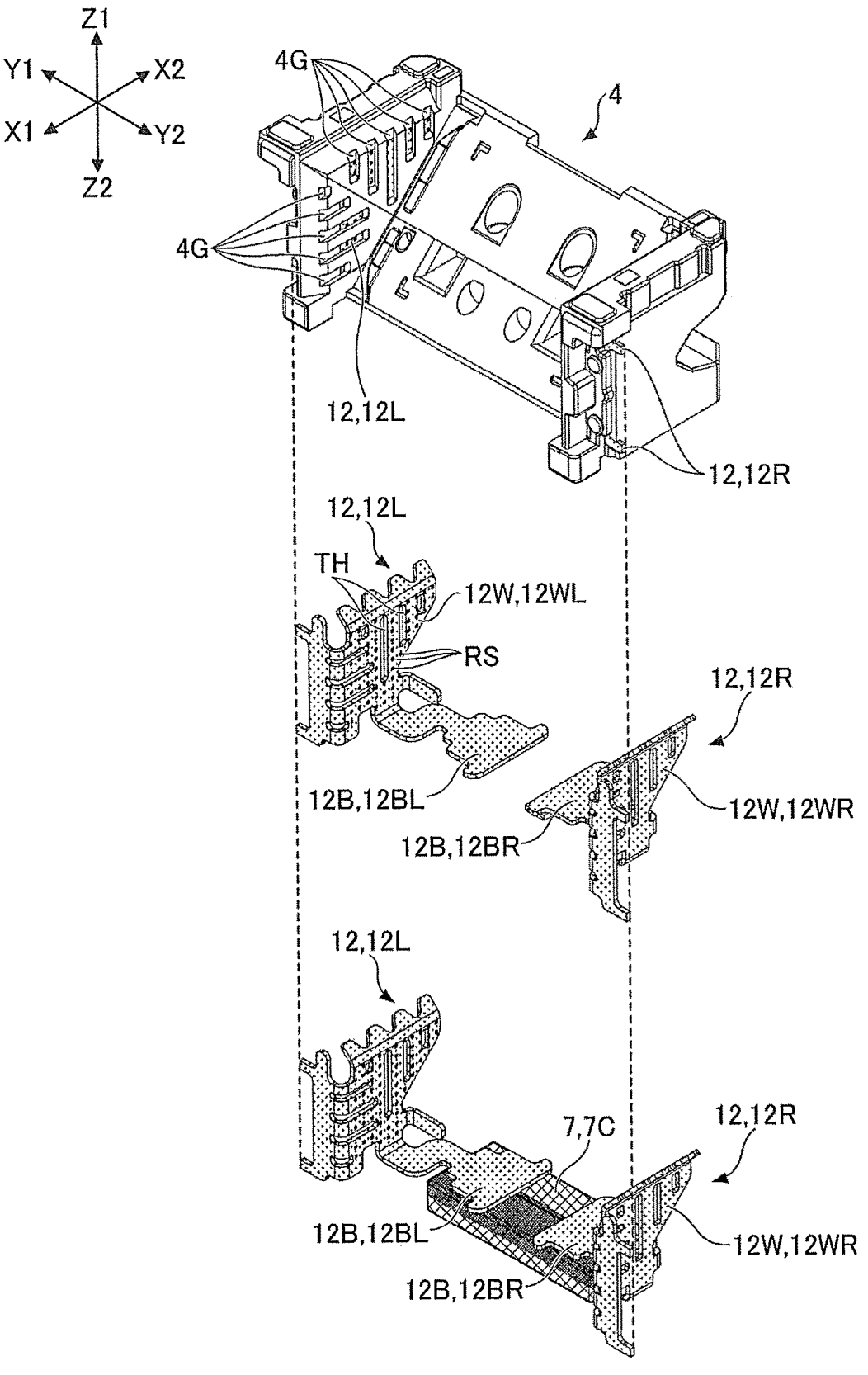
FIG. 21 is a perspective view of the reflector-retaining member of the reflector driving device of FIG. 16.

Next, referring to FIG. 21, the reflector-retaining member 4 of the reflector driving device 101B will be described. FIG. 21 is a perspective view of the reflector-retaining member 4 of the reflector driving device 101B. Specifically, the upper part of FIG. 21 is a perspective view of the reflector-retaining member 4 in which the magnetic member 12 is embedded, the middle part of FIG. 21 is a perspective view of the magnetic member 12 embedded in the reflector-retaining member 4, and the lower part of FIG. 21 is a perspective view of the magnetic member 12 to which the middle magnet 7C is attached.

The reflector-retaining member 4 of the reflector driving device 101B is different from that of the reflector driving device 101 in that the magnetic member 12 is embedded. In the illustrated example, the magnetic member 12 is embedded in the reflector-retaining member 4 through insert molding.

The magnetic member 12 is configured to function as a back yoke for strengthening a magnetic field generated by the middle magnet 7C. Also, the magnetic member 12 is configured to function as a member for enhancing the adhesion strength between the reflector 1 and the reflector-retaining member 4 and the adhesion strength between the reflector-retaining member 4 and the middle magnet 7C. In the illustrated example, the magnetic member 12 is configured to include a bottom wall portion 12B and a wall portion 12W. Specifically, the magnetic member 12 includes a left-hand magnetic member 12L and a right-hand magnetic member 12R. The left-hand magnetic member 12L includes a left-hand bottom wall portion 12BL and a left-hand wall portion 12WL, and the right-hand magnetic member 12R includes a right-hand bottom wall portion 12BR and a right-hand wall portion 12WR.

The left-hand wall portion 12WL of the left-hand magnetic member 12L is embedded in the left-hand wall portion of the reflector-retaining member 4, the right-hand wall portion 12WR of the right-hand magnetic member 12R is embedded in the right-hand wall portion of the reflector-retaining member 4, and the left-hand bottom wall portion 12BL of the left-hand magnetic member 12L and the right-hand bottom wall portion 12BR of the right-hand magnetic member 12R are embedded in the bottom wall portion of the reflector-retaining member 4.

As illustrated in FIG. 21, a plurality of groove portions 4G are formed in an inner surface (right-hand side) of the left-hand wall portion of the reflector-retaining member 4. The plurality of groove portions 4G are also formed in an inner surface (left-hand side) of the right-hand wall portion of the reflector-retaining member 4, which is not seeable in FIG. 21.

The plurality of groove portions 4G are structures for receiving an adhesive for adhesively fixing the reflector 1 and the reflector-retaining member 4. Since the adhesive applied between the reflector 1 and the reflector-retaining member 4 is cured in inner portions of the plurality of groove portions 4G, it is possible to enhance the adhesion strength between the reflector 1 and the reflector-retaining member 4. Also, some of the plurality of groove portions 4G are configured such that a part of the wall portion 12W embedded in the reflector-retaining member 4 is exposed. As illustrated in the middle part of FIG. 21, the part of the wall portion 12W exposed to an inner bottom surface of the groove portion 4G is provided with a plurality of recessed portions RS. The plurality of recessed portions RS are structures for receiving an adhesive for adhesively fixing the reflector 1 and the reflector-retaining member 4. Since the adhesive applied between the reflector 1 and the reflector-retaining member 4 is cured in inner portions of the plurality of recessed portions RS, it is possible to enhance the adhesion strength between the reflector 1 and the reflector-retaining member 4. In the middle part of FIG. 21, for ease of understanding, only some of the plurality of recessed portions RS are indicated by lead lines. With this configuration, the magnetic member 12 can enhance the adhesion strength between the reflector 1 and the reflector-retaining member 4.

Also, as illustrated in the middle part of FIG. 21, the wall portion 12W is provided with a plurality of through-holes TH. The plurality of through-holes TH are for a resin to reach the entire region within a mold upon injection molding of the reflector-retaining member 4. In the middle part of FIG. 21, for ease of understanding, only some of the plurality of through-holes TH are indicated by lead lines.

Also, the magnetic member 12 is embedded in the reflector-retaining member 4 such that the bottom surface of the bottom wall portion 12B is exposed. Specifically, the left-hand magnetic member 12L is embedded in the reflector-retaining member 4 such that the bottom surface of the left-hand bottom wall portion 12BL is exposed, and the right-hand magnetic member 12R is embedded in the reflector-retaining member 4 such that the bottom surface of the right-hand bottom wall portion 12BR is exposed. As illustrated in the lower part of FIG. 21, the middle magnet 7C is disposed so as to be attached to the bottom surface of the bottom wall portion 12B exposed to the bottom surface of the reflector-retaining member 4. With this configuration, the magnetic member 12 can enhance the adhesion strength between the middle magnet 7C and the reflector-retaining member 4 that are housed in the recessed portion 4E (not seeable in FIG. 21) formed in the bottom surface of the reflector-retaining member 4 and are adhesively fixed to each other. Also, the magnetic member 12 can suppress leak of the magnetic field generated by the middle magnet 7C.

Figure 22:
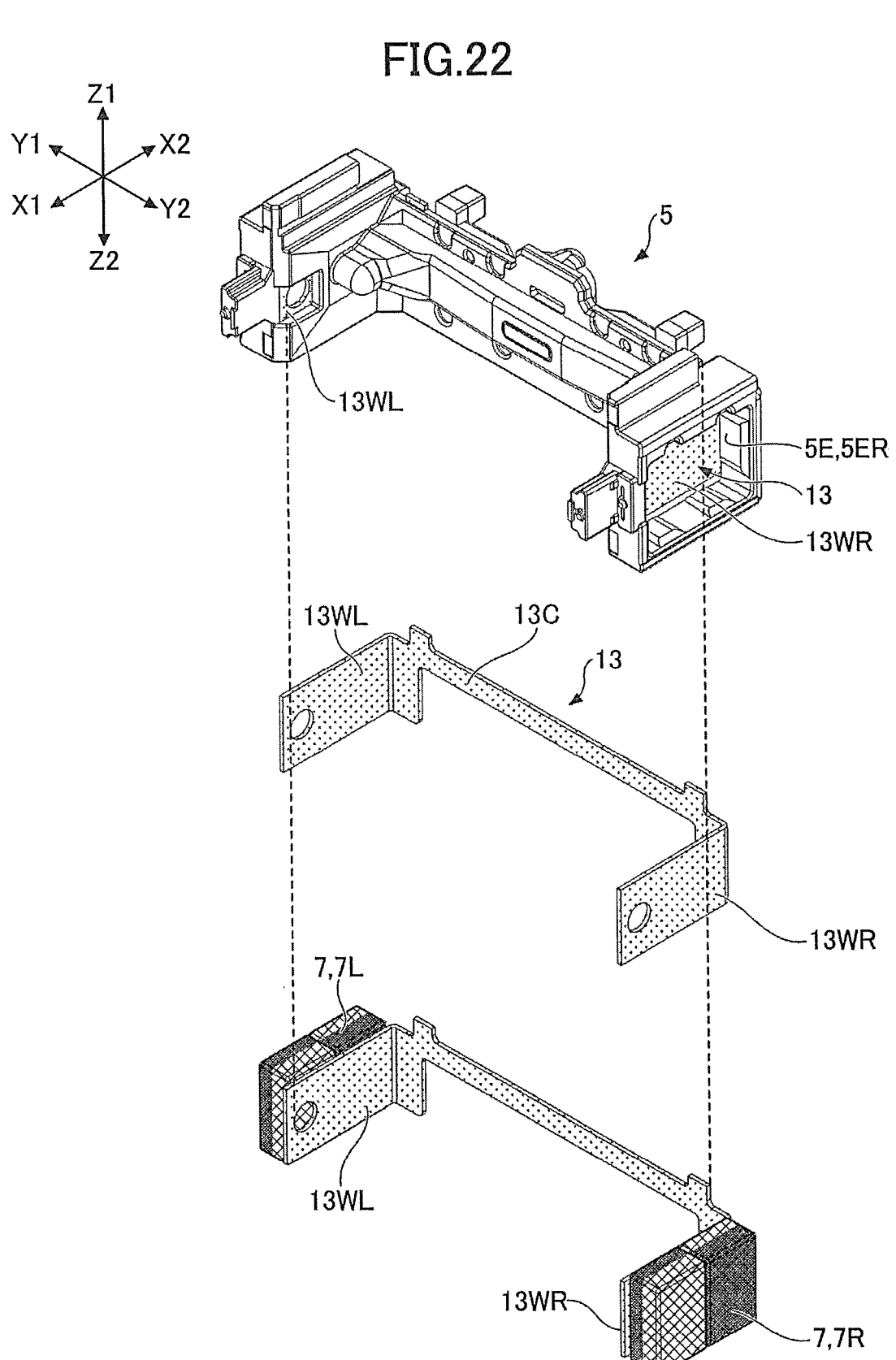
FIG. 22 is a perspective view of the first support member of the reflector driving device of FIG. 16.

Next, referring to FIG. 22, the first support member 5 of the reflector driving device 101B will be described. FIG. 22 is a perspective view of the first support member 5 of the reflector driving device 101B. Specifically, the upper part of FIG. 22 is a perspective view of the first support member 5 in which the magnetic member 13 is embedded, the middle part of FIG. 22 is a perspective view of the magnetic member 13 embedded in the first support member 5, and the lower part of FIG. 22 is a perspective view of the magnetic member 13 to which the left-hand magnet 7L and the right-hand magnet 7R are attached.

The first support member 5 of the reflector driving device 101B is different from that of the reflector driving device 101 in that the magnetic member 13 is embedded.

The magnetic member 13 is configured to function as a back yoke for strengthening a magnetic field generated by each of the left-hand magnet 7L and the right-hand magnet 7R. Also, the magnetic member 13 is configured to function as a member for enhancing the adhesion strength between the first support member 5 and each of the left-hand magnet 7L and the right-hand magnet 7R. In the illustrated example, the magnetic member 13 is configured to include a left-hand wall portion 13WL, a right-hand wall portion 13WR, and a connecting portion 13C that connects the left-hand wall portion 13WL and the right-hand wall portion 13WR to each other.

The left-hand wall portion 13WL of the magnetic member 13 is embedded in the left-hand wall portion of the first support member 5, the right-hand wall portion 13WR of the magnetic member 13 is embedded in the right-hand wall portion of the first support member 5, and the connecting portion 13C of the magnetic member 13 is embedded in the back-side wall portion of the first support member 5.

Also, the magnetic member 13 is embedded in the first support member 5 such that the outer surface (left-hand lateral surface) of the left-hand wall portion 13WL is exposed and the outer surface (right-hand lateral surface) of the right-hand wall portion 13WR is exposed. As illustrated in the lower part of FIG. 22, the left-hand magnet 7L is disposed so as to be attached to the left-hand lateral surface of the left-hand wall portion 13WL exposed to the left-hand lateral surface of the first support member 5, and the right-hand magnet 7R is disposed so as to be attached to the right-hand lateral surface of the right-hand wall portion 13WR exposed to the right-hand lateral surface of the first support member 5. With this configuration, the magnetic member 13 can enhance: the adhesion strength between the left-hand magnet 7L and the first support member 5 that are housed in the left-hand recessed portion 5EL (not seeable in FIG. 22) formed in the left-hand lateral surface of the first support member 5 and are adhesively fixed to each other; and the adhesion strength between the right-hand magnet 7R and the first support member 5 that are housed in the right-hand recessed portion 5ER formed in the right-hand lateral surface of the first support member 5 and are adhesively fixed to each other. Also, the magnetic member 13 can suppress leak of the magnetic field generated by each of the left-hand magnet 7L and the right-hand magnet 7R.

As described above, in the reflector driving device according to the embodiments of the present invention 101B, the first biasing member 91 is formed of the leaf spring, and the second biasing member 92 is formed of another leaf spring different from the leaf spring forming the first biasing member 91. In the illustrated example, the leaf spring forming the first biasing member 91 includes the left-hand inner spring member 91L and the right-hand inner spring member 91R, and the leaf spring forming the second biasing member 92 includes the left-hand outer spring member 92L and the right-hand outer spring member 92R.

This configuration produces the effect of being able to more stably swing the reflector. This is because the reflector-retaining member 4 and the second support member 6 are not connected by the biasing member 9 (leaf spring). Specifically, when the second driving mechanism MD2 swings the first support member 5 relative to the second support member 6 about the swing axis SA2, since the reflector-retaining member 4 does not relatively swing relative to the first support member 5, the reflector-retaining member 4 relatively swings along with the first support member 5 relative to the second support member 6. If the reflector-retaining member 4 and the second support member 6 are connected by the biasing member 9 (leaf spring), the biasing member 9 (leaf spring) generates a force to move the reflector-retaining member 4 relative to the first support member 5 in the Y-axis direction. Therefore, this configuration may cause the reflector-retaining member 4 to move (laterally slide) relative to the first support member 5. Meanwhile, in the reflector driving device 101B, the reflector-retaining member 4 and the second support member 6 are not connected by the biasing member 9 (leaf spring). Thus, even when the second driving mechanism MD2 swings the first support member 5 relative to the second support member 6 about the swing axis SA2, the biasing member 9 (leaf spring) does not generate such a force to move the reflector-retaining member 4 relative to the first support member 5 in the Y-axis direction. Therefore, this configuration produces the effect of being able to more reliably suppress the reflector-retaining member 4 from moving (laterally sliding) relative to the first support member 5 in the Y-axis direction.

Also, the leaf spring forming the first biasing member 91 and the different leaf spring forming the second biasing member 92 may be disposed at different positions in a biasing direction (X-axis direction), in which the first biasing member 91 biases the reflector-retaining member 4, so as to have a portion where the leaf spring and the different leaf spring face each other with a gap. In the illustrated example, the leaf spring (the right-hand inner spring member 91R) forming the first biasing member 91 and the different leaf spring (the right-hand outer spring member 92R) forming the second biasing member 92 are, as illustrated in FIG. 20B, disposed at different positions in the X-axis direction so as to have a portion where the leaf spring and the different leaf spring face each other with a gap in the X-axis direction. Note that, in FIG. 20B, for ease of understanding, a region R6 including the portion where the leaf spring and the different leaf spring face each other with the gap in the X-axis direction is surrounded by a chain line.

This configuration produces the effect of being able to efficiently utilize the space within the reflector driving device 101B and realize downsizing of the reflector driving device 101B.

Also, the different leaf spring forming the second biasing member 92 may be disposed farther away from the swing axis SA1 serving as the first axis than the leaf spring forming the first biasing member 91. In the illustrated example, the different leaf spring (the right-hand outer spring member 92R) forming the second biasing member 92 is disposed at a farther position away from the swing axis SA1 than the leaf spring (the right-hand inner spring member 91R) forming the first biasing member 91; i.e., the different leaf spring is disposed frontward (X1 side) of the leaf spring (the right-hand inner spring member 91R) forming the first biasing member 91. Note that, the different leaf spring (the right-hand outer spring member 92R) forming the second biasing member 92 may be disposed at a closer position to the swing axis SA1 than the leaf spring (the right-hand inner spring member 91R) forming the first biasing member 91; i.e., the different leaf spring may be disposed backward (X2 side) of the leaf spring (the right-hand inner spring member 91R) forming the first biasing member 91.

This configuration produces the effect of being able to enhance ease of assembly of the reflector driving device 101B and hence to enhance productivity of a production line of the reflector driving device 101B. This is because the first biasing member 91 and the second biasing member 92 can be attached to each of the reflector-retaining member 4, the first support member 5, and the second support member 6 without interference between the first biasing member 91 and the second biasing member 92.

Also, the leaf spring forming the first biasing member 91 may include: the inner fixing portion 91M serving as a first fixing portion to be fixed to the reflector-retaining member 4; the outer fixing portion 91F serving as a second fixing portion to be fixed to the first support member 5; and the elastic arm portion 91G serving as a first elastic arm portion provided between the inner fixing portion 91M and the outer fixing portion 91F. Also, the different leaf spring forming the second biasing member 92 may include: the inner fixing portion 92M serving as a third fixing portion to be fixed to the first support member 5; the outer fixing portion 92F serving as a fourth fixing portion to be fixed to the second support member 6; and the elastic arm portion 92G serving as a second elastic arm portion provided between the inner fixing portion 92M and the outer fixing portion 92F. In this case, in the initial state in which the first driving mechanism MD1 and the second driving mechanism MD2 do not drive, the plate surfaces of the inner fixing portion 91M, the outer fixing portion 91F, the inner fixing portion 92M, and the outer fixing portion 92F may be approximately parallel to each other. In the illustrated example, as illustrated in FIG. 18, the inner fixing portion 91M includes the left-hand inner fixing portion 91ML and the right-hand inner fixing portion 91MR; the outer fixing portion 91F includes the left-hand outer fixing portion 91FL and the right-hand outer fixing portion 91FR; the inner fixing portion 92M includes the left-hand inner fixing portion 92ML and the right-hand inner fixing portion 92MR; and the outer fixing portion 92F includes the left-hand outer fixing portion 92FL and the right-hand outer fixing portion 92FR. As illustrated in FIG. 20B, the plate surfaces of the right-hand inner fixing portion 91MR, the right-hand outer fixing portion 91FR, the right-hand inner fixing portion 92MR, and the right-hand outer fixing portion 92FR are disposed so as to be parallel to each other along the YZ plane.

This configuration produces the effect of being able to enhance ease of assembly of the reflector driving device 101B and hence to enhance productivity of a production line of the reflector driving device 101B. This is because the leaf spring can be readily attached to each of the reflector-retaining member 4, the first support member 5, and the second support member 6.

Also, as illustrated in the upper part of FIG. 18, the leaf spring forming the first biasing member 91 may include: the left-hand inner spring member 91L serving as the first spring member; and the right-hand inner spring member 91R serving as the second spring member, the left-hand inner spring member 91L and the right-hand inner spring member 91R being disposed to be spaced from each other. Each of the left-hand inner spring member 91L and the right-hand inner spring member 91R may include the elastic arm portion 91G serving as two first elastic arm portions each connecting the inner fixing portion 91M serving as the first fixing portion and the outer fixing portion 91F serving as the second fixing portion to each other. As viewed along the biasing direction (X-axis direction), the swing axis SA1 serving as the first axis may be, as illustrated in the upper part of FIG. 18, positioned between the two elastic arm portions 91G in the left-hand inner spring member 91L and positioned between the two elastic arm portions 91G in the right-hand inner spring member 91R.

Also, as illustrated in the middle part of FIG. 18, the different leaf spring forming the second biasing member 92 may include: the left-hand outer spring member 92L serving as a third spring member; and the right-hand outer spring member 92R serving as a fourth spring member, the left-hand outer spring member 92L and the right-hand outer spring member 92R being disposed to be spaced from each other. Each of the left-hand outer spring member 92L and the right-hand outer spring member 92R may include the elastic arm portion 92G serving as the two second elastic arm portions each connecting the inner fixing portion 92M serving as the third fixing portion and the outer fixing portion 92F serving as the fourth fixing portion to each other. As viewed along the biasing direction (X-axis direction), the swing axis SA1 serving as the first axis may be, as illustrated in the middle part of FIG. 18, positioned between the two elastic arm portions 92G in the left-hand outer spring member 92L and positioned between the two elastic arm portions 92G in the right-hand outer spring member 92R.

This configuration produces the effect of being able to realize stable swing of the reflector. This is because in a front view, each of the left-hand inner spring member 91L and the right-hand inner spring member 91R is disposed so as to be top-and-bottom symmetrical with respect to the swing axis SA1. Also, this is because in a front view, the left-hand inner spring member 91L and the right-hand inner spring member 91R are disposed so as to be left-and-right symmetrical with respect to the swing axis SA2. Also, this is because in a front view, each of the left-hand outer spring member 92L and the right-hand outer spring member 92R is disposed so as to be top-and-bottom symmetrical with respect to the swing axis SA1. Also, this is because in a front view, the left-hand outer spring member 92L and the right-hand outer spring member 92R are disposed so as to be left-and-right symmetrical with respect to the swing axis SA2.

Also, as illustrated in the upper part of FIG. 18, the leaf spring forming the first biasing member 91 (the left-hand inner spring member 91L and the right-hand inner spring member 91R) may include: the inner fixing portion 91M serving as the first fixing portion to be fixed to the reflector-retaining member 4; the outer fixing portion 91F serving as the second fixing portion to be fixed to the first support member 5; and the elastic arm portion 91G serving as the first elastic arm portion provided between the inner fixing portion 91M and the outer fixing portion 91F.

Also, the different leaf spring forming the second biasing member 92 (the left-hand outer spring member 92L and the right-hand outer spring member 92R) may include: the inner fixing portion 92M serving as the third fixing portion to be fixed to the first support member 5; the outer fixing portion 92F serving as the fourth fixing portion to be fixed to the second support member 6; and the elastic arm portion 92G serving as the second elastic arm portion provided between the inner fixing portion 92M and the outer fixing portion 92F.

The elastic arm portion 91G may include a plurality of winding portions WD1 and a plurality of extending portions EL1 each extending from both ends of each of the plurality of winding portions WD1. The elastic arm portion 92G may include a plurality of winding portions WD2 and a plurality of extending portions EL2 each extending from both ends of each of the plurality of winding portions WD2.

In this case, the elastic arm portion 91G and the elastic arm portion 92G are disposed so as to partially face each other in the biasing direction (X-axis direction). In a portion where the elastic arm portion 91G and the elastic arm portion 92G partially face each other in the biasing direction (X-axis direction), the elastic arm portion 91G and the elastic arm portion 92G may be disposed such that the extending portions EL1 extend along the extending portions EL2.

Figure 23:
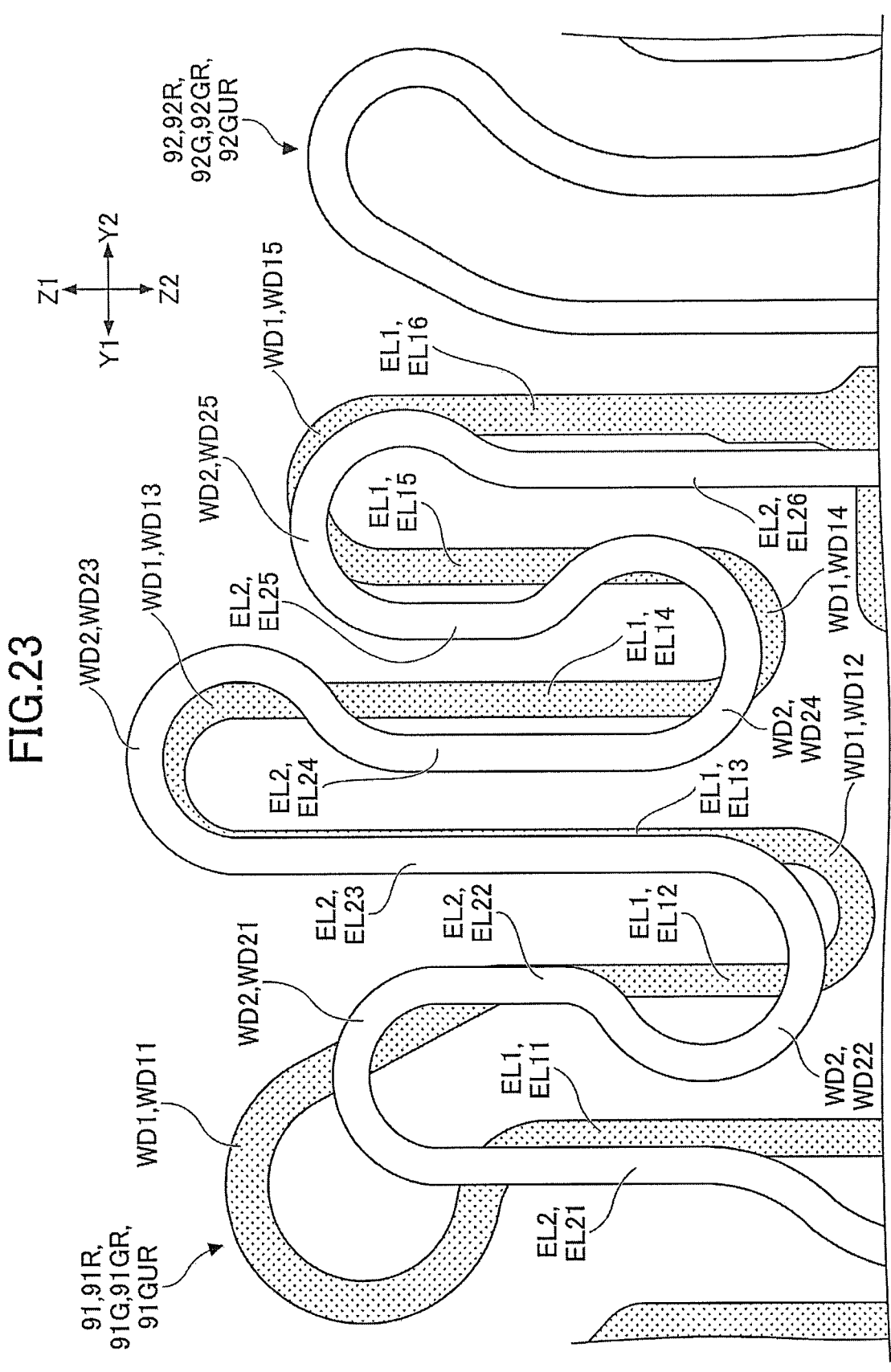
FIG. 23 is a partial front view of the biasing member of the reflector driving device of FIG. 16.

FIG. 23 is a partial front view of each of the right-hand inner spring member 91R and the right-hand outer spring member 92R, and corresponds to an enlarged view of a region R7 surrounded by a chain line in the lower part of FIG. 18. Specifically, FIG. 23 is a front view illustrating: a part of the right-hand upper elastic arm portion 91GUR forming the right-hand elastic arm portion 91GR of the right-hand inner spring member 91R; and a part of the right-hand upper elastic arm portion 92GUR forming the right-hand elastic arm portion 92GR of the right-hand outer spring member 92R. Note that, the following description made referring to FIG. 23 is related to the right-hand upper elastic arm portion 91GUR and the right-hand upper elastic arm portion 92GUR, but the same applies to: the right-hand lower elastic arm portion 91GDR and the right-hand lower elastic arm portion 92GDR; the left-hand upper elastic arm portion 91GUL and the left-hand upper elastic arm portion 92GUL; and the left-hand lower elastic arm portion 91GDL and the left-hand lower elastic arm portion 92GDL.

As illustrated in FIG. 23, the right-hand upper elastic arm portion 91GUR includes the plurality of winding portions WD1 (a first winding portion WD11 to a fifth winding portion WD15) and the plurality of extending portions EL1 (a first extending portion EL11 to a sixth extending portion EL16) each extending from both ends of each of the plurality of winding portions WD1 (the first winding portion WD11 to the fifth winding portion WD15). Also, the right-hand upper elastic arm portion 92GUR includes a plurality of winding portions WD2 (a first winding portion WD21 to a fifth winding portion WD25) and a plurality of extending portions EL2 (a first extending portion EL21 to a sixth extending portion EL26) each extending from both ends of each of the plurality of winding portions WD2 (the first winding portion WD21 to the fifth winding portion WD25).

The right-hand elastic arm portion 91GR and the right-hand elastic arm portion 92GR are disposed so as to partially face each other in the biasing direction (X-axis direction). In a portion where the right-hand elastic arm portion 91GR and the right-hand elastic arm portion 92GR partially face each other in the biasing direction (X-axis direction) (i.e., the portion as illustrated in FIG. 23), the extending portions EL1 are disposed so as to extend along the extending portions EL2. Specifically, the first extending portion EL11 is disposed so as to extend along the first extending portion EL21 in the Z-axis direction, the second extending portion EL12 is disposed so as to extend along the second extending portion EL22 in the Z-axis direction, the third extending portion EL13 is disposed so as to extend along the third extending portion EL23 in the Z-axis direction, the fourth extending portion EL14 is disposed so as to extend along the fourth extending portion EL24 in the Z-axis direction, the fifth extending portion EL15 is disposed so as to extend along the fifth extending portion EL25 in the Z-axis direction, and the sixth extending portion EL16 is disposed so as to extend along the sixth extending portion EL26 in the Z-axis direction.

Also, in the example as illustrated in FIG. 23, each of the extending portions EL1 and extending portions EL2 is configured to extend in a straight line along the Z-axis direction, but may be configured to extend in a curved line.

This configuration produces the effect of being able to suppress tangling between the first elastic arm portion and the second elastic arm portion when an impact due to, for example, dropping is applied to the reflector driving device 101B.

The above-described reflector driving device can swing the reflector more stably.

What is claimed is:

1. A reflector driving device, comprising:

a reflector-retaining member configured to retain a reflector that refracts light;

a first support member configured to support the reflector-retaining member so as to be swingable about a first axis;

a second support member configured to support the first support member so as to be swingable about a second axis having an axis-line direction perpendicular to an axis-line direction of the first axis;

a first driving mechanism configured to swing the reflector-retaining member about the first axis;

a second driving mechanism configured to swing the first support member about the second axis;

a first biasing member configured to bias the reflector-retaining member toward the first support member; and a second biasing member configured to bias the first support member toward the second support member, wherein the second driving mechanism includes a second magnetic field-generating member movable along with the first support member, and a second coil facing the second magnetic field-generating member, in a direction in which the second biasing member biases the first support member, a magnetic member disposed to be spaced from the second magnetic field-generating member is provided, and a restoring force of the second biasing member is greater than an attracting force between the second magnetic field generating member and the magnetic member.

2. The reflector driving device according to claim 1, wherein:

a first direction in which the first biasing member biases the reflector-retaining member and a second direction in which the second biasing member biases the first support member are identical; and the first direction and the second direction are perpendicular to the axis-line direction of the first axis and the axis-line direction of the second axis.

3. The reflector driving device according to claim 1, wherein:

the first biasing member includes a first leaf spring; and the second biasing member includes a second leaf spring that is different from the first leaf spring included in the first biasing member.

4. The reflector driving device according to claim 3, wherein the first leaf spring and the second leaf spring are disposed at different positions in a biasing direction in which the first biasing member biases the reflector-retaining member, so as to have a portion where the first leaf spring and the second leaf spring face each other with a gap in the biasing direction.

5. The reflector driving device according to claim 4, wherein the second leaf spring is disposed farther away from the first axis than the first leaf spring.

6. The reflector driving device according to claim 4, wherein:

the first leaf spring includes a first fixing portion to be fixed to the reflector-retaining member, a second fixing portion to be fixed to the first support member, and a first elastic arm portion provided between the first fixing portion and the second fixing portion;

the second leaf spring includes a third fixing portion to be fixed to the first support member, a fourth fixing portion to be fixed to the second support member, and a second elastic arm portion provided between the third fixing portion and the fourth fixing portion; and in an initial state in which the first driving mechanism and the second driving mechanism do not drive, plate surfaces of the first fixing portion, the second fixing portion, the third fixing portion, and the fourth fixing portion are parallel to each other.

7. The reflector driving device according to claim 6, wherein:

the first leaf spring includes a first spring member and a second spring member that are disposed to be spaced from each other;

each of the first spring member and the second spring member includes two first elastic arm portions each connecting the first fixing portion and the second fixing portion to each other, each of the two first elastic arm portions being the first elastic arm portion;

as viewed along the biasing direction, the first axis is positioned between the two first elastic arm portions of the first spring member and positioned between the two first elastic arm portions of the second spring member;

the second leaf spring includes a third spring member and a fourth spring member that are disposed to be spaced from each other;

each of the third spring member and the fourth spring member includes two second elastic arm portions each connecting the third fixing portion and the fourth fixing portion to each other, each of the two second elastic arm portions being the second elastic arm portion; and as viewed along the biasing direction, the first axis is positioned between the two second elastic arm portions of the third spring member and positioned between the two second elastic arm portions of the fourth spring member.

8. The reflector driving device according to claim 4, wherein:

the first leaf spring includes a first fixing portion to be fixed to the reflector-retaining member, a second fixing portion to be fixed to the first support member, and a first elastic arm portion provided between the first fixing portion and the second fixing portion;

the second leaf spring includes a third fixing portion to be fixed to the first support member, a fourth fixing portion to be fixed to the second support member, and a second elastic arm portion provided between the third fixing portion and the fourth fixing portion;

the first elastic arm portion includes a plurality of winding portions and a plurality of extending portions each extending from both ends of each of the plurality of winding portions;

the second elastic arm portion includes a plurality of winding portions and a plurality of extending portions each extending from both ends of each of the plurality of winding portions; and the first elastic arm portion and the second elastic arm portion are disposed so as to partially face each other in the biasing direction, and in a portion where the first elastic arm portion and the second elastic arm portion partially face each other in the biasing direction, the first elastic arm portion and the second elastic arm portion are disposed such that the extending portions of the first elastic arm portion extend along the extending portions of the second elastic arm portion.

9. The reflector driving device according to claim 1, wherein:

the first biasing member and the second biasing member are formed of an identical spring member, the spring member being provided between the reflector-retaining member and the second support member; and the spring member serves as both of the first biasing member and the second biasing member.

10. The reflector driving device according to claim 9, wherein:

the spring member is formed of a leaf spring;

the spring member includes a first fixing portion to be fixed to the reflector-retaining member, a second fixing portion to be fixed to the second support member, and an elastic arm portion that connects the first fixing portion and the second fixing portion to each other; and in an initial state in which the first driving mechanism and the second driving mechanism do not drive, the first fixing portion and the second fixing portion are parallel to each other.

11. The reflector driving device according to claim 10, wherein:

the spring member includes a first spring member and a second spring member that are disposed to be spaced from each other;

each of the first spring member and the second spring member includes two elastic arm portions each connecting the first fixing portion and the second fixing portion to each other, each of the two elastic arm portions being the elastic arm portion; and as viewed along a biasing direction in which the first biasing member biases the reflector-retaining member, the first axis is positioned between the two elastic arm portions of the first spring member and positioned between the two elastic arm portions of the second spring member.

12. The reflector driving device according to claim 1, further comprising:

a first shank portion via which the reflector-retaining member is connected so as to be swingable about the first axis; and a second shank portion via which the first support member is connected so as to be swingable about the second axis, wherein in a biasing direction in which the first biasing member biases the reflector-retaining member, a position of the first shank portion and a position of the second shank portion are different from each other.

13. The reflector driving device according to claim 12, wherein:

the first shank portion includes a portion integrally formed with the reflector-retaining member and a portion integrally formed with the first support member; and/or the second shank portion includes a portion integrally formed with the first support member and a portion integrally formed with the second support member.

14. The reflector driving device according to claim 12, wherein:

the first shank portion includes a ball disposed between the reflector-retaining member and the first support member; and/or the second shank portion includes a ball disposed between the first support member and the second support member.

15. The reflector driving device according to claim 1, wherein:

the first driving mechanism includes a first magnetic field-generating member movable along with the reflector-retaining member, and a first coil facing the first magnetic field-generating member; and the first coil and the second coil, and the second support member are disposed so as to be unmovable relative to each other.

16. The reflector driving device according to claim 15, wherein the first coil and the second coil are provided on a wiring board, and the wiring board is fixed to the second support member.

17. The reflector driving device according to claim 15, wherein:

the second magnetic field-generating member includes a magnet disposed in a first mounting portion of the first support member, and a magnet disposed in a second mounting portion of the first support member, the magnet disposed in the first mounting portion and the magnet disposed in the second mounting portion are disposed so as to face each other via a plane that is orthogonal to the first axis and includes the second axis; and the second coil includes a coil provided correspondingly to the magnet disposed in the first mounting portion, and a coil provided correspondingly to the magnet disposed in the second mounting portion.

18. The reflector driving device according to claim 17, wherein:

the magnetic member includes a first magnetic member corresponding to the magnet disposed in the first mounting portion, and a second magnetic member corresponding to the magnet disposed in the second mounting portion; and the magnetic member is embedded in the second support member.

19. The reflector driving device according to claim 1, wherein:

the first axis is orthogonal to a plane including an optical axis of incident light incident on the reflector and an optical axis of reflected light reflected by the reflector; and the second axis is parallel to the optical axis of the incident light.

20. A reflector driving device, comprising:

a reflector-retaining member configured to retain a reflector that refracts light;

a first support member configured to support the reflector-retaining member so as to be swingable about a first axis;

a second support member configured to support the first support member so as to be swingable about a second axis having an axis-line direction perpendicular to an axis-line direction of the first axis;

a first driving mechanism configured to swing the reflector-retaining member about the first axis;

a second driving mechanism configured to swing the first support member about the second axis;

a first biasing member configured to bias the reflector-retaining member toward the first support member; and a second biasing member configured to bias the first support member toward the second support member, wherein the first biasing member includes a first leaf spring;

wherein the second biasing member includes a second leaf spring that is different from the first leaf spring included in the first biasing member, and wherein the first leaf spring and the second leaf spring are disposed at different positions in a biasing direction in which the first biasing member biases the reflector-retaining member, so as to have a portion where the first leaf spring and the second leaf spring face each other with a gap in the biasing direction.

* * * * *